US010165199B2

United States Patent
Zhang et al.

(10) Patent No.: US 10,165,199 B2
(45) Date of Patent: Dec. 25, 2018

(54) IMAGE CAPTURING APPARATUS FOR PHOTOGRAPHING OBJECT ACCORDING TO 3D VIRTUAL OBJECT

(71) Applicant: SAMSUNG ELECTRONICS CO., LTD., Suwon-si (KR)

(72) Inventors: Xu Zhang, Beijing (CN); Gengyu Ma, Beijing (CN); Hui Zhang, Beijing (CN); Ya Lu, Beijing (CN); Su-jung Bae, Yongin-si (KR); Moon-sik Jeong, Seongnam-si (KR); Hyeon-hee Cha, Suwon-si (KR); Minhyo Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/254,515

(22) Filed: Sep. 1, 2016

(65) Prior Publication Data
US 2017/0064214 A1  Mar. 2, 2017

(30) Foreign Application Priority Data
Sep. 1, 2015   (CN) .......................... 2015 1 0552980
May 20, 2016  (KR) ........................ 10-2016-0062168

(51) Int. Cl.
*H04N 5/265* (2006.01)
*G06K 9/00* (2006.01)
(Continued)

(52) U.S. Cl.
CPC ......... *H04N 5/265* (2013.01); *G06K 9/00912* (2013.01); *G06T 19/20* (2013.01);
(Continued)

(58) Field of Classification Search
CPC .................................................... H04N 5/265
See application file for complete search history.

(56) References Cited

U.S. PATENT DOCUMENTS 7,053,915 B1 * 5/2006 Jung ...................... G10H 1/368
                                                  345/629
7,494,430 B2 * 2/2009 Choi ................... A63B 24/0003
                                                  473/150
(Continued)

FOREIGN PATENT DOCUMENTS

CN    103139463 A    6/2013
CN    104143212 A    11/2014
(Continued)

OTHER PUBLICATIONS

CN104966318B; Practical methods to enhance image effects and image overlay function; Sep. 22, 2017; English Translation (Year: 2017).*

(Continued)

*Primary Examiner* — Cynthia Segura
(74) *Attorney, Agent, or Firm* — Sughrue Mion, PLLC

(57) ABSTRACT

An image capturing apparatus and an image capturing method are provided. The image capturing apparatus includes an image capturing unit configured to capture an image; and a controller connected to the image capturing unit, wherein the controller is configured to obtain a background image with depth information, position a three-dimensional (3D) virtual image representing a target object in the background image based on the depth information, and control the image capturing unit to capture the target object based on a difference between the target object viewed from the image capturing apparatus and the 3D virtual image in the background image.

20 Claims, 38 Drawing Sheets

(51) Int. Cl.
  *G06T 19/20* (2011.01)
  *H04N 5/232* (2006.01)
  *H04N 5/33* (2006.01)
(52) U.S. Cl.
  CPC ......... *H04N 5/23222* (2013.01); *H04N 5/332* (2013.01); *G06T 2200/04* (2013.01)

(56) References Cited

U.S. PATENT DOCUMENTS

| | | | |
|---|---|---|---|
| 7,925,434 B2* | 4/2011 | Kato | G01C 21/3638 |
| | | | 701/454 |
| 8,698,796 B2* | 4/2014 | Mochizuki | G06T 15/04 |
| | | | 345/419 |
| 9,520,072 B2* | 12/2016 | Sun | G06T 19/006 |
| 9,685,005 B2* | 6/2017 | Kjallstrom | G06T 19/006 |
| 2001/0013869 A1* | 8/2001 | Nozawa | G06T 13/80 |
| | | | 345/473 |
| 2003/0169350 A1 | 9/2003 | Wiezel et al. | |
| 2005/0187015 A1* | 8/2005 | Suzuki | A63F 13/10 |
| | | | 463/32 |
| 2005/0225566 A1* | 10/2005 | Kojo | G06T 13/80 |
| | | | 345/629 |
| 2005/0265598 A1* | 12/2005 | Noguchi | G01N 21/8851 |
| | | | 382/167 |
| 2006/0040755 A1* | 2/2006 | Choi | A63B 24/0003 |
| | | | 473/131 |
| 2007/0025508 A1* | 2/2007 | Ohishi | A61B 6/4441 |
| | | | 378/62 |
| 2008/0030599 A1 | 2/2008 | Stavely et al. | |
| 2008/0071559 A1* | 3/2008 | Arrasvuori | G06Q 30/06 |
| | | | 705/26.1 |
| 2009/0128552 A1 | 5/2009 | Fujiki et al. | |
| 2009/0183125 A1 | 7/2009 | Magal et al. | |
| 2010/0165081 A1* | 7/2010 | Jung | H04N 13/0022 |
| | | | 348/46 |
| 2010/0266206 A1 | 10/2010 | Jo et al. | |
| 2011/0304695 A1* | 12/2011 | Lim | H04N 13/0409 |
| | | | 348/46 |
| 2011/0314049 A1 | 12/2011 | Poirier et al. | |
| 2012/0082369 A1* | 4/2012 | Ogishima | H04N 13/0022 |
| | | | 382/154 |
| 2012/0092338 A1* | 4/2012 | Ogishima | G06T 15/503 |
| | | | 345/419 |
| 2012/0113141 A1* | 5/2012 | Zimmerman | G06Q 30/0643 |
| | | | 345/633 |
| 2012/0120199 A1* | 5/2012 | Ben Himane | G06T 7/0046 |
| | | | 348/46 |
| 2012/0200761 A1 | 8/2012 | Lim et al. | |
| 2012/0218266 A1* | 8/2012 | Maeta | H04N 13/0011 |
| | | | 345/422 |
| 2013/0028476 A1 | 1/2013 | Craig et al. | |
| 2013/0113830 A1* | 5/2013 | Suzuki | G06T 3/00 |
| | | | 345/634 |
| 2013/0135295 A1* | 5/2013 | Li | G06T 19/006 |
| | | | 345/419 |
| 2013/0135304 A1* | 5/2013 | Chen | G06T 17/00 |
| | | | 345/420 |
| 2013/0142452 A1* | 6/2013 | Shionozaki | G06T 15/503 |
| | | | 382/284 |
| 2013/0238295 A1 | 9/2013 | Hyung et al. | |
| 2013/0257858 A1* | 10/2013 | Na | A63F 13/10 |
| | | | 345/419 |
| 2013/0258059 A1* | 10/2013 | Ma | H04N 13/221 |
| | | | 348/46 |
| 2013/0271618 A1 | 10/2013 | Koryakovskiy et al. | |
| 2014/0015966 A1 | 1/2014 | Kim et al. | |
| 2014/0099021 A1 | 4/2014 | Bian et al. | |
| 2014/0132629 A1 | 5/2014 | Pandey et al. | |
| 2014/0132725 A1* | 5/2014 | Hsieh | H04N 13/004 |
| | | | 348/46 |
| 2014/0176530 A1* | 6/2014 | Pathre | G06T 19/20 |
| | | | 345/419 |
| 2014/0340404 A1* | 11/2014 | Wang | G06T 15/20 |
| | | | 345/427 |
| 2015/0022698 A1 | 1/2015 | Na et al. | |
| 2015/0097865 A1 | 4/2015 | Subramanian et al. | |
| 2015/0163457 A1 | 6/2015 | Shimoyama | |
| 2015/0312559 A1* | 10/2015 | Ueno | H04N 13/0014 |
| | | | 348/53 |
| 2015/0366628 A1* | 12/2015 | Ingmanson | A61B 5/015 |
| | | | 600/424 |
| 2016/0180593 A1 | 6/2016 | Yang | |
| 2016/0198146 A1* | 7/2016 | Hayasaka | G06T 1/20 |
| | | | 348/48 |
| 2016/0212406 A1* | 7/2016 | Hayasaka | H04N 5/23238 |
| 2016/0334885 A1* | 11/2016 | Togawa | G06F 17/50 |
| 2016/0381348 A1* | 12/2016 | Hayasaka | G06F 3/011 |
| | | | 348/48 |
| 2017/0061701 A1* | 3/2017 | Mittal | G06T 19/20 |
| 2017/0206691 A1* | 7/2017 | Harrises | G06T 11/60 |
| 2017/0214899 A1* | 7/2017 | Meier | H04N 13/0011 |

FOREIGN PATENT DOCUMENTS

| | | |
|---|---|---|
| EP | 3035282 A1 | 6/2016 |
| EP | 3166079 A1 | 5/2017 |
| KR | 100943548 B1 | 2/2010 |
| KR | 10-2013-0101942 A | 9/2013 |
| KR | 1020150032752 A | 3/2015 |
| KR | 10-2015-0041548 A | 4/2015 |
| WO | WO2015/037472 A1 | 3/2015 |
| WO | 2015/123775 A1 | 8/2015 |

OTHER PUBLICATIONS

Search Report dated Dec. 7, 2016, issued by the International Searching Authority in counterpart International Patent Application No. PCT/KR2016/009784 (PCT/ISA/210).

Written Opinion dated Dec. 7, 2016, issued by the International Searching Authority in counterpart International Patent Application No. PCT/KR2016/009784 (PCT/ISA/237).

"Build Kinect-enabled Windows Store apps", Microsoft, Web-based document, Retrieved from the internet on Sep. 1, 2016, Total 6 pages, http://www.microsoft.com/en-us/kinectforwindows/.

"PrimeSense", Wikipedia, Aug. 2014, Web-based document, Retrieved from the internet on Sep. 1, 2016, Total 7 pages, http://en.wikipedia.org/wiki/PrimeSense.

Jamie Shotton et al., "Efficient Human Pose Estimation from Single Depth Images", (Invited Paper—CVPR 2011 special issue), In IEEE Transactions on Pattern Analysis and Machine Intelligence, 2012, Total 21 pages.

Tong Zhang, "A Review of—An Introduction to Support Vector Machines and other kernel-based learning methods", AI Magazine vol. 22, No. 2, Summer 2001, pp. 103-104.

Leo Breiman, "Random Forests", Machine Learning 45 (1): Sep. 1999, Total 35 pages.

Geoffrey E. Hinton et al., "A Fast Learning Algorithm for Deep Belief Nets", Neural Computation 18(7): 2006, pp. 1527-1554.

J. MacQueen, "Some Methods for Classification and Analysis of Multivariate Observations", Proceedings of 5th Berkeley Symposium on Mathematical Statistics and Probability, University of California Press. 1967, pp. 281-297.

Yizong Cheng, "Mean Shift, Mode Seeking, and Clustering", IEEE Transactions on Pattern Analysis and Machine Intelligence, vol. 17, No. 8, Aug. 1995, pp. 790-799.

R. E. Kalman, "A New Approach to Linear Filtering and Prediction Problems", Journal of Basic Engineering 82 (1): 1960, Total 12 pages.

Garry A. Einicke and Langford B. White, "Robust Extended Kalman Filtering", IEEE Transactions on Signal Processing, vol. 47, No. 9, Sep. 1999, pp. 2596-2599.

Simon J. Julier and Jeffrey K. Uhlmann, "Unscented Filtering and Nonlinear Estimation", Proceedings of the IEEE, vol. 92, No. 3, Mar. 2004, pp. 401-422.

(56) References Cited

OTHER PUBLICATIONS

James Kennedy and Russell Eberhart, "Particle Swarm Optimization", Proceedings of IEEE International Conference on Neural Networks IV, 1995, pp. 1942-1948.

Martin A. Fischler and Robert C. Bolles, "Random Sample Consensus: A Paradigm for Model Fitting with Applications to Image Analysis and Automated Cartography", Technical Note 213, SRI Projects 5300 and 1009, Mar. 1980, Comm. of the ACM, Jun. 24, 1981, 24 (6): Total 41 pages.

Communication dated Sep. 29, 2018, issued by the State Intellectual Property Office of the People's Republic of China in counterpart Chinese Patent Application No. 201510552980.0.

\* cited by examiner 510   520   530

IMAGE CAPTURING APPARATUS FOR PHOTOGRAPHING OBJECT ACCORDING TO 3D VIRTUAL OBJECT

CROSS-REFERENCE TO RELATED APPLICATIONS

This application claims priority from Chinese Patent Application No. 201510552980.0, filed on Sep. 1, 2015 in the State Intellectual Property Office of the People's Republic of China, and Korean Patent Application No. 10-2016-0062168, filed on May 20, 2016 in the Korean Intellectual Property Office, the disclosures of which are incorporated herein in their entireties by reference.

BACKGROUND

1. Field

Methods and apparatuses consistent with exemplary embodiments relates to image capturing apparatuses and operating methods thereof.

2. Description of the Related Art

Recently, electronic cameras are in widespread use. In the electronic cameras, an image of an object is formed on a semiconductor imaging element (e.g., an image sensor) through an optical imaging system. The image of the object is converted into an electrical signal, and image data of a still image corresponding to the electrical signal is recorded on a recording medium such as a semiconductor memory or a magnetic disk.

As various image capturing apparatuses (e.g., cameras, smartphones, tablet computers, smart wearable devices, etc.) are popularized, people are not satisfied with simple photographing postures and simple photographing effects, and hope to use more interesting photographing effects.

FIG. 1 illustrates examples of photographing effect using a position difference between photograph objects.

The left image 101 of FIG. 1 illustrates a man touching the sun, which is taken with a trick using a position difference between the man and the sun. The right image 102 of FIG. 1 illustrates two women holding each other's hand, which is taken with a trick using a position difference between the women, i.e., the close-up object and the distant object.

However, it is not easy to achieve such photographing. For example, another person may be required to ensure that the object is in the accurate posture, to obtain the intended photographing effect. Furthermore, it is difficult to determine final photographing effects in advance to perform effective adjustment of the target objects and/or photographers.

SUMMARY

Provided are image capturing apparatuses and image capturing methods, capable of effectively photographing various postures of objects.

Additional aspects will be set forth in part in the description which follows and, in part, will be apparent from the description, or may be learned by practice of the exemplary embodiments.

According to an aspect of an exemplary embodiment, there is provided an image capturing apparatus including: an image capturing unit configured to capture an image; and a controller connected to the image capturing unit, wherein the controller is configured to obtain a background image with depth information, position a three-dimensional (3D) virtual image representing a target object in the background image based on the depth information, and control the image capturing unit to capture the target object based on a difference between the target object viewed from the image capturing apparatus and the 3D virtual image in the background image.

The controller may be further configured to determine at least one of a 3D virtual space position and a 3D posture of the 3D virtual image.

The controller may be further configured to determine a photograph accessory and configure at least one of a 3D space position and a 3D posture of the photograph accessory in the background image.

The controller may be further configured to position the 3D virtual image based on the photograph accessory of the 3D virtual image in the background image, and a relation between the 3D virtual image and the photograph accessory of the 3D virtual image is predetermined in a pre-configured photographing scene template.

The controller may be further configured to configure the 3D posture of the 3D virtual image based on a 3D space position of at least one joint point of the 3D virtual image.

The controller may be further configured to output a capturing guidance indicating the difference through at least one of the image capturing apparatus and a wearable device worn by the target object based on the determined difference.

The controller may be further configured to detect the target object based on at least one of the 3D posture, 3D space position information that indicates the 3D space position and is provided by the wearable device, and a reference object selected by a user for target object tracking.

The difference may include at least one of a 3D space position difference and a 3D posture difference between the target object and the 3D virtual image.

The controller may be further configured to determine the 3D posture difference by comparing a 3D space position of at least one joint point of the target object with a 3D space position of at least one corresponding joint point of the 3D virtual image.

The controller may be further configured to detect the posture of the target object, determine whether the posture of the target object is consistent with a focusing posture, and control the image capturing unit to focus on and photograph the target object when the detected posture of the target object is consistent with the focusing posture.

The focusing posture may include at least one of a pre-configured posture representing a target posture corresponding to a 3D posture of the 3D virtual image and a posture stored in a pre-configured photographing posture database.

The controller may be further configured to determine an anticipating posture that is different from the target posture, and control the image capturing unit to automatically focus on and photograph the target object when it is detected that the target object in the anticipating posture.

The controller may be further configured to control the image capturing unit to automatically focus on and continuously photograph the target object when the target object is continuously consistent with the 3D virtual image in the background image during a preset time period.

The target object may include multiple objects, and the controller is further configured to remove an object inconsistent with the 3D virtual image before or after the target object is focused on and photographed.

According to an aspect of an exemplary embodiment, there is provided a method for an image capturing apparatus to capture an image, the method including: obtaining a background image with depth information; positioning a three-dimensional (3D) virtual image representing a target object in the background image based on the depth information; and photographing the target object based on a difference between the target object viewed from the image capturing apparatus and the 3D virtual image in the background image.

The image capturing method may further include: determining at least one of a 3D virtual space position and a 3D posture of the 3D virtual image.

The image capturing method may further include: outputting a capturing guidance through at least one of the image capturing apparatus and a wearable device worn by the target object based on the determined difference.

The image capturing method may further include: detecting a posture of the target object; determining whether the posture of the target object is consistent with a focusing posture; and focusing on and photographing the target object when the detected posture of the target object is consistent with the focusing posture, wherein the focusing posture includes at least one of a pre-configured posture representing a target posture corresponding to a 3D posture of the 3D virtual image and a posture stored in a pre-configured photographing posture database.

The image capturing method may further include: determining an anticipating posture that is different from the target posture; and automatically focusing on and photographing the target object when it is detected that the target object is in the anticipating posture.

BRIEF DESCRIPTION OF THE DRAWINGS

These and/or other aspects will become apparent and more readily appreciated from the following description of the exemplary embodiments, taken in conjunction with the accompanying drawings in which:

FIG. 38 is a flowchart of an image capturing method according to an exemplary embodiment; and.

DETAILED DESCRIPTION

Figure 1:
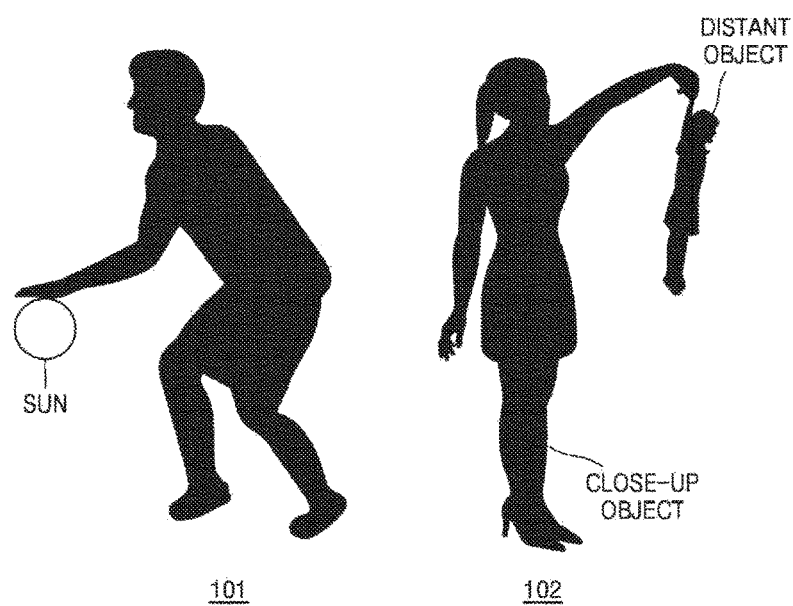
FIG. 1 illustrates examples of images taken using a position difference of objects.

Reference will now be made in detail to exemplary embodiments, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used in the present disclosure will be described briefly and embodiments will then be described in detail.

The terms used herein are those general terms currently widely used in the art by taking into consideration functions in the present disclosure, but the terms may vary according to the intention of those of ordinary skill in the art, precedents, or new technology in the art. In addition, specified terms may be selected by the applicant, and in this case, the detailed meaning thereof will be described in the detailed description of the present disclosure. Thus, the terms used herein should be understood not as simple names but based on the meaning of the terms and the overall description of the inventive concept.

It will also be understood that the terms "comprises", "includes", and "has", when used herein, specify the presence of stated elements, but do not preclude the presence or addition of other elements, unless otherwise defined. Also, the terms "unit" and "module" used herein represent a unit for processing at least one function or operation, which may be implemented by hardware, software, or a combination of hardware and software.

The exemplary embodiments will be described with reference to the accompanying drawings in such a manner that the exemplary embodiments may be easily carried out by those of ordinary skill in the art. However, the inventive concept may be implemented in various forms and is not limited to the exemplary embodiments. For clarity of description, parts having no relation to description are omitted. Like reference numerals are assigned to like elements throughout the present disclosure and the drawings.

Image capturing methods according to various embodiments are described below with reference to FIGS. 2 to 20. The image capturing methods may be implemented through an image capturing apparatus or a computer program. For example, the image capturing methods may be implemented through a camera installed in the image capturing apparatus or may be implemented as a function program in an operating system (OS) of the image capturing apparatus.

Figure 2:
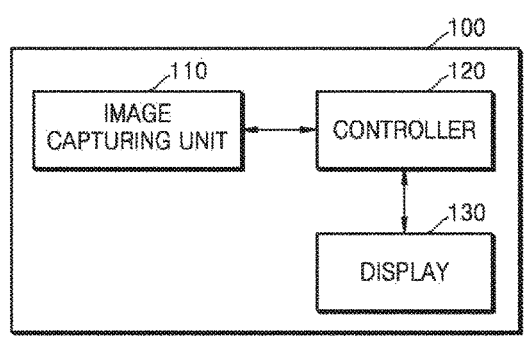
FIG. 2 is a block diagram of an image capturing apparatus according to an exemplary embodiment.

FIG. 2 is a block diagram of an image capturing apparatus 100 according to an exemplary embodiment.

The image capturing apparatus 100 according to an exemplary embodiment may be an electronic terminal with an image capturing function, such as a camera, a mobile communication terminal (e.g., a smart phone), a smart wearable device (e.g., a smart watch, a smart bracelet, a smart glass, etc.), a personal computer (PC), a tablet computer, etc. Modules included in the image capturing apparatus 100 may be implemented in conjunction with a specific element (e.g., a sensor). In an example, the module may be implemented through a general hardware processor, e.g., a digital signal processor, a field programmable gate array (FPGA), etc., or may be implemented in a software manner through a computer program. For example, the computer program is implemented as a module installed in a camera application of the image capturing apparatus, or is implemented as a function program in an operating system (OS) of the image capturing apparatus.

Referring to FIG. 2, the image capturing apparatus 100 may include an image capturing unit 110, a controller 120, and a display 130.

The image capturing unit 110 may include at least one camera and may include an infrared (IR) camera. In addition, when an optical system moves, the image capturing unit 110 may move in the same direction as the optical system.

The display 130 may display at least one object. The display 130 may display a view finder image to confirm a composition of an object to be photographed and an image capturing condition.

Also, the display 130 may include a liquid crystal display (LCD) panel, an organic light-emitting diode (OLED) display panel, or the like.

According to an exemplary embodiment, the display 130 may be a touch sensitive display capable of receiving a user input.

The controller 120 may control other components of the image capturing apparatus 100, such as the image capturing unit 110 and the display 130.

According to an exemplary embodiment, the controller 120 may obtain a background image with depth information, position a three-dimensional (3D) virtual image to represent an object in the background image, and control the image capturing unit 110 to capture an image of the object based on the positioned 3D virtual image.

According to an exemplary embodiment, the controller 120 may determine a 3D virtual space position and/or a 3D posture of the 3D virtual image.

According to an exemplary embodiment, the controller 120 may determine a photograph accessory and further configure a 3D space position and/or a 3D posture of the photograph accessory in the background image.

According to an exemplary embodiment, the controller 120 may position the 3D virtual image based on the photograph accessory of the 3D virtual image within the background image, wherein a relation between the 3D virtual image and the photograph accessory of the 3D virtual image may be limited in a pre-configured photographing scene template.

According to an exemplary embodiment, the controller 120 may configure a 3D posture of the 3D virtual image by positioning a 3D space position of a joint point of the 3D virtual image. The joining point may indicate any part of a living thing. For example, the joining point may refer to a human body part where a joint exists.

According to an exemplary embodiment, the controller 120 may determine a difference between the object and the 3D virtual image and output image capturing guidance through the image capturing apparatus 100 and/or the wearable device based on the determined difference.

According to an exemplary embodiment, the controller 120 may detect the object based on the 3D posture of the 3D virtual image, may detect the object based on 3D space position information provided by the wearable device, or may detect the object based on target tracking for an object selected by the user.

According to an exemplary embodiment, the controller 120 may determine the 3D posture difference between the object and the 3D virtual image by comparing the 3D space position of the joint point of the object and a 3D space position of a joint point corresponding to the 3D virtual image.

According to an exemplary embodiment, the controller 120 may detect the posture of the object in the background image, determine whether the posture of the object is consistent with a focusing posture, and control the image capturing unit 110 to focus on and photograph the object if the detected posture of the object is consistent with the focusing posture.

According to an exemplary embodiment, the controller 120 may determine an anticipated posture of the 3D virtual image used to anticipate occurrence of a posture of the object. When it is detected that the object holds the anticipated posture, the controller 120 may control the image capturing unit 110 to automatically focus on and photograph the object.

According to an exemplary embodiment, the controller 120 may determine multiple postures of the 3D virtual image used to represent a series of postures of the object desired to be continuously photographed. When the object is continuously consistent with the 3D virtual image in the background image during a preset time period, the controller 120 may control the image capturing unit 110 to automatically focus on and continuously photograph the object.

According to an exemplary embodiment, the controller 120 may remove an object that is inconsistent with the 3D virtual image before or after the object is focused on and photographed.

Figure 3A:
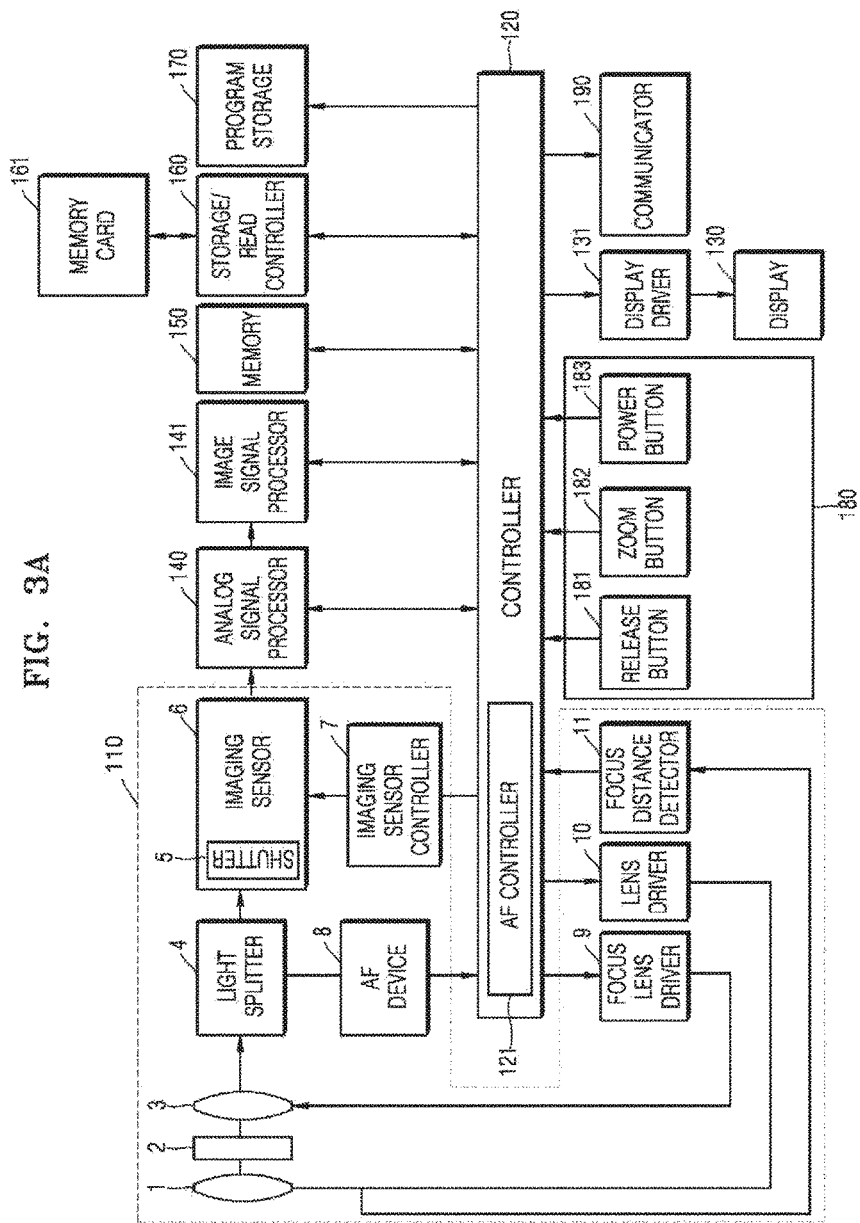
FIG. 3A is a block diagram of an image capturing apparatus according to an exemplary embodiment.

FIG. 3A is a block diagram illustrating an example configuration of an image capturing apparatus 100.

Referring to FIG. 3A, the image capturing apparatus 100 may include an image capturing unit 110, a controller (e.g., including processing circuitry) 120, a display 130, a display driver 131, an analog signal processor 140, an image signal processor 141, a memory 150, a storage/read controller 160, a memory card 161, a program storage 170, a manipulator or an input 180, and a communicator (e.g., including communication circuitry) 190.

The image capturing unit 110 may include, for example, an image capturing lens 1, a diaphragm 2, a focus lens 3, a light splitter 4, a shutter 5, an imaging sensor 6, an imaging sensor controller 7, an auto focusing (AF) device 8, a focus lens driver 9, a lens driver 10, and a focus distance detector 11 as components for generating an image of an electrical signal from incident light.

The image capturing lens 1 may include, for example, a plurality of lens groups or a plurality of lenses for capturing an image of an object. The position of the lens 1 may be adjusted by the lens driver 10. The lens driver 10 may adjust the position of the lens 1 based on a control signal provided from the controller 120.

A degree of opening/closing of the diaphragm 2 may be adjusted by the diaphragm driver (not illustrated) and the diaphragm 2 adjusts an intensity of light incident on the imaging sensor 6.

The position of the focus lens 3 may be adjusted by the focus lens driver 9 and the focus lens 3 adjusts focusing.

The light splitter 4 may split a light beam passing through the image capturing lens 1 and the focus lens 3 into a light beam for image capturing and a light beam for an AF system. For example, the light splitter 4 may be a half-mirror. One light beam after the splitting of the light splitter 4 is incident on the imaging sensor 6.

An optical signal transmitted through the light splitter 4 forms an image of an object on a light-receiving surface of the imaging sensor 6. The imaging sensor 6 may, for example, be a charge coupled device (CCD) image sensor or a complementary metal oxide semiconductor image sensor (CIS), or the like, for converting the optical signal into an electrical signal. The imaging sensor controller 7 temporally limits an intensity of light for the imaging sensor 6 by controlling the shutter 5 included in the imaging sensor 6. When data is read from the imaging sensor 6, the shutter 5 is closed. The imaging sensor controller 7 may be configured to control the imaging sensor 6 based on a control signal automatically generated by an image signal input in real time or a control signal manually input by the user's operation.

The AF device 8 may be a phase difference type distance measurement device which functions as a focus detection device for measuring a distance to an object after receiving light transmitted through the light splitter 4. The AF device 8 may include an AF mirror for changing a direction of an optical axis of AF, a separator lens for separating a pupil of an AF light beam, and an AF sensor for performing phase difference type distance specification (phase difference AF).

An output from the AF device 8 is input to the controller 120 and used for AF control of phase-difference AF by the AF controller 121. The AF controller 121 within the controller 120 may also perform AF control of contrast AF based on an output from the imaging element.

The analog signal processor 140 may perform a noise reduction process, gain adjustment, waveform shaping, an analog-to-digital conversion process, etc. on an analog signal supplied from the imaging sensor 6.

The image signal processor 141 is a signal processor for processing a special function for an image data signal processed in the analog signal processor 140. For example, it is possible to reduce noise for input image data and perform image signal processing for image quality improvement and special effect provision, such as gamma correction, color filter array interpolation, a color matrix, color correction, color enhancement, white balance adjustment, luminance smoothing, and color shading. The image signal processor 141 may generate an image file by compressing the input image data or restore image data from an image file.

Image data output from the image signal processor 141 is input to the storage/read controller 160 through the memory 150 or may be input directly. The storage/read controller 160 stores image data in the memory card 161 based on a signal from the user or automatically. In addition, the storage/read controller 160 reads data about an image from an image file stored in the memory card 161 and may be configured to control the image to be displayed on the display 130 by inputting the read data to the display driver 131 through the memory 150 or another path. The memory card 161 may be detachable and permanently mounted in the image capturing apparatus 100. For example, the memory card 161 may be a flash memory card such as a secure digital (SD) card.

In addition, the image signal processor 141 may perform display image signal processing to display the image on the display 130. For example, the image signal processor 141 may perform brightness level adjustment, color correction, contrast adjustment, outline emphasis adjustment, screen division processing, character image generation, image synthesis processing, or the like.

The image signal processor 141 may detect a target object from input image data by performing face recognition as image recognition processing.

On the other hand, the image signal processed by the image signal processor 141 may be input to the controller 120 via the memory 150 or may be directly input to the controller 120 without passing the memory 150. For example, the memory 150 may operate as a main memory of the image capturing apparatus 100 and temporarily store information necessary during the operation of the image signal processor 141 or the controller 120. The program storage 170 may store programs of an OS, an application system, and the like that drive the image capturing apparatus 100.

The image capturing apparatus 100 may include the display 130 to display an operation state of the image capturing apparatus 100 or to display information regarding an image captured by the image capturing apparatus 100. The display 130 may provide a user with visual information. To provide the visual information, the display 130 may include an LCD panel, an OLED display panel, or the like.

According to an exemplary embodiment, the display 130 may include a touch screen capable of recognizing a touch input. Therefore, the image capturing apparatus 100 may display a menu such as a virtual image selection through the display 130 and receive a user selection through the display 130.

The display driver 131 may provide a driving signal to the display 130.

The overall operation of the image capturing apparatus 100 may be controlled by the controller 120. The controller 120 may be configured to provide control signals for operations of components to the lens driver 10, the focus lens driver 9, the imaging sensor controller 7, etc.

The controller 120 may be configured to process an input image signal and therefore may be configured to control the components based on the processed image signal or an external input signal. The controller 120 may correspond to one or more processors. The processor may be implemented as an array of a plurality of logic gates or implemented as a combination of a general-purpose microprocessor and a memory storing a program executable in the microprocessor. In addition, those of ordinary skill in the art may understand that the controller 120 may be implemented in another form of hardware.

The controller 120 may be configured to execute a program stored in the program storage 170 or includes a separate module configured to generate a control signal for controlling auto focusing, a zoom change, a focus change, automatic exposure correction, or the like, to provide the generated control signal to the lens driver 10, the focus lens driver 9, and the imaging sensor controller 7, and to generally control operations of the components provided in the image capturing apparatus 100 such as a shutter and a strobe.

In addition, the controller 120 may be connected to an external monitor, may be configured to perform predetermined image signal processing so that the image signal input from the image signal processor 141 is displayed on the external monitor, and to then transmit processed image data to allow a corresponding image to be displayed on the external monitor.

According to an exemplary embodiment, the controller 120 may execute one or more instructions of a program stored in the program storage 170 to control the image capturing apparatus 100 to capture an image of an object by using a virtual image. The program stored in the program storage 170 will be described below with reference to FIG. 3B.

The manipulator 180 allows a user to input a control signal. The manipulator 180 may include various function buttons such as a shutter-release button 181 for inputting a shutter-release signal to allow an image to be captured by exposing the imaging sensor 6 to light during a predetermined time period, a zoom button 182 for widening and narrowing an angle of view according to an input, a power button 183 for inputting a control signal to control power on or off, a mode selection button, an image-capturing setting value adjustment button, or the like. The manipulator 180 may be embodied in one of various forms including buttons, a keyboard, a touchpad, a touchscreen, a remote controller, and the like via which a user may input a control signal.

The shutter-release button 181 may have a two-stage switch structure having an image-capturing preparation startup switch SW1 and an image capturing start switch SW2. The zoom button 182 is a manipulation switch for changing a focus distance of the image capturing apparatus 100. In addition, the focus lens 3 is controlled by the AF controller 121 through the focus lens driver 9 based on results of phase-difference AF and contrast AF. In addition, based on manipulation of the zoom button, the image capturing lens 1 related to a change in a focus distance is controlled by the controller 120 through the lens driver 10. Because the position of the image capturing lens 1 is transmitted from the focus distance detector 11 to the controller 120, the focus distance of the image capturing lens 1 may be constantly detected.

According to an exemplary embodiment, the communicator 190 may perform pairing with an external device by using at least one of Wi-Fi, Bluetooth, Bluetooth Low Energy (BLE), infrared communication, and laser beam communication, to transmit information about image capturing guidance to the external device such as a smart watch or a smart glass. In addition, according to an exemplary embodiment, the communicator 190 may access a content providing server by using at least one of 3G communication, 3GPP communication, 4G communication, and Wi-Fi and receive a virtual image.

Figure 3B:
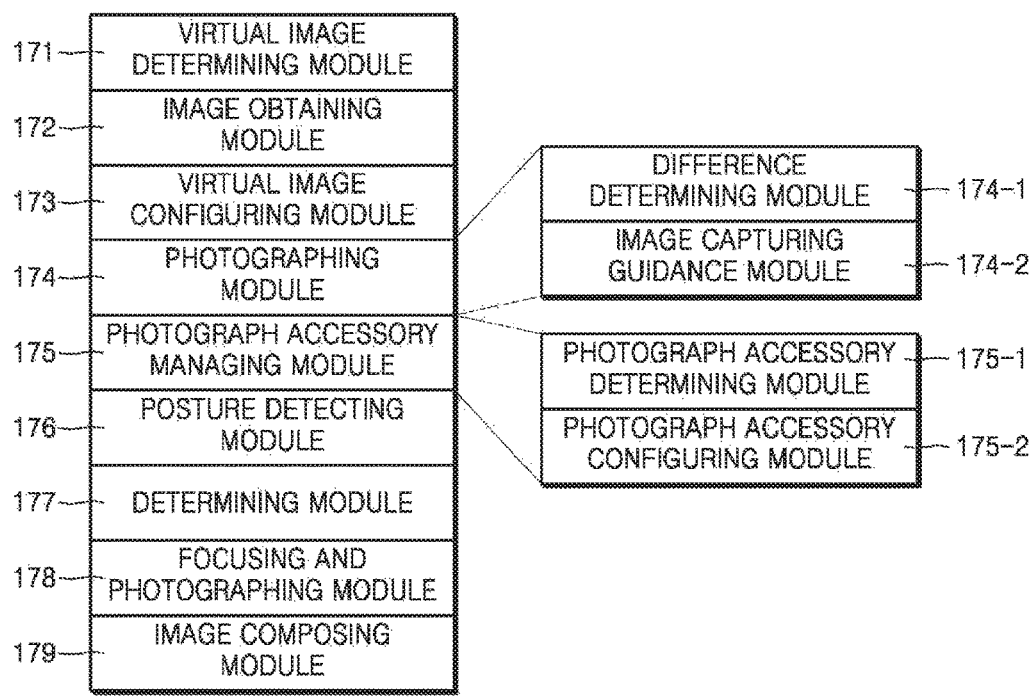
FIG. 3B is a configuration diagram of a module stored in a program storage of FIG. 3A to perform an operating method of an image capturing apparatus, according to an exemplary embodiment.

FIG. 3B is a configuration diagram of a module that may be stored in the program storage 170 of FIG. 3A, according to an exemplary embodiment.

Referring to FIG. 3B, the program storage 170 includes a virtual image determining module 171, an image obtaining module 172, a virtual image configuring module 173, and a photographing module 174. The virtual image determining module 171 is optional.

The virtual image determining module 171 may include one or more instructions to determine a 3D virtual image used to represent a target object. The virtual image determining module 171 may include one or more instructions to select the 3D virtual image used to represent the target object according to a user input. The image capturing apparatus may use a 3D virtual image configured in default to represent the target object. When the 3D virtual image configured in default is used to represent the target object, the virtual image determining module 171 is not in demand.

The image obtaining module 172 may include one or more instructions to obtain a background image with depth information.

The virtual image configuring module 173 may include one or more instructions to configure the 3D virtual image in the background image.

In an example, the virtual image configuring module 173 configures a 3D space position and/or a 3D posture of the 3D virtual image.

In an example, the virtual image configuring module 173 configures the 3D space position of the 3D virtual image in the background image according to a user operation, wherein a user is notified about whether a region where each piece of content is located is suitable to position the 3D virtual image.

In an example, the virtual image configuring module 173 configures the 3D virtual image based on a photograph accessory of the 3D virtual image in the background image, wherein a relation between the 3D virtual image and the photograph accessory of the 3D virtual image is limited in a pre-configured photographing scene template.

In an example, the virtual image configuring module 173 configures the 3D posture of the 3D virtual image by configuring a 3D space position of a joint point of the 3D virtual image.

The photographing module 174 may include one or more instructions to perform photographing based on the configured 3D virtual image. That is, the photographing module 174 performs photographing based on the configured 3D virtual image after a photographing composition is completed by using the 3D virtual image.

The photographing module 174 may guide the target object to perform adjustment based on the configured 3D virtual image in the background image. The photographing module 174 includes a difference determining module 174-1 and an image capturing guidance module 174-2.

The difference determining module 174-1 may include one or more instructions to determine a difference between the target object and the 3D virtual image in the background image.

In an example, the difference determining module 174-1 detects the target object based on a target posture, i.e., the 3D posture of the 3D virtual image, or detects the target object based on 3D space position information provided by the wearable device, or determines the target object based on target tracking for an object selected by the user.

In an example, the difference between the target object and the 3D virtual image in the background image includes a 3D space position difference and/or a 3D posture difference between the target object and the 3D virtual image in the background image.

In an example, the difference determining module 174-1 determines the 3D posture difference between the target object and the 3D virtual image by comparing a 3D space position of a joint point of the target object with a 3D space position of a corresponding joint point of the 3D virtual image.

The image capturing guidance module 174-2 may include one or more instructions to output an image capturing guidance based on the determined difference and perform the photographing.

In an example, the image capturing guidance module 174-2 outputs the image capturing guidance through an image capturing apparatus and/or a wearable device.

The photographing module 174 may focus on and photograph the target object in a suitable occasion. In an example, the photographing module 174 focuses on and photographs the target object when the target object is consistent with the 3D virtual image in the background image.

In an example, the 3D virtual image may have a posture used to anticipate occurrence of a posture of the target object desired to be photographed, wherein the photographing module 174 automatically focuses on and captures the target object.

In an example, the target object may include multiple objects. For each of the objects, the photographing module 174 focuses on and photographs the object when the object is consistent with the 3D virtual image in the background image. The image capturing apparatus further includes an image composing module (not illustrated) that extracts the objects from photographs corresponding to the objects and composes all the extracted objects and the background image.

In an example, the 3D virtual image may have multiple postures used to represent a series of postures of the target object desired to be continuously photographed, and when the target object is continuously consistent with the 3D virtual image in the background image in a preset time period, the photographing module 174 automatically focuses on and continuously captures images of the target object.

In an example, the target object may include multiple objects, and the photographing module 174 may remove an object inconsistent with the 3D virtual image from a photographing preview image before the target object is focused on and photographed, or removes an object inconsistent with the 3D virtual image from a photograph after the target object is focused on and photographed.

In an example, the program storage 170 may further include a photograph accessory managing module 175. The photograph accessory managing module 175 further includes a photograph accessory determining module 175-1 and a photograph accessory configuring module 175-2. The photograph accessory determining module 175-1 may include one or more instructions to determine a photograph accessory. The photograph accessory configuring module 175-2 may include one or more instructions to configure a 3D space position and/or a 3D posture of the photograph accessory in the background image.

The posture detecting module 176 may include one or more instructions to detect a posture of a target object in a background image.

The determining module 177 may include one or more instructions to determine whether the posture of the target object is consistent with a focusing posture.

In an example, the focusing posture may be a pre-configured posture used to represent a target posture, i.e., a desired photographing posture of the 3D virtual image, may be one of photographing postures stored in a pre-configured photographing posture database, or may be a best photographing posture of the target object. The best photographing posture will be described later in further detail.

The focusing and photographing module 178 may include one or more instructions to focus on and photograph the target object if the posture of the detected target object is consistent with the focusing posture.

In an example, the focusing and photographing module 178 may include one or more instructions to automatically focus on and photograph the target object.

In an example, the focusing posture is a posture used to anticipate occurrence of a posture of the target object desired to be photographed, wherein the focusing and photographing module 178 automatically focuses on and photographs the target object.

In an example, the target object includes multiple objects, and the focusing and photographing module 178 focuses on and photographs the object, for each of the objects, when the posture of the detect target object is consistent with the posture of the focusing posture. The program storage 170 may further include an image composing module 179, wherein the image composing module 179 may include one or more instructions to extract the objects from corresponding photographs and compose all the extracted objects and the background image.

In an example, the focusing posture includes postures used to represent a series of postures of the target object desired to be continuously photographed, wherein the posture detecting module 176 continuously detects the posture of the target object in the background image, and the focusing and photographing module 178 automatically focuses on and continuously photographs the target object when it is detected that the posture of the target object is continuously consistent with the focusing posture in a preset time period.

In an example, the target object includes multiple objects, and the focusing and photographing module 178 removes an object inconsistent with the focusing posture from a photographing preview image before the target object is focused on and photographed, or removes an object inconsistent with the focusing posture from a photograph after the target object is focused on and photographed.

<Overall Operation>

Figure 4:
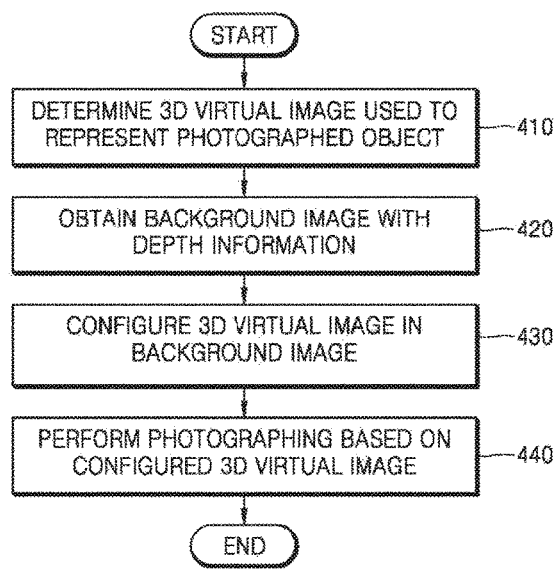
FIG. 4 is a flowchart of an image capturing method according to an exemplary embodiment.

FIG. 4 is a flowchart of an image capturing method according to an exemplary embodiment.

Referring to FIG. 4, in operation 410, the image capturing apparatus 100 may determine a 3D virtual image used to represent a target object. In an example, the 3D virtual image may be selected according to a user input. Alternatively, the image capturing apparatus 100 may use a 3D virtual image set as default for the target object. In this case target object, operation 410 may not be performed.

In operation 420, the image capturing apparatus 100 may obtain a background image with depth information.

The background image may be a photograph of a scene where the photographing is performed, i.e., a scene image that has been captured, or may be a preview image of the scene, i.e., a scene image captured by a camera in real time.

In operation 430, the image capturing apparatus 100 may configure the 3D virtual image in the background image. For example, the image capturing apparatus 100 configures the 3D virtual image in the background image with the depth information. The photographing effect of the target object may be simulated, so that a photographer and/or the target object may obtain the photographing effect in advance before the photographing is performed.

In operation 440, the image capturing apparatus 100 may perform the photographing based on the configured 3D virtual image. That is, after the photographing composition is performed in advance by using the 3D virtual image, the photographing may be performed based on the configured 3D virtual image.

<Determination of 3D Virtual Image>

The procedures of determining the 3D virtual image to represent the target object in operation 410 will be described in further detail below.

According to an exemplary embodiment, the 3D virtual image may be a 3D character model with a designated posture. For example, the 3D virtual image may be a 3D virtual image of the user, a cartoon, a star, a celebrity, a movie role, etc.

Figure 5:
FIG. 5 illustrates three-dimensional (3D) virtual images according to an exemplary embodiment.

FIG. 5 illustrates 3D virtual images according to an exemplary embodiment. The images 510, 520, and 530 of FIG. 5 illustrate a 3D virtual image of a cartoon character, a celebrity, and a movie character.

According to an exemplary embodiment, the 3D virtual image may be a pre-stored 3D virtual image, or may be a 3D virtual image constructed according to another image. For example, a photographing posture database may be established, which is used to store a certain amount of 3D virtual images, so that the user may select the 3D virtual image from the stored 3D virtual images. Alternatively, the 3D virtual image may be obtained through an internet according to a user operation. Alternatively, the 3D virtual image may be constructed through 3D modeling according to an image selected by the user. The image selected by the user may be an image stored in a local storage, or may be an image obtained through the internet, or may be an image in which the user is taken as a target person, or may be an image in which another person is taken as a target person. If the image includes multiple persons, the user may select the target person to construct the 3D virtual image. For example, the user may first select an image stored in the local storage where the image includes person A, person B, and person C, and then the user may select person A as the target person to construct the corresponding 3D virtual image. The 3D virtual image obtained through the internet and the 3D virtual image constructed according to the image provided by the user may be stored in the photographing posture database, so that the user may use the 3D virtual image to perform photographing next time.

In addition, a photograph of the target object with a certain posture may be automatically stored in the photographing posture database as the 3D virtual image. For example, according to user authorization, it is determined whether the photograph of the target object is stored in the common photographing posture database. In the photographing posture database, the image of the target object may be displayed in a manner that some characteristics, e.g., appearance, are not displayed.

If there is a single target object, a single 3D virtual image or a 3D virtual image with a series of postures may be determined. If there are multiple target objects, multiple 3D virtual images or a combination of multiple 3D virtual images may be determined.

According to an exemplary embodiment, when a series of postures of the target object are continuously photographed, a 3D virtual image with a series of postures may be determined. For example, the photographing posture database may store a posture sequence of a 3D virtual image, and the 3D virtual image and a series of postures of the 3D virtual image may be determined by selecting the posture sequence. Alternatively, the 3D virtual image may be determined first, and then a series of the postures of the 3D virtual image may be selected from different postures of 3D virtual image. In addition, when a target posture of the target object is needed, a 3D virtual image with a series of postures may be determined. For example, a posture sequence of the 3D virtual image may be determined first, and then the target posture may be determined from the posture sequence. Therefore, since the certain posture is used to anticipate occurrence of target posture before the target posture in the posture sequence, when it is determined that the posture of the target object is consistent with a certain posture of the target object, the target object may be focused on and photographed, to capture the image of the target object in the target posture.

According to an exemplary embodiment, if there are multiple target objects, a single 3D virtual image may be successively determined for each object. Alternatively, a 3D virtual image with a series of postures is respectively determined for the objects. Thus, multiple 3D virtual images may be respectively determined for the multiple objects. In another example, a combination including the multiple 3D virtual images is determined, and then it is determined which 3D virtual image in the combination is determined for each object. For example, the photographing posture database may store multiple combinations including multiple 3D virtual images, wherein postures of the multiple 3D virtual images in the combination may be relevant with each other (for example, the postures of the multiple 3D virtual images may be coordinated with each other).

According to an exemplary embodiment, the photographing posture database may further store photographing scene templates. A photographing scene template includes a 3D virtual image with a limited 3D space position and a limited 3D posture. If the photographing scene template is selected, the 3D space position and the 3D posture may not be further configured, and the photographing may be directly performed based on the 3D virtual image in the photographing scene template. In an example, after the photographing scene template is selected, the 3D virtual image in the photographing scene template may be changed, and the changed 3D virtual image may still have the 3D space position and the 3D posture of the original 3D virtual image in the photographing scene template.

In addition, the photographing scene template may not only include the 3D virtual image, but also may include an assistant option such as a photograph related object. Accordingly, the photographing scene template may represent a corresponding photographing scene by limiting various relations between the 3D virtual image and the assistant option. For example, some postures photographed by using a position may be assisted with a specific environment or a specific object (e.g., a sun, a sculpture, a building, etc.). The environment or the object is the photograph related object. The photographing scene template may be a real image, i.e., a photograph, a schematic diagram illustrating a combination of a person posture skeleton and a real background, or a schematic diagram illustrating a person posture skeleton and a photograph related object. Classic photographing postures may be obtained through the internet, and a photographing posture assisted with an environment or an object may be determined in the classic photographing postures. The environment or the object may be marked as the photograph related object, and the attributes of the photograph related object (e.g., color, sharpness) may be stored in the photographing posture database.

According to an exemplary embodiment, the 3D virtual image used to represent the target object may be configured in default in the image capturing apparatus 100, and the image capturing apparatus 100 may automatically determine the 3D virtual image used to represent the target object, or may select the 3D virtual image used to represent the target object according to the user input.

In an example of selecting the 3D virtual image used to represent the photograph according to the user input, the 3D virtual image used to represent the photograph may be selected according to at least one of an user voice operation, an physical button operation, a touch screen operation, a gesture, an operation for an augment reality human-computer interaction interface and an operation for an external controller.

In an example of selecting the 3D virtual image according to the user voice operation, if a voice command "select a first 3D virtual image" is received, the speech recognition is performed for the voice command, to select the first 3D virtual image to represent the target object.

In an example of selecting the 3D virtual image according to the user physical button operation, the operated physical button may be a home button (a main-screen button), a volume adjustment button, a power button, another newly-added button, etc. For example, the user moves a selection box through the volume adjustment button to select the 3D virtual image, and then determines selection through the home button.

In an example of selecting the 3D virtual image according to the touch screen operation, the user may click a certain 3D virtual image or a selection box used to select the certain 3D virtual image through a pre-defined manner, wherein the preset manner may be short press, long press, short press a preset number of times, alternating short press and long press. Alternatively, the user may drag the certain 3D virtual image.

Figure 6:
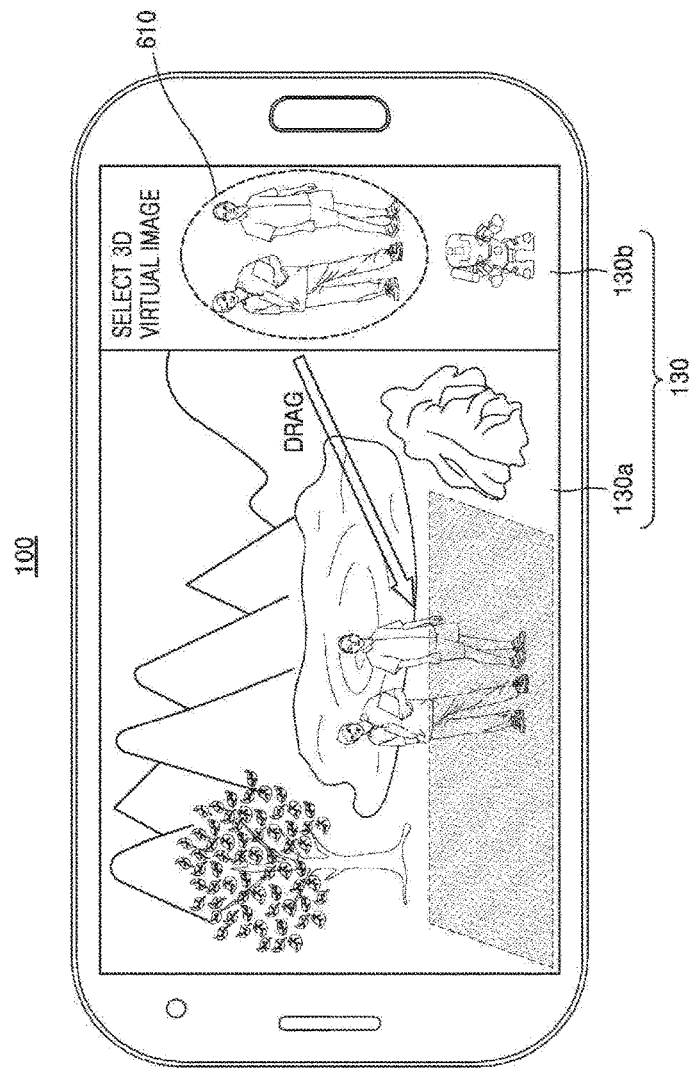
FIG. 6 illustrates an example of selecting a 3D virtual image, according to an exemplary embodiment.

FIG. 6 illustrates an example of selecting a 3D virtual image, according to an exemplary embodiment.

Referring to FIG. 6, a smartphone is illustrated as an example of the image capturing apparatus 100. A display 130 of the image capturing apparatus 100 may be divided into a display region 130a and a menu region 130b. The display region 130a may be used to display an obtained background image, a determined 3D virtual image, and a target object. The menu region 130b may be used to provide a menu based on an image capturing method and allow a user to select the menu. The menu region 130b may display a <select a 3D virtual image> message and one or more 3D virtual images that are selectable by the user. The user may select a combination 610 including two 3D virtual images. For example, two 3D virtual images may be selected by a user gesture of selecting and dragging the 3D virtual images to the display region 130a.

The user gesture to select one or more 3D virtual images may be performed with a single hand or two hands. Examples of the gesture may include, but are not limited to, waving, drawing a circle, drawing a square, drawing a triangle, waving a hand up, waving a hand down, waving a hand to left or waving a hand to right. The user gesture may be detected and recognized by a current posture detection device.

Figure 7:
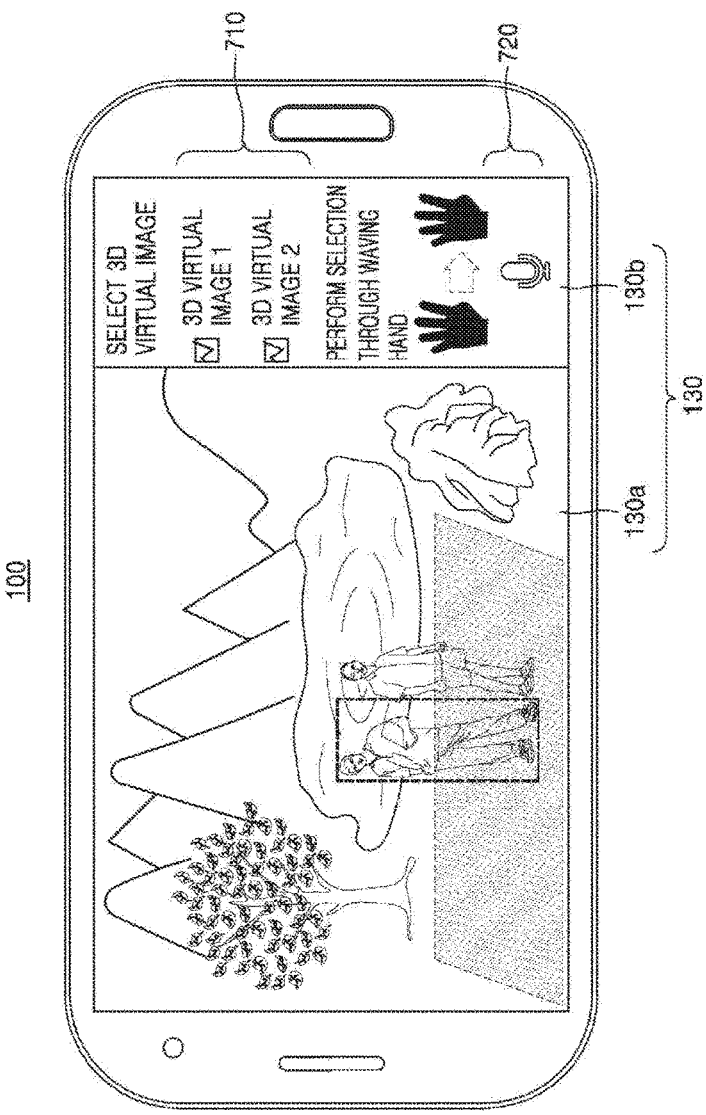
FIG. 7 illustrates another example of selecting a 3D virtual image, according to an exemplary embodiment.

FIG. 7 illustrates another example of selecting a 3D virtual image, according to an exemplary embodiment.

Referring to FIG. 7, the 3D virtual images representing two target objects are successively selected. After a 3D virtual image corresponding to each target object is selected, multiple 3D virtual images may be presented for user selection. The selection box 710 may be selected according to the user gesture of waving a hand up, waving a hand down, waving a hand to left or waving a hand to right (for example, if the user gesture of waving a hand up is detected, a selection label, e.g., a cursor or a highlight, may be moved up to the selection box of the 3D virtual image to be selected), and the selection may be determined according to the user gesture of drawing a circle with hand. In addition, the selection may be performed through a voice operation 720.

According to an exemplary embodiment, the 3D virtual image may be selected according to the user operation for the external controller (for example, an operation for a handwriting pen associated with the image capturing apparatus, an operation for a device with a remote control function such as a wearable device). That is, the 3D virtual image is selected according to a command from the external controller. For example, when the image capturing apparatus is connected with a handwriting pen (e.g., a stylus pen), the 3D virtual image may be selected according to a command from the handwriting pen. The user may move a selection box to select the 3D virtual image by using a button on the handwriting pen, and may determine the selection by clicking the selected 3D virtual image through the handwriting pen.

It should be understood that, in operation 410, no matter which kind of the 3D virtual image is determined or no matter through which manner the 3D virtual image is determined, the user may re-determine the 3D virtual image in subsequent operations to change 3D virtual image that has been determined.

<Obtaining Background Image>

The procedures of obtaining a background image with depth information are described in operation 420 and are described in detail as follows.

The background image may be a photograph of a scene where the photographing is performed (i.e., a scene image that has been captured), or may be a preview image of the scene where the photographing is performed (i.e., a preview scene image captured by a camera in real time).

The background image with depth information may be obtained through a depth camera of the image capturing apparatus, or may be obtained through a camera array including two or more cameras, wherein the two or more cameras in the camera array have overlapped view angles to obtain the depth information.

It should be understood that an order of operations 410 and 420 is not limited to a specific one. For example, operation 420 may be performed prior to operation 410. Alternatively, operation 410 and operation 420 may be simultaneously performed.

According to an exemplary embodiment, the 3D virtual image used to represent the target object may be determined first, and then the background image with the depth information may be obtained. For example, after a camera application is started, a user interface for selecting the 3D virtual image may be presented to the user first, and then the background image with the depth information may be obtained after the user completed selecting the 3D virtual image.

According to another exemplary embodiment, the background image with the depth information is obtained first, and then the 3D virtual image used to represent the target object may be determined. For example, after a camera application is started, the background image with the depth information is obtained, and then a user interface for a user to select the 3D virtual image to represent the target object is presented.

<Configuring 3D Virtual Image in Background Image>

Procedures of configuring the 3D virtual image in the background image in operation 430 are described in detail as follows.

According to an exemplary embodiment, the photographing effect of the target object may be simulated by configuring the 3D virtual image in the background image with the depth information, so that a user may learn the photographing effect in advance before the photographing is performed.

After the 3D virtual image used to represent the target object is determined, the determined 3D virtual image is in a movable status. The 3D virtual image may be configured in the background image according to the user operation, or may be automatically configured in the background image. In an example, a position and/or a posture of the 3D virtual image in the 3D space of the background image may be configured.

If the 3D space position of the 3D virtual image is configured in the background image, positions of the 3D virtual image respectively along a horizontal direction, a vertical direction and a depth direction may be configured. The 3D space position of the 3D virtual image may be roughly configured in the background image, or may be accurately configured in the background image, or may be firstly roughly configured and then accurately adjusted in the background image. Thus, an order of performing such procedures is not limited to a specific one.

According to an exemplary embodiment, a rough 3D space position of the 3D virtual image may be configured automatically or manually, i.e., according to the user operation. In case of the manual configuration, the selected 3D virtual image may be moved in the background image according to the user operation (e.g., dragging, etc.). Initially, the posture of the 3D virtual image may be set to a default posture, and the user may subsequently adjust the posture of the 3D virtual image. As illustrated in FIG. 6, the 3D virtual image may be configured on a position in the background image through the user operation of dragging the selected 3D virtual image to the position in the background image. Alternatively, the 3D virtual image may be configured on the position designated by the user in the background image. For example, when the selected 3D virtual image is in a status to be located, the 3D virtual image may be configured on a certain position in the background image through the user operation of clicking the position in the background image. In addition, the 3D space position of the 3D virtual image may be roughly configured in the background image through another user operation.

According to an exemplary embodiment, the user may be notified about whether a region where each piece of content is located is suitable to position the 3D virtual image. For example, before the user configures the 3D space position of the 3D virtual image in the background image, the user may be notified about whether a region where each piece of content is located is suitable to position the 3D virtual image. Thus, when the user configures the 3D space position of the 3D virtual image in the background image, the user can learn which position is suitable to position the 3D virtual image and which position is not suitable to position the 3D virtual image. In another example, when the user positions the 3D virtual image in a region not suitable to position the 3D virtual image, the user is notified that the region is not suitable to position the 3D virtual image, or the user is further informed as to how to suitably position the 3D virtual image in the region.

Figure 8:
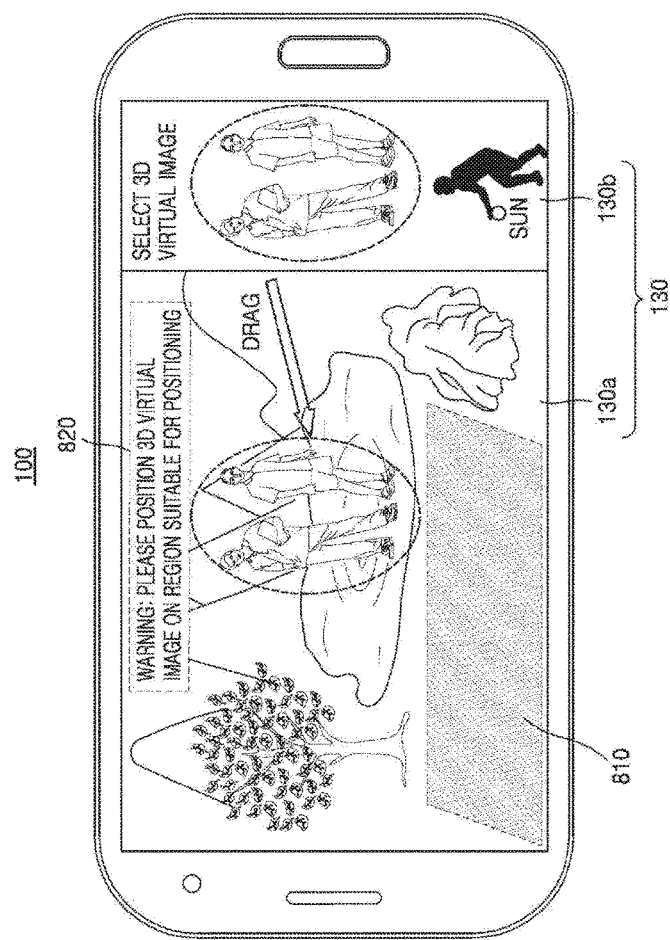
FIGS. 8 and 9 illustrate examples of notifying a user about a position region, according to an exemplary embodiment.
Figure 9:
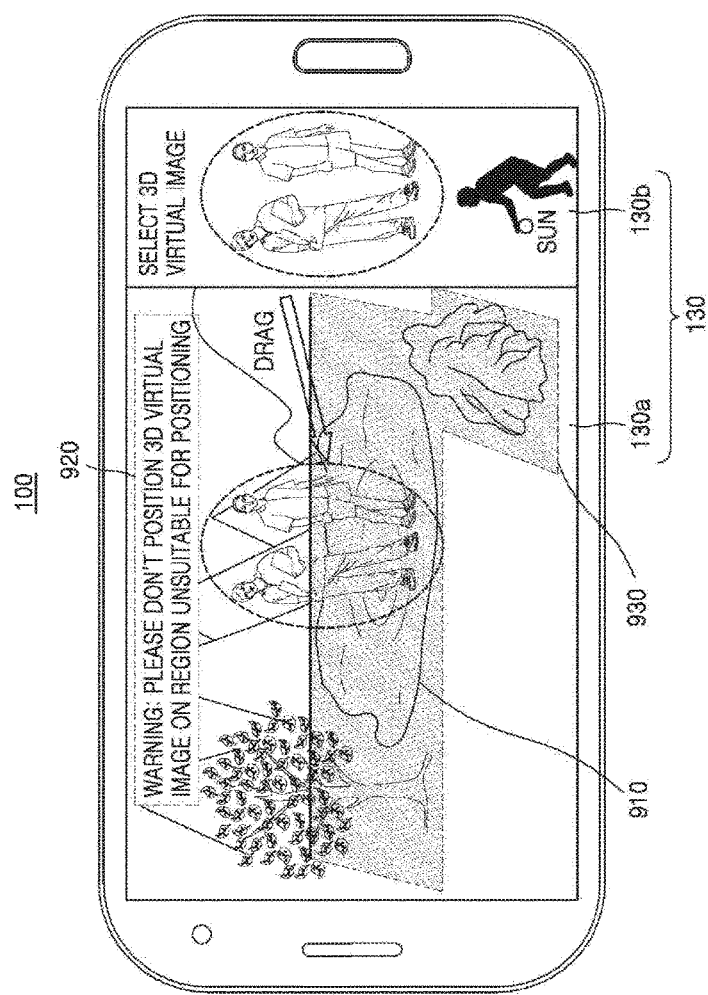

FIGS. 8 and 9 illustrate examples of notifying a user about a position region, according to an exemplary embodiment.

As illustrated in FIG. 8, the region 810, e.g., the ground, may be marked as suitable to position the 3D virtual image. Optionally, to guide the user to position the 3D virtual image in a region suitable to position the 3D virtual image, a message 820 may be presented to the user.

As illustrated in FIG. 9, some regions, e.g., water or an obstruction region, may be marked as unsuitable. Optionally, when the user positions the 3D virtual image in the region not suitable to position the 3D virtual image, a message 920 may be presented to the user.

According to an exemplary embodiment, each piece of content in the background image may be analyzed, to notify the user whether a region where each piece of content is located is suitable to position the 3D virtual image. For example, according to a pre-established scene element database, various pieces of the content in the background image are segmented, and an attribute of each piece of the content is analyzed to determine whether the content is water, an obstruction, a ground, etc., to determine whether the region where the piece of the content is located is suitable to position the 3D virtual image. In addition, the user may manually mark the region as unsuitable to position the 3D virtual image in the background image.

In an exemplary embodiment of automatically and roughly configuring the 3D space position of the 3D virtual image in the background image, the 3D virtual image may be automatically configured on a suitable position in the background image. For example, the suitable position may be a center position in the background image, or may be a position where the whole 3D virtual image may be positioned in the background image. At this time, the posture of 3D virtual image may be a default posture, and subsequently, the user may accurately adjust the posture of the 3D virtual image.

According to an exemplary embodiment, the 3D space position and/or the 3D posture of the 3D virtual image may be automatically configured in the background image according to a photographing scene template. For example, if the selected photographing scene template does not include a photograph related object, the 3D virtual image may be automatically configured in a suitable position. The 3D posture of the 3D virtual image may be automatically configured according to a posture of a person in the template, and subsequently, the user may accurately adjust the 3D space position and/or the 3D posture of the 3D virtual image. In addition, since the photographing scene limits the 3D space position and the 3D posture of the person, the 3D space position and the 3D posture of the 3D virtual image may be automatically configured according to the 3D space position and the 3D posture of the person in the photographing scene template.

According to an exemplary embodiment, if the selected photographing scene template includes the photograph related object, the 3D posture may be configured based on the photograph related object of the 3D virtual image in the background image, wherein the relation between the photograph related object and the 3D virtual image may be limited in the pre-configured photographing scene template. In this condition, the user may be requested to select the photograph related object in the background image, or the photograph related object in the background image may be automatically detected according to the corresponding photograph related object in the photographing scene template. For example, characteristics of the photograph related object in the photographing scene is studied according to a machine learning method, or the photograph related object in the photographing scene template and various pieces of content in the background image are compared with each other to determine whether the background image includes the photograph related object consistent with the photograph related object in the photographing scene template. If it is determined that the background image does not include the photograph related object consistent with the photograph related object in the photographing scene template, the background image may be re-obtained, or the user is requested to manually select the photograph related object. If it is determined that the background image includes the photograph related object consistent with the photograph related object in the photographing scene template, the suitable 3D space position and/or the suitable 3D posture of the 3D virtual image are automatically configured in the background image according to the photograph related object.

For example, the 3D space position and/or the 3D posture of the 3D virtual image in the background image may be configured based on a size, a 3D space position, and/or a 3D posture of the photograph related object of the 3D virtual image in the background image, wherein a 3D space position relation and/or a 3D posture relation between the photograph related object of the 3D virtual image and the 3D virtual image are limited in the preset photographing scene template.

For example, a size of the 3D virtual image in the background image may be determined according to a size proportion of the photograph related object respectively in the photographing scene template and in the background image. The 3D space position and/or the 3D posture of the 3D virtual image in the background image may be determined according to the 3D space position relation between the photograph related object and the 3D virtual image in the photographing scene template, the 3D space position of the photograph related object in the background image and a size of the 3D virtual image in the background image.

Figure 10:
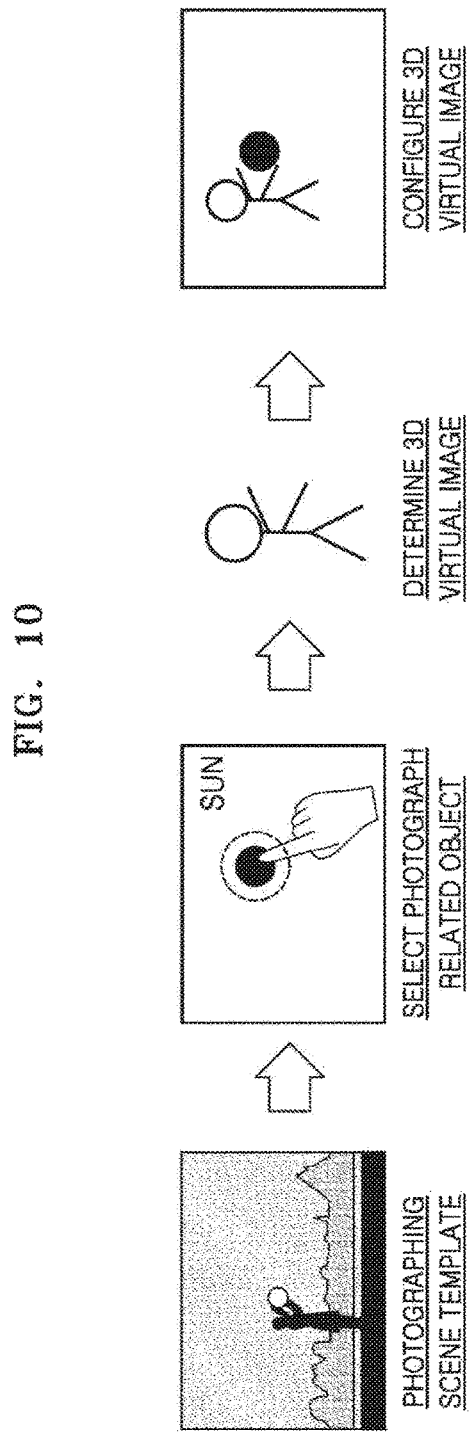
FIG. 10 illustrates an example of automatically configuring a 3D space position of a 3D virtual image, according to an exemplary embodiment.

FIG. 10 illustrates an example of automatically configuring a 3D space position of a 3D virtual image, according to an exemplary embodiment.

As illustrated in FIG. 10, according to a user operation, a photographing scene template "holding the sun with hands" is selected, and the user is requested to select the photograph related object the "sun". After the "sun" is selected, at least one of a 3D space position, a 3D posture and a size of the 3D virtual image is automatically calculated, and the 3D space position and/or the 3D posture of the 3D virtual image is configured in the background image. If the position of the "sun" in the background image is not suitable, the user is notified that configuration fails, and a reason is displayed. In addition, after the position of the 3D virtual image is automatically configured, the configured position may be further adjusted according to the user manual operation.

In an example of accurately configuring the 3D space position of the 3D virtual image in the background image, the 3D space position of the 3D virtual image in the background image may be accurately configured according to various user operations. For example, accurate configuration may be implemented according to a user operation such as a voice operation, a physical button operation, a touch screen operation, a gesture, an operation for an augment reality human-computer interaction interface, an operation for an external controller, etc.

According to an exemplary embodiment, the 3D space position of the 3D virtual image in the background image may be configured according to a user voice operation.

In an example of configuring the 3D space position of the 3D virtual image in the background image according to the user voice operation, if a voice command from the user "take the camera as an origin, move the 3D virtual image 1 m to left and 3 m backward" is received, the speech recognition is performed for the voice command, and it is determined to move the 3D virtual image 1 m to left and 3 m backward in the background image. In addition, if a simple voice command from the user "move 4 m to right" is received, the speech recognition is performed for the voice command, and it is further determined that the user voice command is used to move the 3D virtual image 4 m to right in the background image.

According to an exemplary embodiment, the 3D space position of the 3D virtual image in the background image may be configured according to a user physical button operation.

In an example of configuring the 3D space position of the 3D virtual image in the background image according to the user physical button operation, the operated physical button may be a home button (main screen button), a volume adjustment button, a power button, and another newly-added button. For example, the user may determine a moving direction (i.e., one of a horizontal direction, a vertical direction and a depth direction) by simultaneously pressing a button of tuning up volume and a button of tuning down volume in volume adjustment buttons. For example, an initial default moving direction is the horizontal direction. The user may select the vertical direction as the moving direction by simultaneously pressing the button of tuning up volume and the button of tuning down volume in the volume adjustment buttons, and then may select the depth direction as the moving direction by simultaneously re-pressing the button of tuning up volume and the button of tuning down volume. The user may be notified about the currently-selected moving direction through a manner such as a text, an icon, etc. After determining the moving direction, the user may move the position of the 3D virtual image in the determined direction by independently pressing the button for tuning up volume or the button for tuning down volume. For example, the 3D virtual image is moved to the left by independently pressing the button for tuning up volume, the 3D virtual image is moved to the right by independently pressing the button for tuning down volume, the 3D virtual image is moved up by independently pressing the button for tuning up volume, the 3D virtual image is moved down by independently pressing the button for tuning down volume, the 3D virtual image is moved forward by independently pressing the button for tuning up volume, and the 3D virtual image is moved backward by independently pressing the button for tuning down volume. After the configuration is completed, determination is performed by pressing the home button.

According to an exemplary embodiment, the 3D space position of the 3D virtual image in the background image may be configured according to a user touch screen operation.

In an example of configuring the 3D space position of the 3D virtual image in the background image according to the user touch screen operation, the user may move a horizontal position and a vertical position of the 3D virtual image by dragging the determined 3D virtual image via a single finger, or may configure the horizontal position and the vertical position of the 3D virtual image by sliding to the horizontal direction and sliding to the vertical direction on the screen, or may configure the depth position of the 3D virtual image through touch actions such as closing two fingers, opening two fingers. Similarly, different directions are adjusted by touch actions such as short press, long press, short press a preset number of times, alternating short press and long press. In addition, the user may configure the 3D space position of the 3D virtual image in the background image through sliding a scroll bar in a user interface, inputting corresponding content in a text box.

Figure 11:
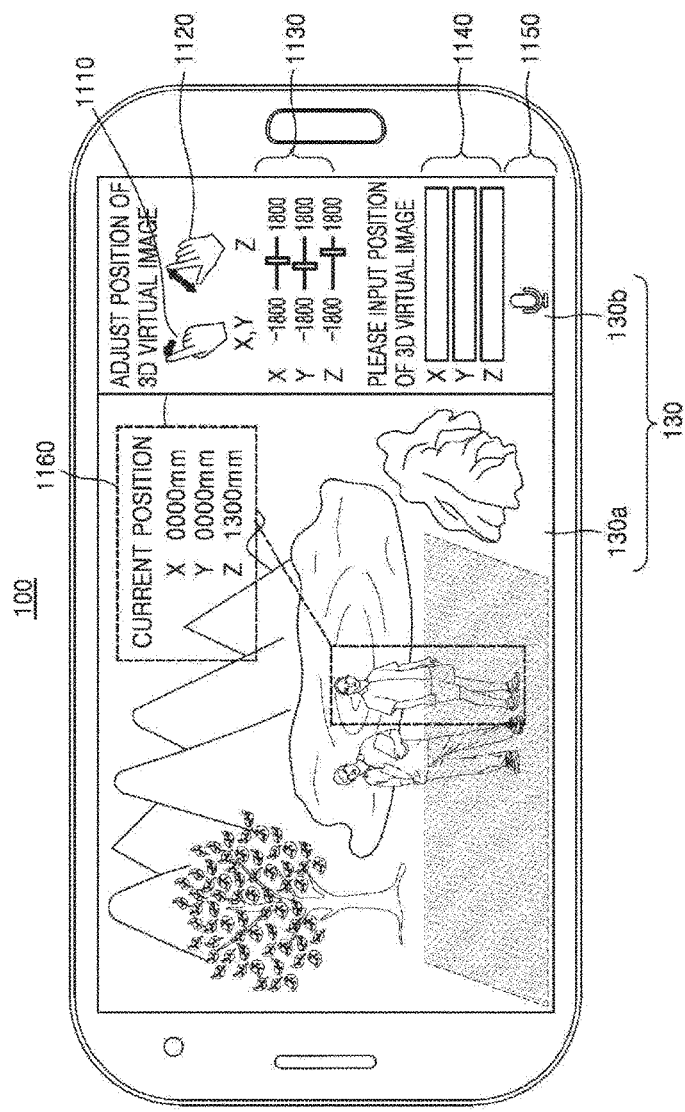
FIG. 11 illustrates an example of configuring a 3D space position of a 3D virtual image, according to an exemplary embodiment.

FIG. 11 illustrates an example of configuring a 3D space position of a 3D virtual image, according to an exemplary embodiment.

Referring to FIG. 11, the user may configure the 3D space position of the selected 3D virtual image in the background image through an operation 1110 of dragging the 3D virtual image via a single finger, an operation 1120 of closing and/or opening two fingers, an operation 1130 of sliding a scroll bar, an operation 1140 of inputting corresponding content in a text box, a voice operation 1150, etc. In addition, a notification 1160 indicating the current 3D space position of the selected 3D virtual image may be output for the user.

If the 3D space position of the 3D virtual image in the background image is configured according to the user gesture, the gesture may be performed with a single hand or two hands. Examples of the gesture may include, but are not limited to, waving a hand, drawing a circle, drawing a square, and drawing a triangle. For example, the user may move the selected 3D virtual image to the corresponding direction through the gesture such as waving a hand up, waving a hand down, waving a hand to left, waving a hand to right, waving a hand to upper left, or waving a hand to bottom left. Then, it is determined that the moving finishes through the gesture of drawing the circle with hand. The user gesture may be detected and recognized through an existing gesture detection device.

The 3D space position of the 3D virtual image in the background image may be configured according to the user operation for the external controller (e.g., an operation for a handwriting pen associated with the image capturing apparatus, an operation for a device with a remote control function such as a wearable device). For example, when the image capturing apparatus is connected with a handwriting pen, the 3D virtual image is selected according to a command from the handwriting pen, and then the user may move the 3D virtual image by using a button on the handwriting pen and sliding a point of the handwriting pen. For example, the user may use the point of the handwriting pen to press the 3D virtual image, simultaneously press the button on the handwriting pen, and the point being sliding is displayed on the screen of the image capturing apparatus, to drag the 3D virtual image to a desired position.

In addition, if the background image is a panoramic image, the panoramic image and the 3D virtual image viewed from different angles may be displayed for the user (e.g., the panoramic image and the 3D virtual image may be simultaneously rotated to left with 90 degrees), so that the user can conveniently configure the 3D space position of the 3D virtual image in the background image. For example, the user may obtain the position of the 3D virtual image on the depth direction according to a profile image obtained by simultaneously rotating the panoramic image and the 3D virtual image to left with 90 degrees.

In an example of configuring the 3D posture of the 3D virtual image in the background image according to the user operation, the 3D posture of the 3D virtual image may be configured by configuring a rotation angle of the 3D virtual image and/or a 3D space position of a joint point of the 3D virtual image. The rotation angles of the 3D virtual image respectively along rotation axes on the three directions may be configured. For example, a gravity center or a center of the 3D virtual image may be configured as an origin of rotation, and the rotation is performed in a corresponding plane. Alternatively, the origin of the rotation may be configured by the user.

A rotation angle of the 3D virtual image may be configured in various manners. For example, the rotation angle may be configured according to a voice operation, a physical button operation, a touch screen operation, a gesture, an operation for an augment reality human-computer interaction interface, an operation for an external controller, etc.

According to an exemplary embodiment, the rotation angle of the 3D virtual image may be configured according to a user voice operation.

In an example of configuring the rotation angle of the 3D virtual image according to the user voice operation, if a voice command "take the center of the 3D virtual image as the origin, rotate 10 degrees along a clockwise direction" is received from the user, the speech recognition is performed for the voice command, to take the center of the 3D virtual image as the origin, and rotate 10 degrees along the clockwise direction in the corresponding plane.

According to an exemplary embodiment, the rotation angle of the 3D virtual image may be configured according to a user physical button operation.

In an example of configuring the rotation angle of the 3D virtual image according to the user physical button operation, the operated physical button may be a home button, a volume adjustment button, a power button, and another newly-added button. For example, the user may determine along which axis (e.g., one of a center horizontal axis, a center vertical axis and a center depth axis) the rotation is performed by simultaneously pressing a button of tuning up volume and a button of tuning down volume in the volume adjustment buttons. At this time, the user may be notified about the currently-selected rotation axis in a manner such as a text, an icon, etc. After the rotation axis is determined, the rotation angle may be adjusted by independently pressing the button of tuning on volume or the button of tuning down volume. For example, the user determines to perform rotation along the center vertical axis by simultaneously pressing the button of tuning up volume and the button of tuning down volume in the volume adjustment buttons, rotates the 3D virtual image along the clockwise direction by independently pressing the button of tuning on volume, rotates the 3D virtual image along the anticlockwise direction by independently pressing the button of tuning down volume, and at last performs determination by pressing the home button.

According to an exemplary embodiment, the rotation angle of the 3D virtual image may be configured according to a user touch screen operation.

In an example of configuring the rotation angle of the 3D virtual image according to the user touch screen operation, the user may adjust each rotation angle by sliding a scroll bar or inputting corresponding content in a text box. In addition, the user may adjust each rotation angle by dragging the 3D virtual image to rotate the 3D virtual image.

Figure 12:
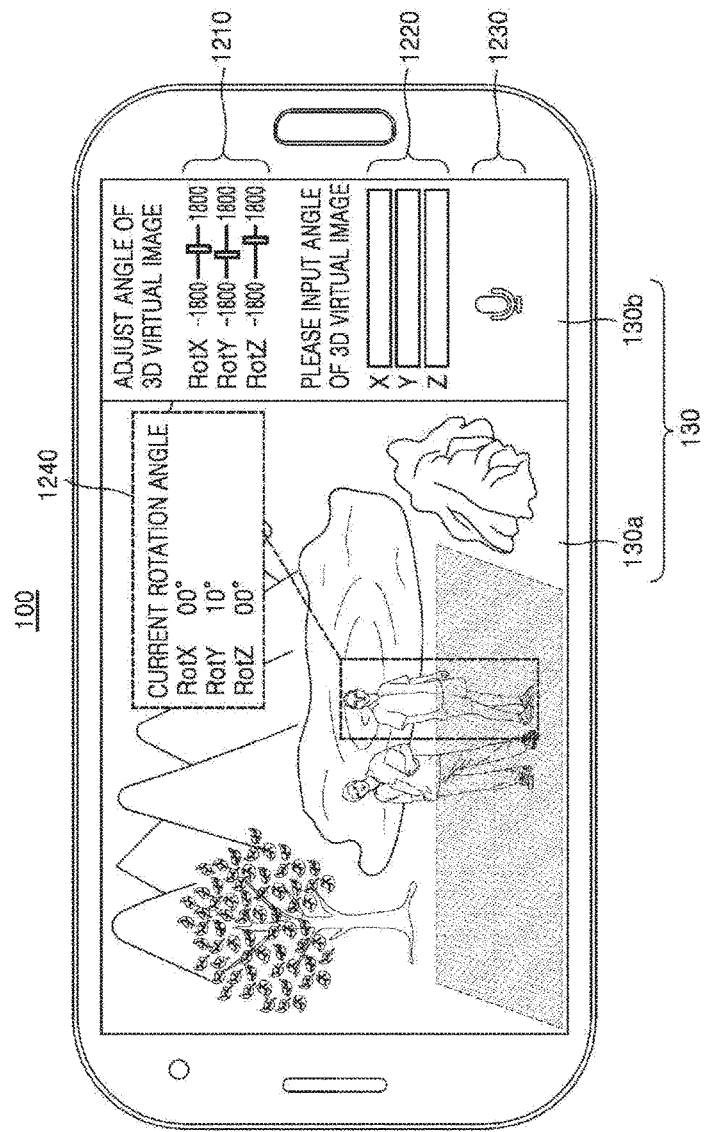
FIG. 12 illustrates an example of configuring a rotation angle of a 3D virtual image, according to an exemplary embodiment.

FIG. 12 illustrates an example of configuring a rotation angle of a 3D virtual image according to an exemplary embodiment.

Referring to FIG. 12, the user may configure the rotation angle of the 3D virtual image in the background image by an operation 1210 of sliding a scroll bar, an operation 1220 of inputting corresponding content in a text box, a voice operation 1230, etc. In addition, a notification 1240 indicating the current rotation angle of the selected 3D virtual image may be output to the user.

In an example of configuring the rotation angle of the 3D virtual image according to the user gesture, the gesture may be performed with a single hand or two hands. Examples of the gesture may include, but are not limited to, waving a hand, drawing a circle, drawing a square, drawing a triangle. For example, the user may rotate the 3D virtual image through the gesture such as waving a hand up, waving a hand down, waving a hand to left, waving a hand to right, waving a hand to upper left, or waving a hand to bottom left. Then, it is determined that the rotation finishes through the gesture of drawing the circle with hand. The user gesture may be detected and recognized through the existing gesture detection device.

In an example of configuring the rotation angle of the 3D virtual image according to the operation for the external controller (e.g., an operation for a handwriting pen associated with the image capturing apparatus, an operation for a device with a remote control function such as a wearable device), when the image capturing apparatus is connected with the handwriting pen, the 3D virtual image is selected according to a command from the handwriting pen, and then the user may rotate the 3D virtual image by using a button on the handwriting pen and sliding a point of the handwriting pen.

In addition, the user may simultaneously configure the 3D space position and the rotation angle of the 3D virtual image. For example, the user may simultaneously configure the 3D space position and the rotation angle according to various user operations. For example, the configuration may be performed according to a user operation such as a voice operation, a physical button operation, a touch screen operation, a gesture, an operation for an augment reality human-computer interaction interface, and an operation for an external controller.

According to an exemplary embodiment, the 3D space position and the rotation angle of the 3D virtual image may be simultaneously configured according to a user voice operation.

In an example of simultaneously configuring the 3D space position and the rotation angle of the 3D virtual image according to the user voice operation, when a voice command from the user "move the 3D virtual image 1 m to left and 3 m backward, take the center of the 3D virtual image as the origin, rotate 10 degrees to left" is received, the speech recognition is performed for the voice command, to determine that the 3D virtual image is moved 1 m to left and 3 m backward, and is rotated 10 degrees along the clockwise direction by taking the center of the 3D virtual image as the origin.

According to an exemplary embodiment, the 3D space position and the rotation angle of the 3D virtual image may be simultaneously configured according to a user physical button operation.

In an example of simultaneously configuring the 3D space position and the rotation angle of the 3D virtual image according to the user physical button operation, the operated physical button may be a home button, a volume adjustment button, a power button, and another newly-added button. For example, the user may determine a moving direction or along which axis the rotation is performed by simultaneously pressing a button of tuning up volume and a button of tuning down volume in the volume adjustment buttons. At this time, the user may be notified about the currently-selected moving rotation or the currently-selected rotation axis in a manner such as a text, an icon, etc. After determining the moving direction or the rotation axis, the user may adjust the moving of the 3D virtual image on the determined direction or the rotation of the 3D virtual image along the determined rotation axis by independently pressing the button for tuning up volume or the button for tuning down volume.

According to an exemplary embodiment, the 3D space position and the rotation angle of the 3D virtual image may be simultaneously configured according to a user touch screen operation.

In an example of simultaneously configuring the 3D space position and the rotation angle of the 3D virtual image according to the user touch screen operation, the user may perform the configuration by sliding a scroll bar or inputting corresponding content in a text box. In addition, the user may perform the configuration by dragging the 3D virtual image to move or rotate the 3D virtual image. For example, the user may drag the 3D virtual image via a single finger to move the 3D virtual image, and may drag the 3D virtual image via two fingers to rotate the 3D virtual image.

According to an exemplary embodiment, the 3D space position and the rotation angle of the 3D virtual image may be simultaneously configured according to a user gesture.

In an example of simultaneously configuring the 3D space position and the rotation angle of the 3D virtual image according to the user gesture, the gesture may be performed with a single hand or two hands. Examples of the gesture may include, but are not limited to, waving a hand, drawing a circle, drawing a square, drawing a triangle. For example, the user may trigger the procedures of configuring the rotation angle of the 3D virtual image through the gesture of drawing a triangle with hand, and rotates the 3D virtual image through the gesture such as waving a hand up, waving a hand down, waving a hand to left, waving a hand to right, waving a hand to upper left, or waving a hand to bottom left. The user may trigger the procedures of configuring the 3D space position of the 3D virtual image through the gesture of drawing a square with hand, and moves the 3D space position of the 3D virtual image through the gesture such as waving a hand up, waving a hand down, waving a hand to left, waving a hand to right, waving a hand to upper left, or waving a hand to bottom left. Then, it is determined that the configuration finishes through the gesture of drawing the circle with hand.

According to an exemplary embodiment, the 3D space position and the rotation angle of the 3D virtual image may be simultaneously configured according to a user operation for an external controller.

In an example of simultaneously configuring the 3D space position and the rotation angle of the 3D virtual image according to the user operation for the external controller (e.g., an operation for a handwriting pen associated with the image capturing apparatus, an operation for a device with a remote control function such as a wearable device), when the image capturing apparatus is connected with the handwriting pen, the 3D virtual image is selected according to a command from the handwriting pen, and then the user may move and/or rotate the 3D virtual image by using the button on the handwriting pen and sliding a point of the handwriting pen.

If the 3D posture of the 3D virtual image is configured by configuring the 3D space position of the joint point of the 3D virtual image, the joint point of the 3D virtual image may be selected according to various user operations. For example, the joint point may be selected according to a user operation such as a voice operation, a physical button operation, a touch screen operation, a gesture, an operation for an augment reality human-computer interaction interface, and an operation for an external controller.

In an example of selecting the joint point of the 3D virtual image according to the user voice operation, when a voice command from the user "select the left hand" is received, the speech recognition is performed for the voice command, to select the joint point of the left hand of the 3D virtual image.

According to an exemplary embodiment, the joint point of the 3D virtual image may be selected according to the user physical button operation.

In an example of selecting the joint point of the 3D virtual image according to the user physical button operation, the operated physical button may be a home button, a volume adjustment button, a power button, and another newly-added button. For example, the user may move a selection box through the volume adjustment button to select the joint point of the 3D virtual image, and then the selection is determined by pressing the home button.

In an example of selecting the joint point of the 3D virtual image according to the user touch screen operation, the user may click a joint point of the 3D virtual image to select the joint point of the 3D virtual image through a pre-defined manner, wherein the preset manner may be, for example, short press, long press, short press a preset number of times, or alternating short press and long press.

Figure 13:
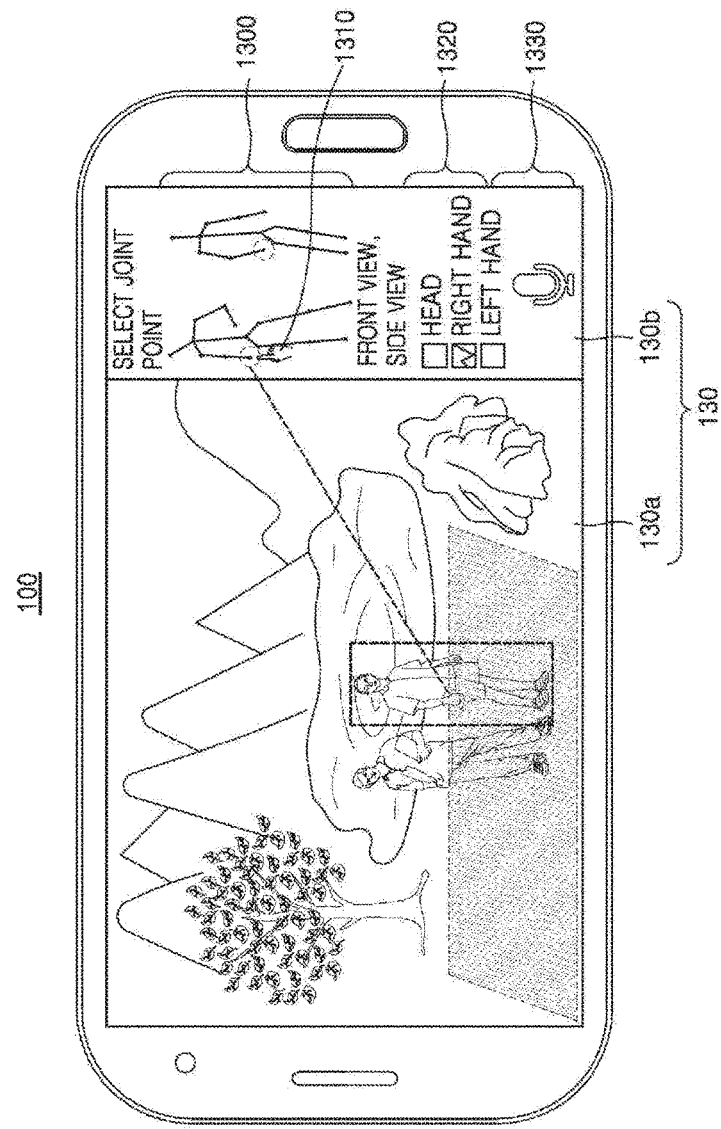
FIG. 13 illustrates an example of selecting a joint point of a 3D virtual image, according to an exemplary embodiment.

FIG. 13 illustrates an example of selecting a joint point of a 3D virtual image, according to an exemplary embodiment.

Referring to FIG. 13, the joint point may be displayed in a manner that user's convenience in selecting the joint point of the 3D virtual image is maximized. In addition, 3D virtual images 1300 viewed from different angles may be displayed, to which colors are applied. Thus, the user can conveniently select the joint point of the 3D virtual image. The joint point of the 3D virtual image may be selected through the user operation such as an operation 1310 of clicking the joint point of the 3D virtual image, an operation 1320 of selecting the selectable box, a user voice operation 1330, etc.

The gesture to select the joint point of the 3D virtual image may be performed with a single hand or two hands. Examples of the gesture may include, but are not limited to, waving a hand, drawing a circle, drawing a square, drawing a triangle, waving a hand up, waving a hand down, waving a hand to left or waving a hand to right. For example, the user may select the selection box used to select the joint point of the 3D virtual image through gestures of waving a hand up, waving a hand down, waving a hand to left and waving a hand to right, and then the selection is determined through the gesture of drawing the circle with hand. The user gesture may be detected and recognized through the existing gesture detection device.

In an example of selecting the joint point of the 3D virtual image according to the user operation with an external controller (e.g., an operation for a handwriting pen associated with the image capturing apparatus, an operation for a device with a remote control function such as a wearable device), when the image capturing apparatus is connected with the handwriting pen, the joint point of the 3D virtual image may be selected according to a command from the handwriting pen. For example, the user may move a selection box by using a button on the handwriting pen to select the 3D virtual image, and the selection may be determined by clicking the selected joint point of the 3D virtual image.

After the joint point of the 3D virtual image is selected, the selected joint point may be in a movable status. The 3D space position of the joint point of the 3D virtual image may be configured according to various user operations. For example, the selected joint point may be configured with positions respectively along the horizontal direction, the vertical direction and the depth direction in the background image. For example, the configuration may be performed through a user voice operation, a physical button operation, a touch screen operation, a gesture, an operation for an augment reality human-computer interaction interface, and an operation for an external controller.

According to an exemplary embodiment, the 3D space position of the joint point of the 3D virtual image may be configured according to the user voice operation.

In an example of configuring the 3D space position of the joint point of the 3D virtual image according to the user voice operation, when a voice command "move the left hand 4 cm up, and then move the left hand 3 cm backward" is received from the user, the speech recognition is performed for the voice command, to move the position of the joint point of the left hand of the 3D virtual image 4 cm up, and then move the position of the joint point 3 cm backward.

According to an exemplary embodiment, the 3D space position of the joint point of the 3D virtual image may be configured according to the user physical button operation.

In an example of configuring the 3D space position of the joint point of the 3D virtual image according to the user physical button operation, the operated physical button may be a home button, a volume adjustment button, a power button, and another newly-added button. For example, the user may determine a moving direction (i.e., one of the horizontal direction, the vertical direction, and the depth direction) by simultaneously pressing the button of tuning up volume and the button of tuning down volume in the volume adjustment buttons. At this time, the user may be notified about the currently-selected moving direction in a manner such as a text, an icon, etc. After determining the moving direction, the user may move the position of the selected joint point on the determined direction by independently pressing the button of tuning on volume or the button of tuning down volume. For example, the selected joint point may be moved to the left by independently pressing the button of tuning on volume, the selected joint point may be moved to the right by independently pressing the button of tuning down volume. After the configuration is completed, determination is performed by pressing the home button.

According to an exemplary embodiment, the 3D space position of the joint point of the 3D virtual image may be configured according to the user touch screen operation.

In an example of configuring the 3D space position of the joint point of the 3D virtual image according to the user touch screen operation, the user may move the horizontal position and the vertical position of the 3D virtual image by dragging the selected 3D virtual image via a single finger, or may configure the horizontal position and the vertical position of the 3D virtual image by sliding along the horizontal direction and sliding along the vertical direction on the screen. Different directions of a joint point of a person model are adjusted through touch actions such as short press, long press, short press a preset number of times, alternating short press and long press. In addition, the user may configure the 3D space position of the selected joint point in the background image by sliding a scroll bar, or by inputting corresponding content in a text box.

Figure 14:
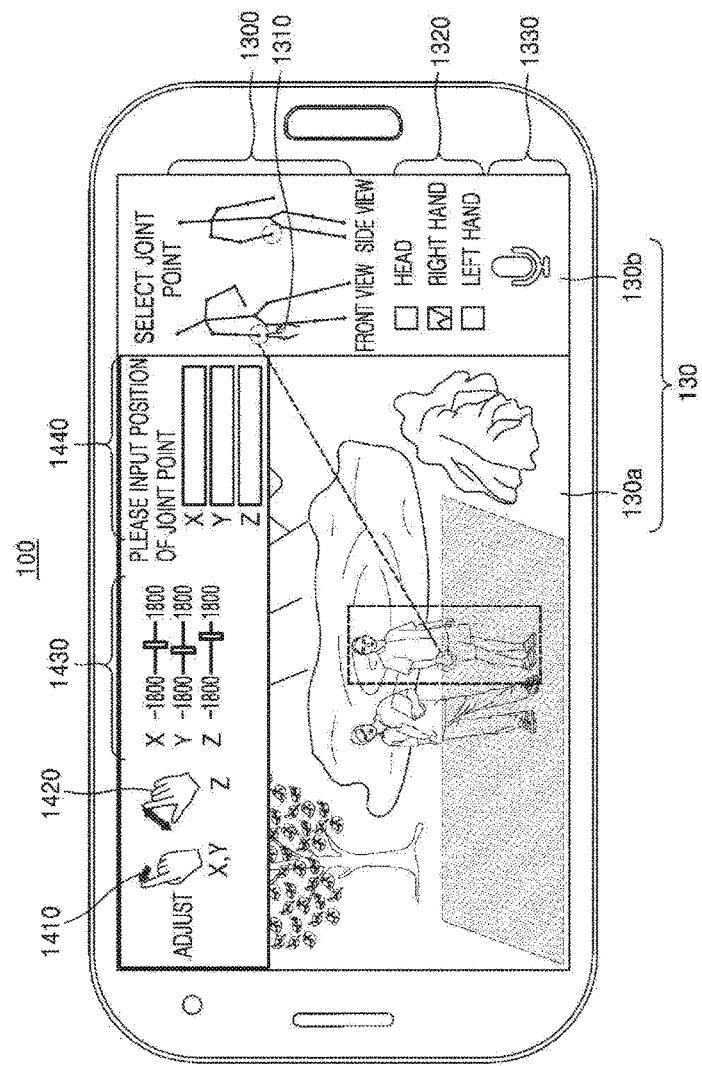
FIG. 14 illustrates an example of configuring a 3D space position of a joint point of a 3D virtual image, according to an exemplary embodiment.

FIG. 14 illustrates an example of configuring a 3D space position of a joint point of a 3D virtual image, according to an exemplary embodiment.

Referring to FIG. 14, the user may configure the 3D space position of the selected joint point of the 3D virtual image in the background image through an operation 1410 of dragging the joint point through a single finger, an operation 1420 of closing and/or opening two fingers, an operation 1430 of sliding a scroll bar, an operation 1440 of inputting corresponding content in a text box, and a voice operation 1330.

According to an embodiment, the 3D space position of the joint point of the 3D virtual image may be configured according to the user gesture operation.

In an example of configuring the 3D space position of the joint point of the 3D virtual image according to the user gesture, the gesture may be performed with a single hand or two hands. Examples of the gesture may include, but are not limited to, waving a hand, drawing a circle with hand, drawing a square with hand, drawing a triangle with hand. For example, the user may move the selected joint point to the corresponding direction through the gesture such as waving a hand up, waving a hand down, waving a hand to left, waving a hand to right. Then, it is determined that the moving finishes through the gesture of drawing the circle with hand. The user gesture may be detected and recognized through the existing gesture detection device.

According to an exemplary embodiment, the 3D space position of the joint point of the 3D virtual image may be configured according to the user operation for the external controller.

In an example of configuring the 3D space position of the joint point of the 3D virtual image according to the user operation for the external controller (e.g., an operation for a handwriting pen associated with the image capturing apparatus, an operation for a device with a remote control function such as a wearable device), when the image capturing apparatus is connected with the handwriting pen, the joint point of the 3D virtual image is selected according to a command from the handwriting pen, and then the user may move the selected joint point by using the button on the handwriting pen and sliding the point of the handwriting pen.

To make the 3D space position of the joint point configured by the user accurate and reasonable, an attribute of the configured joint point may be considered to configure the 3D space position of the joint point according to the user operation. For example, if the joint point configured according to the user operation is a mother joint point, a child joint point corresponding to the mother joint point may be moved along with the moving of the mother joint point. In addition, a feasibility of the user operation used to configure the 3D space position of the joint point is determined according to the attribute of the joint point, and the user is notified about the feasibility. For example, the feasibility of the user operation is determined according to an attribute that the 3D space position of the joint point is limited by a length of a corresponding skeleton.

Figure 15:
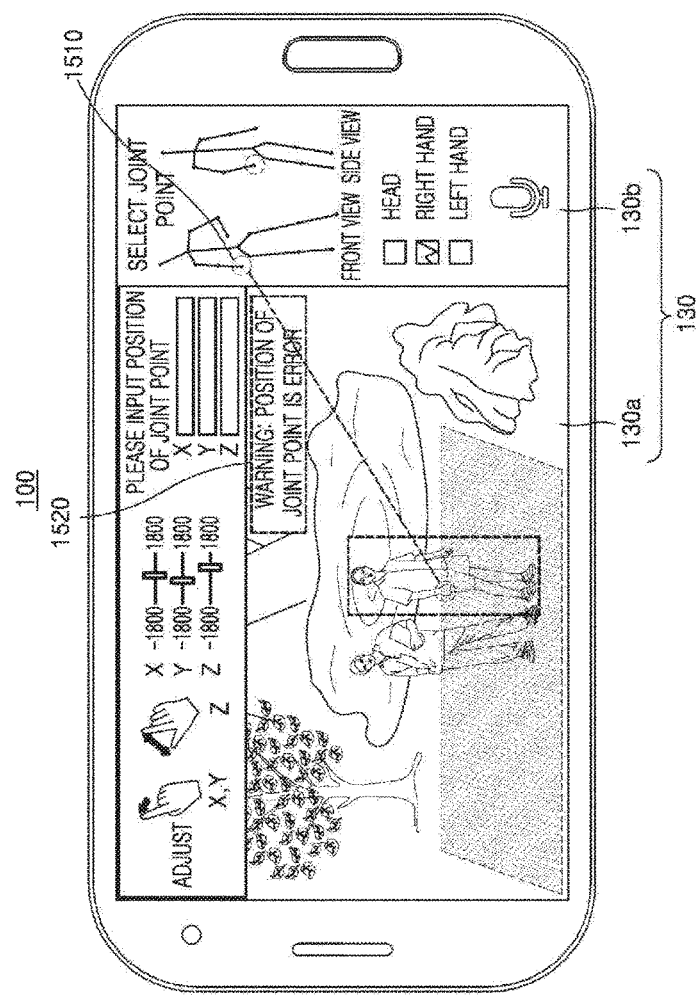
FIG. 15 illustrates an example of notifying a user that a 3D space position of a joint point is wrongly configured, according to an exemplary embodiment.

FIG. 15 illustrates an example of notifying a user that a 3D space position of a joint point is wrongly configured, according to an exemplary embodiment. Referring to FIG. 15, a 3D space position 1510 of the joint point configured by the user does not satisfy a limitation of a length of a corresponding skeleton. Thus, the image capturing apparatus 100 may output to the user a notification 1510 indicating that the 3D space position of the joint point is wrongly configured.

Figure 16:
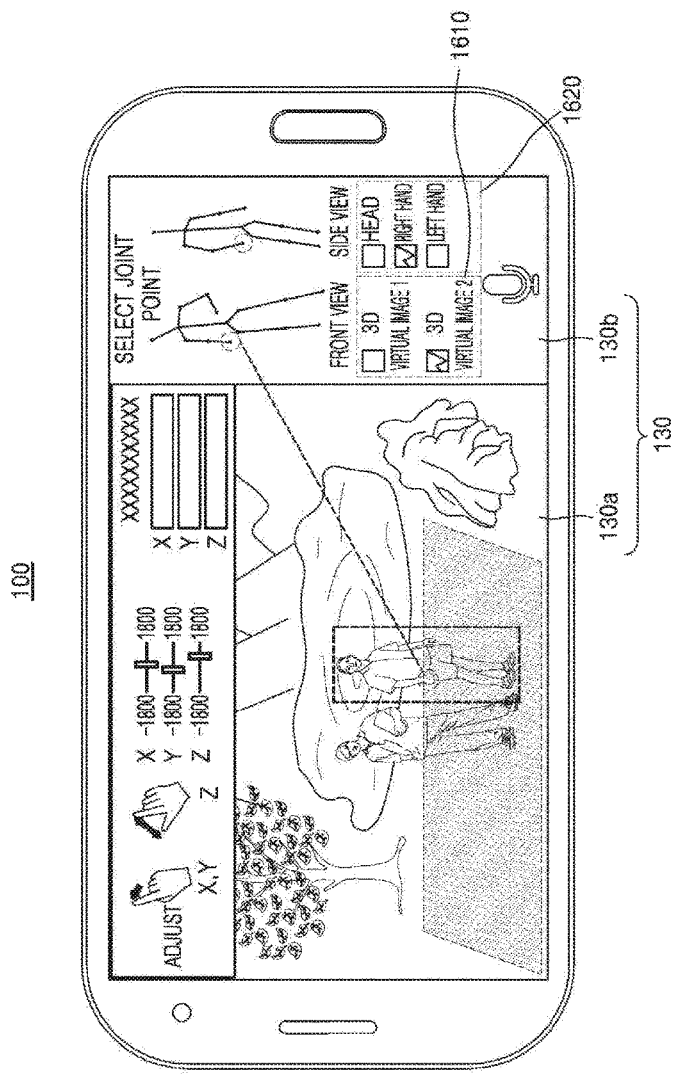
FIG. 16 illustrates an example of selecting and configuring a 3D virtual image and a joint point of a 3D virtual image together, according to an exemplary embodiment.

FIG. 16 illustrates an example of selecting and configuring a 3D virtual image and a joint point of a 3D virtual image together, according to an exemplary embodiment. Referring to FIG. 16, the image capturing apparatus 100 may display a selection box 1610 that allows the user to select a first 3D virtual image and a second 3D virtual image, and a selection box 1620 that allows the user to select a joint point of the selected 3D virtual images. As illustrated in FIG. 16, the second 3D virtual image and a joint point of a right hand of the second 3D virtual image may be selected and configured together through a user interface, so that both the 3D virtual image and the joint point of the 3D virtual image can be selected and configured together.

If the background image is a preview image of a scene where the photographing is performed (that is, the camera captures the preview image of the scene in real time), since the preview image is captured in real time, the preview image is changed along with a change of a user hand action (for example, a shake of the preview image occurs along with a light shake of the user hand). In an example, the 3D space position and/or the 3D posture of the configured 3D virtual image in the preview image may be changed along with a change of the preview image.

In addition, in a process that the user configures the 3D virtual image, the current 3D space position and/or the 3D posture of the 3D virtual image may be fed back to the user in the user interface in real time, and colors may be applied to the 3D virtual image and the preview image in the user interface, so that the user can obtain the change occurring according to the user operation in real time.

According to the above-described method, the photographing effect of the target object can be availably simulated by configuring the 3D virtual image in the background image, thereby implementing a perfect composition before photographing.

\<Performing Photographing Based on Configured 3D Virtual Image\>

The procedures of performing the photographing based on the configured 3D virtual image in operation 410 are described in detail as follows.

That is, after the photographing composition is performed in advance by using the 3D virtual image, the photographing is performed based on the configured 3D virtual image.

In the photographing process based on the configured 3D virtual image, the target object may be guided to perform adjustment based on the 3D virtual image configured in the background image.

The procedures of performing the photographing based on the configured 3D virtual image in operation 440 are described with reference to FIG. 17.

Figure 17:
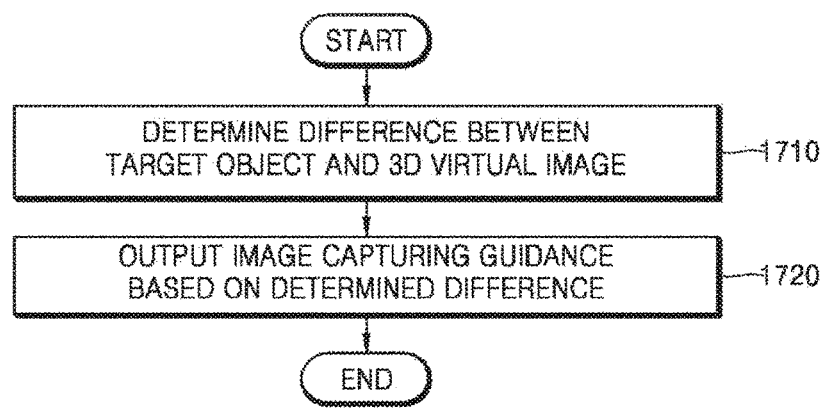
FIG. 17 is a flowchart of a method of performing photographing based on a configured 3D virtual image, according to an exemplary embodiment.

FIG. 17 is a flowchart of a method of performing photographing based on a configured 3D virtual image, according to an exemplary embodiment.

Referring to FIG. 17, in operation 1710, the image capturing apparatus 100 may determine a difference between the target object and the 3D virtual image in the background image.

The image capturing apparatus 100 may automatically detect the target object. In an example, the target object may be detected based on the 3D posture of the 3D virtual image in the background image. For example, the target object may be detected by detecting an object in a 3D posture that is similar to or consistent with the 3D posture of the 3D virtual image in the background image. For example, if the 3D space position of the 3D virtual image in the background image is configured in operation 430, the configured position may be detected in real time. If an object having the 3D space position that is similar to or consistent with the 3D space position of the 3D virtual image in the background image is detected, the object is determined as the target object.

According to an exemplary embodiment, the target object may be determined based on 3D space position information provided by the wearable device. For example, the target object located in the corresponding position in the background image is detected according to the 3D space position information. The 3D space position information may be provided by the wearable device worn by the target object and connected with the image capturing apparatus. Likewise, the 3D space position information may be provided by an electronic device held by the target object and connected with the image capturing apparatus.

According to an exemplary embodiment, the target object may be determined by performing target tracking for an object selected by the user. For example, the user may select an object as the target object in the background image, and then the target tracking may be performed for the selected target object. Thus, the target object may be determined.

According to an exemplary embodiment, the target object may be determined according to another method. In an example, the target object may be detected through face recognition. An image of the target object may be photographed in advance, or may be obtained from a photo album. The target object may be detected based on the image of the target object.

In another example, an action trajectory of the target object may be tracked, and the target object may be detected according to the action trajectory. For example, an action trajectory of an object is tracked, and it is determined whether an action direction of the object is toward the position of the configured 3D virtual image. If the action direction is toward the position of the configured 3D virtual image, it is determined that the object is the target object. If the action direction is not toward the position of the configured 3D virtual image, it is determined that the object is not the target object.

If the target object includes multiple persons, each person may be respectively detected according to the above-described method.

According to an exemplary embodiment, the difference between the target object and the 3D virtual image in the background image may include a 3D space position difference between the target object and the 3D virtual image in the background image and/or a 3D posture difference between the target object and the 3D virtual image in the background image.

In an example, the 3D space position difference between the target object and the 3D virtual image may be determined by comparing the 3D space position of the target object with the 3D space position of the 3D virtual image. For example, the 3D space position difference between the target object and the 3D virtual image may be determined by respectively comparing 3D space positions of the target object on a horizontal direction, a vertical direction and a depth direction with 3D space positions of the 3D space on the horizontal direction, the vertical direction, and the depth direction in order.

In an example, the 3D posture difference between the target object and the 3D virtual image may be determined by comparing 3D space positions of joint points of the target object with 3D space positions of corresponding joint points of the 3D virtual image. The 3D space positions of the joint points of the target object may be respectively compared with the 3D space positions of the corresponding joint points of the 3D virtual image according to an order. For example, comparison may be started from a root node and may be performed in turn from the root node to child nodes.

If the 3D space position difference between each joint point of the target object and the corresponding joint point of the 3D virtual image is less than a preset threshold, or if the 3D space position difference between a designated joint point of the target object and the corresponding joint point of the 3D virtual image is less than a preset threshold, it is determined that there is no 3D posture difference between the target object and the 3D virtual image. In addition, the 3D posture difference between the target object and the 3D virtual image may be determined through an angle difference between each joint point of the target object and the corresponding joint point of the 3D virtual image or through an angle difference between a designated joint point of the target object and the corresponding joint point of the 3D virtual image. For example, a connection line of some designated joint points of the target object is determined, and a connection line of corresponding joint points of the 3D virtual image is determined. The 3D posture difference between the target object and the 3D virtual image is determined according to the angle difference between the two connection lines.

In operation 1720, the image capturing apparatus 100 outputs the image capturing guidance based on the determined difference and performs the image capturing. At this time, the posture may be adjusted by outputting the image capturing guidance according to an order and guiding the target object.

In particular, the target object may be guided to reach a designated position, so that the 3D space position of the target object is same as or similar to the 3D space position of the configured 3D virtual image in the background image, and/or the target object may be guided to adjust the 3D posture, so that the 3D posture of the target object is same as or similar to the 3D posture of the 3D virtual image. If the target object is guided to adjust the 3D space position and the 3D posture, after the target object is guided to adjust the 3D space position (that is, after the target object reaches the designated position), the target object may be guided to adjust the 3D posture.

When the target object is guided to reach the designated position, the target object may be provided with a moving direction and a moving distance based on the 3D space position difference between the target object and the 3D virtual image in the background image.

In an example, a voice command may be transmitted, e.g., "The distance to the front is 3 m", wherein the voice guidance may be output through the wearable device.

In another example, at least one of the following items may be displayed: a moving trajectory of the target object, a current position and a designated position of the target object, and a distance to the designated position. The image guidance may be output through a display screen of the image capturing apparatus and/or the wearable device.

Alternatively, the target object may be guided through indicator lights with different colors. For example, a green light indicates the target object to move forward, and a blue light indicates the target object to move to right. The target object may be guided through the indicator lights on the image capturing apparatus and/or the wearable device.

Figure 18:
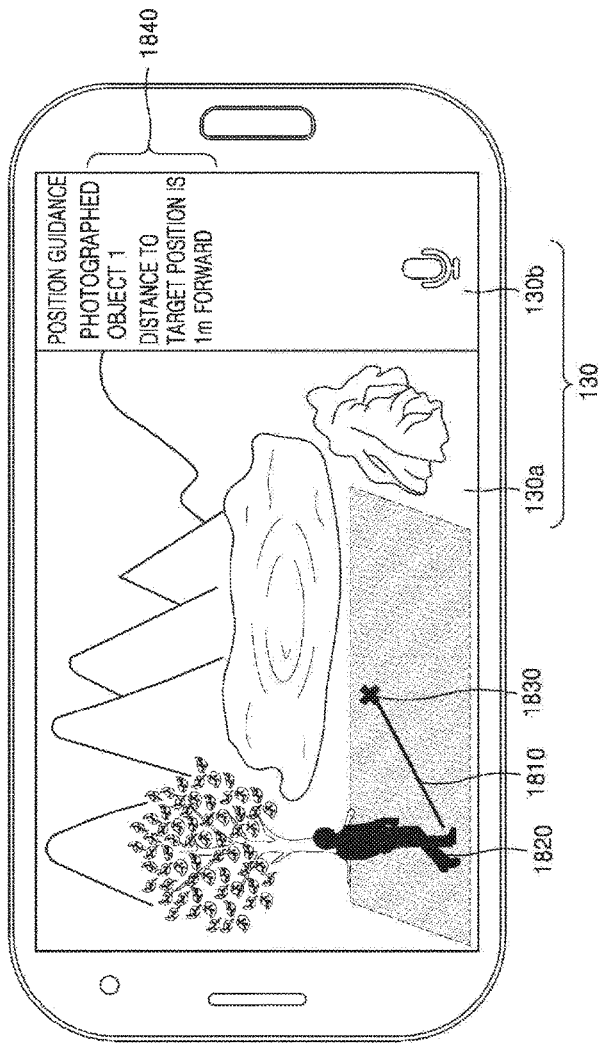
FIG. 18 illustrates an example of guiding a target object to reach a designated position by using image capturing guidance, according to an exemplary embodiment.

FIG. 18 illustrates an example of guiding a target object to reach a designated position by using image guidance, according to an exemplary embodiment. Referring to FIG. 18, a path 1810 to the designated position, a current position 1820, the designated position 1830 of the target object, and information 1840 about a distance to the designated position may be displayed for the target object.

If there are multiple target objects, each target object may be respectively guided to reach the corresponding designated position according to the above-described method. For example, the target objects may be respectively guided according to an order, e.g., an order of the target objects from left to right, from high to low, from front to back, an order of colors of clothes from dark to light.

Figure 19:
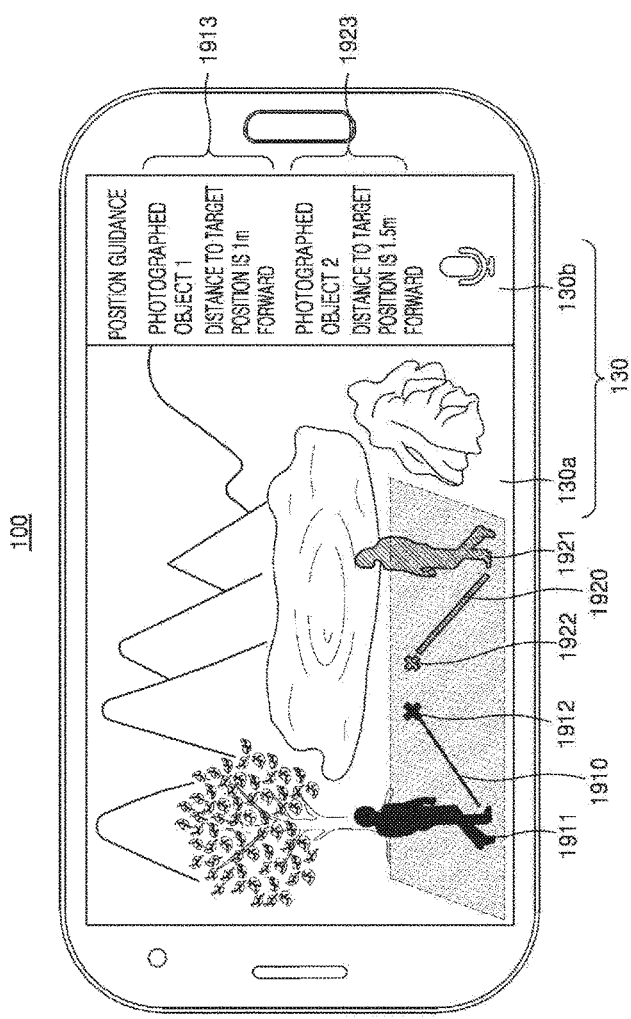
FIG. 19 illustrates an example of guiding multiple target objects to reach designated positions, according to an exemplary embodiment.

FIG. 19 illustrates an example of guiding multiple target objects to reach designated positions, according to an exemplary embodiment.

Referring to FIG. 19, moving trajectories 1910 and 1920 of the multiple target objects, current positions 1911 and 1921, corresponding designated positions 1912 and 1922 of the multiple target objects, and information 1913 and 1923 about distances respectively to the corresponding designated positions may be displayed. In addition, different colors may be used to mark paths respectively to the corresponding designated positions, the current positions, and the corresponding designated positions of the multiple target objects.

The guidance to adjust the posture may be performed based on the 3D posture difference between the target object and the 3D virtual image.

For example, if voice guidance is used, a voice command, e.g., "please move the left hand 10 cm up, and move the left hand 8 cm backward", is transmitted.

For example, if image guidance is used, the current posture of the target object and the posture of the 3D virtual image are respectively displayed in two images, or are displayed in one image including two overlapped postures, so that the target object can learn the 3D posture difference between the target object and the 3D virtual image.

For example, if an information output manner is used for the guidance, information about a direction and a distance to be moved for each joint point may be output. For example, a text such as "move a certain joint point 10 cm to left, and move the joint point 8 cm backward" may be output.

For example, a color marking manner may be used for output. For example, red may be used to indicate that the posture difference is large, and yellow may be used to indicate that the posture of the target object is similar to the posture of the 3D virtual image, and green may be used to indicate that the posture of the target object is consistent with the posture of the 3D virtual image.

For example, indicator lights with different colors may be used to indicate whether the 3D space position of each joint point of the target object is consistent with the 3D space position of the corresponding joint point of the 3D virtual image.

Figure 20:
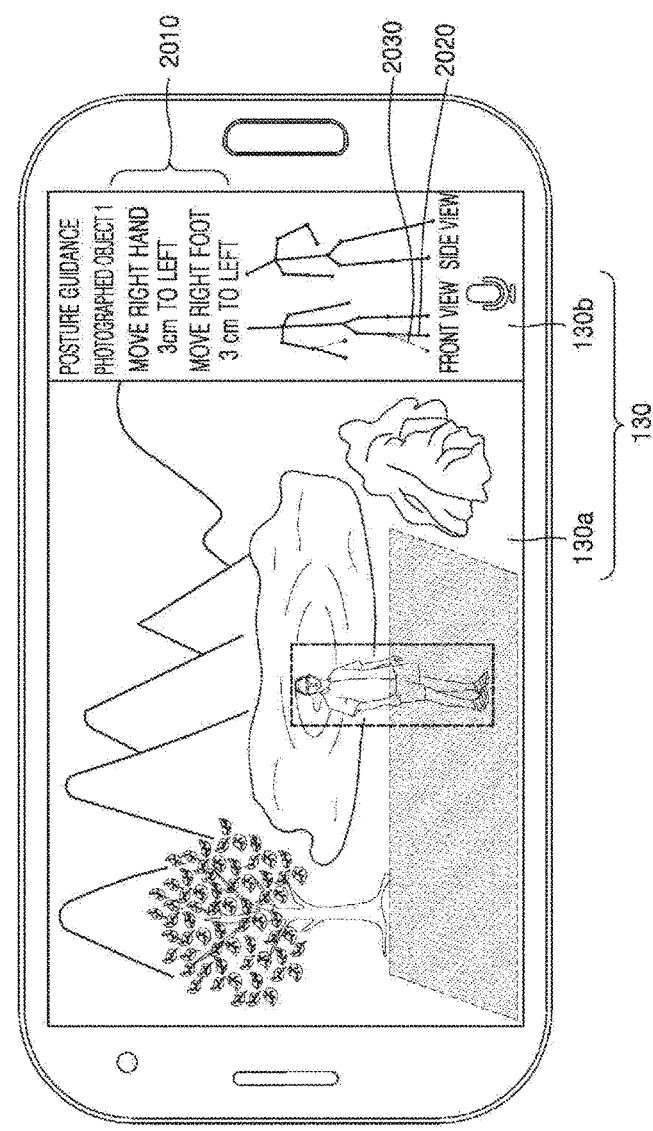
FIG. 20 illustrates an example of guiding a target object to adjust a posture of a target object according to an exemplary embodiment.

FIG. 20 illustrates an example of guiding a target object to adjust a posture of the target object, according to an exemplary embodiment. Referring to FIG. 20, the 3D posture difference between the target object and the 3D virtual image may be displayed for the target object through an image, and the target object may be guided through a text output 2010. In addition, a current posture 2020 of the target object and a posture 2030 to which the target object is adjusted viewed from different angles may be simultaneously displayed in a front view or in a side view, wherein colors are applied to the current posture of the target object and the posture to which the target object is adjusted (e.g., based on the joint point, colors are applied to the current posture of the target object and the posture to which the current posture is adjusted). Thus, the target object can conveniently understand how the posture is adjusted. For example, in some conditions, the target object may not understand how the posture is adjusted only in the single front view or the single side view. For example, the target object needs to move the left hand 8 cm backward, but whether the left hand is moved forward or backward and what the moving distance is may not be determined only in the front view, but may be accurately presented in the side view.

If there are multiple target objects, each target object may be guided to adjust the posture. After all target objects reach corresponding designated positions, the procedures to guide each target object to adjust the posture may start. Alternatively, after each of the target objects reaches the corresponding designated position, the procedures to guide the target object to adjust the posture may start.

Figure 21:
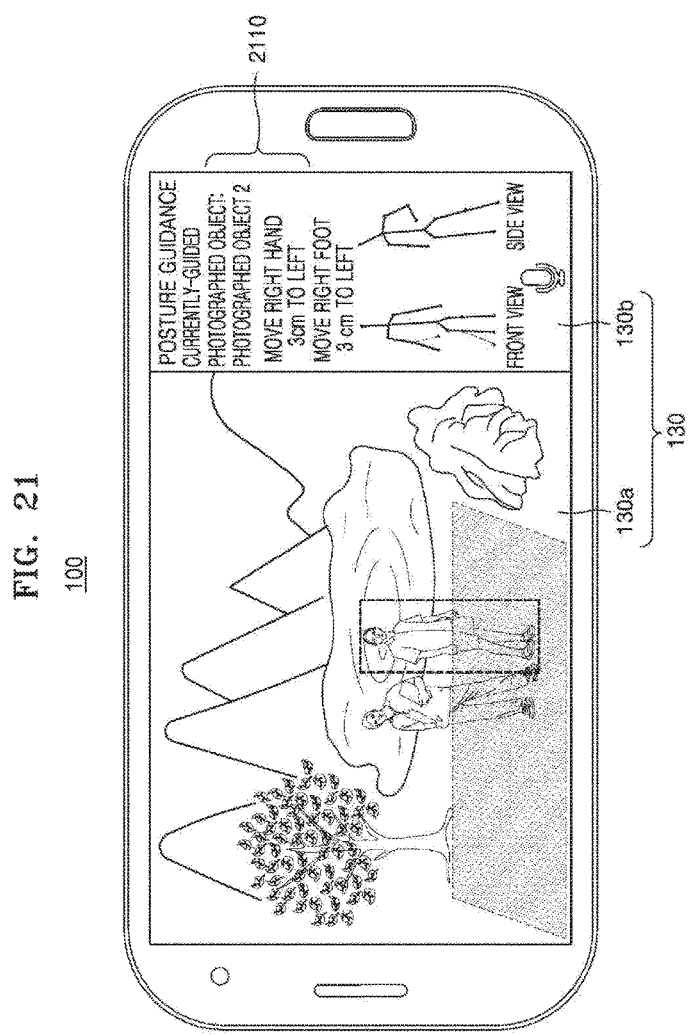
FIG. 21 illustrates an example of guiding multiple target objects to adjust postures of multiple target objects according to an exemplary embodiment.

FIG. 21 illustrates an example of guiding multiple target objects to adjust postures of the multiple target objects, according to an exemplary embodiment.

Referring to FIG. 21, the posture difference between one of the target objects and the corresponding 3D virtual image may be displayed through an image, and the target object is guided through text 2110. In addition, images and texts corresponding to different target objects may be shown in different colors.

In an example, the image capturing guidance may output through the image capturing apparatus and/or the wearable device, so that the target object is guided to perform corresponding adjustment. For example, when the target object is close to the image capturing apparatus, the target object may be guided through a voice command transmitted from the image capturing apparatus and/or through a rotatable displaying screen. When the target object is far away from the image capturing apparatus, the target object may be guided through a wearable device worn by the target object and connected with the image capturing apparatus (e.g., a Bluetooth headset, a smart watch, a smart glass, a smart bracelet, etc.). For example, when the image capturing apparatus needs to guide the target object to perform adjustment, the image capturing apparatus may notify the user to use the wearable device for guidance, and may display a list of neighboring wearable devices. The user may select a corresponding wearable device to perform connection. In addition, the wearable device may initiate a connection request. For example, the wearable device installs an application (APP) used to guide user to perform photographing. The APP may initiate the connection request to the image capturing apparatus. In addition, it should be understood that an output of another electronic device held by the target object may be used to guide the target object to perform adjustment, e.g., a smart phone, a tablet computer, etc.

Figure 22:
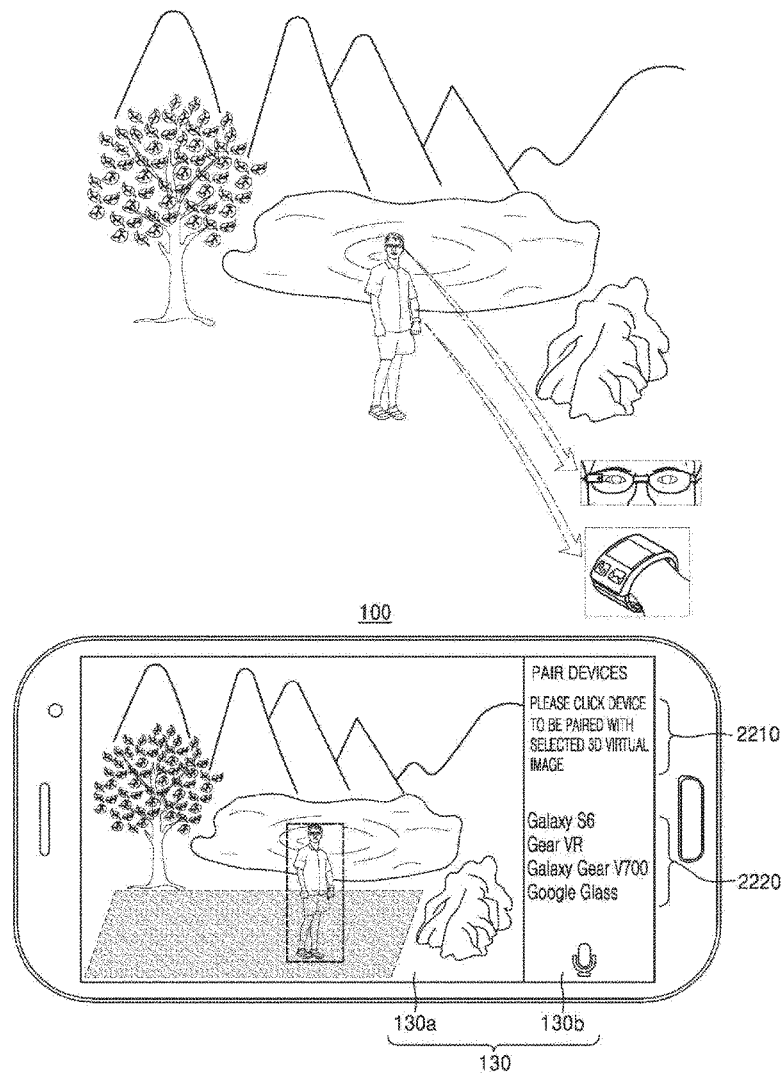
FIG. 22 illustrates an example of connectable electronic devices according to an exemplary embodiment.

FIG. 22 illustrates an example of connectable electronic devices according to an exemplary embodiment.

As illustrated in FIG. 22, a message 2210 instructing to select a device to be paired with a 3D virtual image and a list 2220 of electronic devices connectable with the image capturing apparatus may be displayed for the user, so that the user can select a corresponding electronic device to establish a connection and the image capturing apparatus guides the target object through the connection and performs adjustment.

If there are multiple target objects, the image capturing apparatus may establish connections respectively with a wearable device worn on each target object or an electronic device held by each target object, so that each target object is guided to perform adjustment through the corresponding wearable device or the corresponding handheld electronic device.

Figure 23:
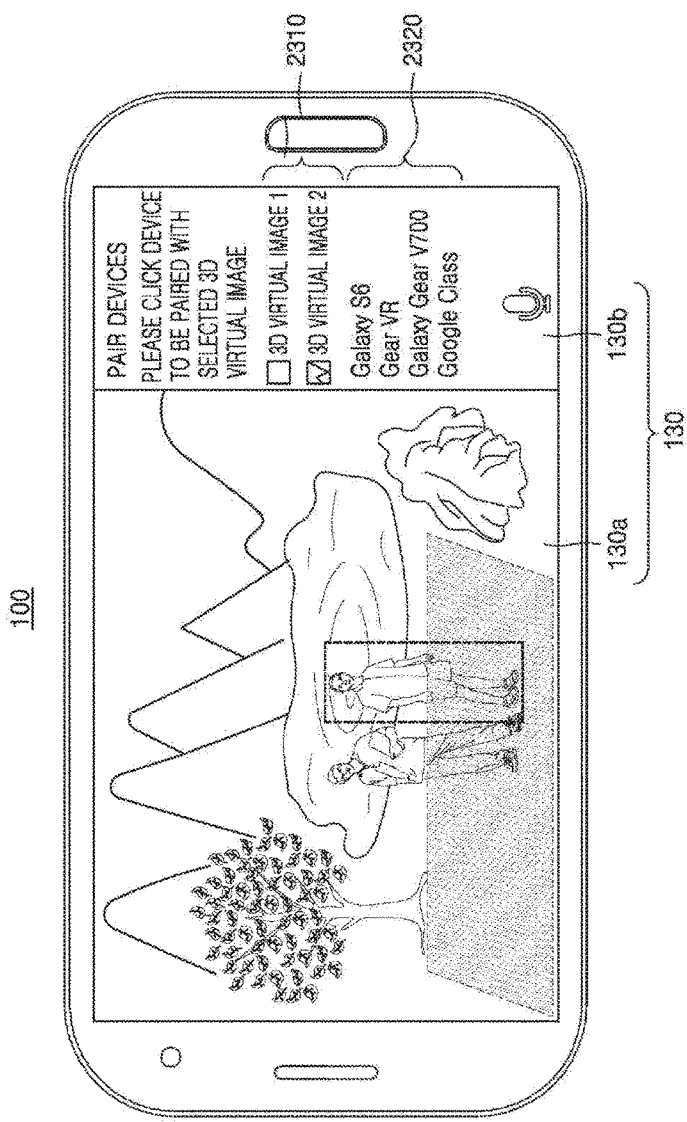
FIG. 23 illustrates another example of displaying on a connectable electronic device, according to an exemplary embodiment.

FIG. 23 illustrates another example of displaying on a connectable electronic device according to an exemplary embodiment.

Referring to FIG. 23, a selection box 2310 allowing a user to select one of a plurality of 3D virtual images and a list 2320 of electronic devices that can be mapped with each 3D virtual image and are connectable with the image capturing apparatus may be displayed. Thus, the user can select the electronic device corresponding to each of the plurality of 3D virtual images to establish a connection to guide the target object selected from the multiple target objects to perform adjustment. For example, the user may select Galaxy S6 as a device to be paired with a first 3D virtual image and may select Gear VR as a device to be paired with a second 3D virtual image. Thus, a target object corresponding to the first 3D virtual image may be provided with guidance through Galaxy S6, and a target object corresponding to the second 3D virtual image may be provided with guidance through Gear VR.

In a process of performing the photographing based on the configured 3D virtual image, the target object may be focused on and photographed at a suitable time. The procedures of performing the photographing based on the configured 3D virtual image in operation 440 are described with reference to FIG. 24.

Figure 24:
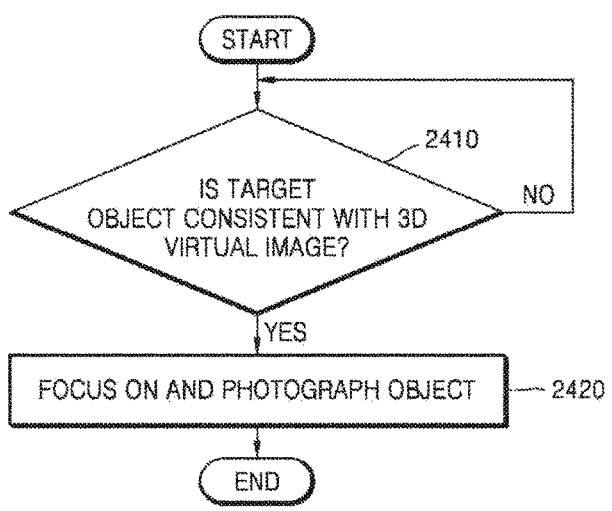
FIG. 24 is a flowchart of a method of performing photographing based on a configured 3D virtual image, according to another embodiment.

FIG. 24 is a flowchart of a method of performing photographing based on a configured 3D virtual image, according to an exemplary embodiment.

Referring to FIG. 24, in operation 2410, it is determined whether the target object is consistent with the 3D virtual image in the background image. For example, if the difference between the target object and the 3D virtual image in the background image is less than a preset focusing threshold, or if the target object is roughly similar to the 3D virtual image in the background image, it is determined that the target object is consistent with the 3D virtual image.

Examples of the difference between the target object and the 3D virtual image in the background image may include, but are not limited to, the 3D space position difference and the 3D posture difference. When the comparison is performed, if the 3D space position difference between the target object and the 3D virtual image is less than a preset position focusing threshold and the 3D posture difference between the target object and the 3D virtual image is less than a preset posture focusing threshold, it may be determined that the difference between the target object and the 3D virtual image is less than a preset focusing threshold. Alternatively, if a weight sum of the 3D space position difference and the 3D posture difference is less than a preset total focusing threshold, it may be determined that the difference between the target object and the 3D virtual image is less than the preset focusing threshold.

If it is determined in operation 2410 that the target object is consistent with the 3D virtual image, the image capturing apparatus 100 may focus on and photograph the target object in operation 2420.

In an example, when the target object is consistent with the 3D virtual image, the target object is automatically focused on and photographed without further user input to take a picture.

If the target object includes multiple target objects, the procedures in operation 2420 may be performed for each target object.

Figure 25:
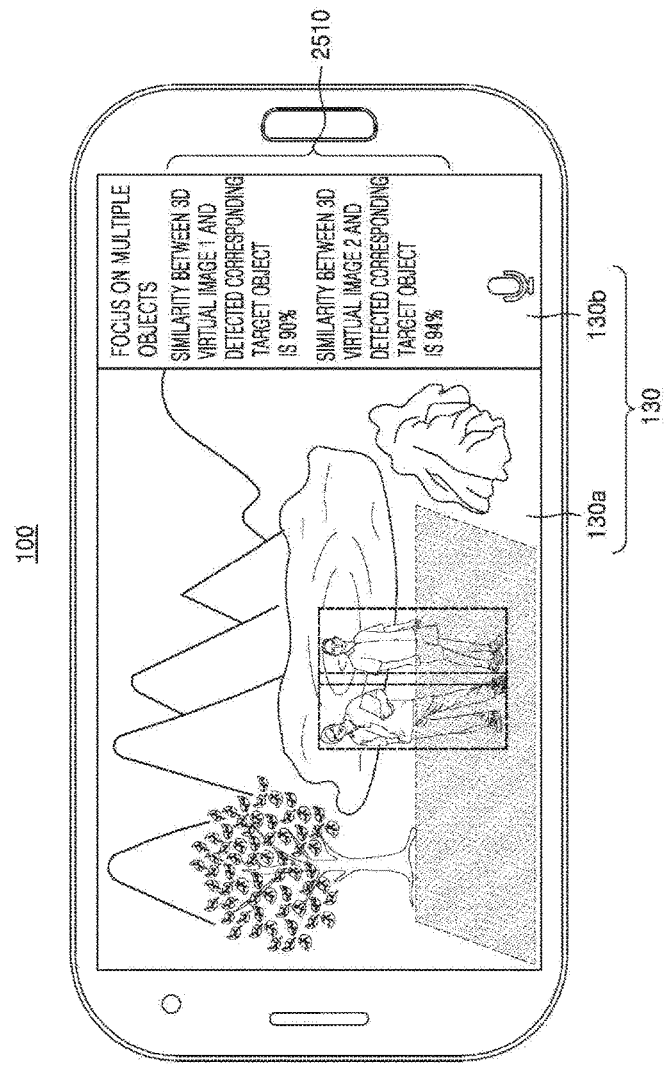
FIG. 25 illustrates an example of respectively focusing on multiple objects, according to an exemplary embodiment.

FIG. 25 illustrates an example of respectively focusing on multiple objects, according to an exemplary embodiment. As illustrated in FIG. 25, an object consistent with the corresponding 3D virtual image is focused on for photographing. After each object is focused on and photographed, the object is extracted from each photograph, and all extracted objects and the background image are composed. For example, referring to FIG. 25, the image capturing apparatus 100 may display information 2510 indicating that a similarity between a first 3D virtual image and a corresponding target object is 90%, and a similarity between a second 3D virtual image and a corresponding target object is 94%. According to this manner, each object may be respectively focused on, and images in which a different object is focused on may be photographed. The objects may be extracted from the photographs, and all the extracted objects and the background image may be used to obtain an image including all clear objects. Thus, a problem that only one object can be focused on and other objects are fuzzy when multiple objects are located at different scene depths may be solved.

Figure 26:
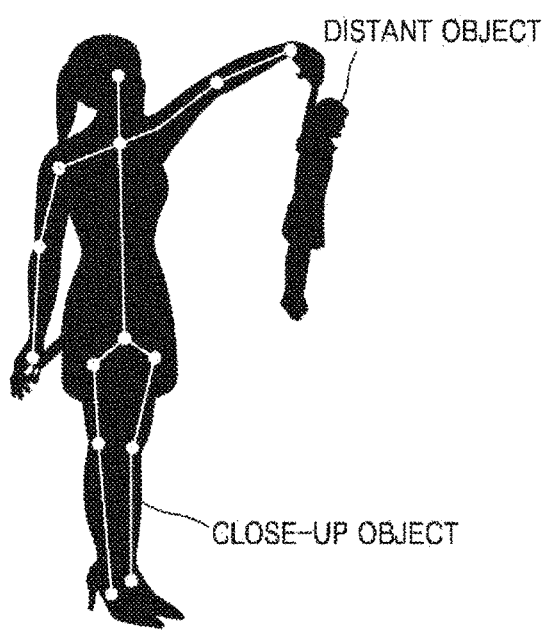
FIG. 26 illustrates another example of respectively focusing on multiple target objects, according to an exemplary embodiment.

FIG. 26 illustrates another example of respectively focusing on multiple target objects, according to an exemplary embodiment. As shown in FIG. 26, far objects and near objects may be respectively focused on in the corresponding photograph. The objects may be respectively extracted from the corresponding images, and all the extracted objects and the background image may be used to obtain an image including the clear far objects and the clear near objects.

The object extraction may be performed using various methods. For example, a region corresponding to the object may be obtained roughly by mapping a skeleton of the object to the photograph. A region where the object is located may be segmented through a graph cut algorithm or other segmentation algorithm. Points not segmented are background points constituting the background image. For example, the region where the object is located may be detected by using a pedestrian detection related algorithm (e.g., a DPM model, etc.), and then a region with a similar depth may be segmented from the detected region where the object is located by using a breadth first growth algorithm. If precision of depth information is not accurate enough, re-segmentation may be performed by using a Matting related algorithm. In addition, all extracted objects and the background image are composed according to various methods, e.g., Poisson fusion.

In addition, certain joint points of the target object may be respectively focused on to capture images, and the photographs may be used to obtain an image including various clear body parts of the target object located on different scene depths. The focused joint points may be automatically configured according to the posture of the target object, or may be selected according to user operations. For example, the focused joint points are selected when the 3D virtual image is selected, when the 3D space position and/or the 3D posture of the 3D virtual image are configured, or when the photographing is performed.

According to an exemplary embodiment, the 3D virtual image may have a posture used to indicate occurrence of a posture of the target object desired to be photographed. Accordingly, when the target object is focused in operation 2420, the target object may be automatically captured, to obtain the image in which the target object is in the target posture.

In an example, the photographing posture database may pre-store a series of postures of a 3D virtual image (i.e., a posture sequence of the 3D virtual image). Optionally, the posture sequence of the 3D virtual image may be added into the photographing posture database according to requirements. The user may select a posture desired to be photographed from the photographing posture database. Accordingly, when it is determined that the posture of the target object is consistent with a certain posture that appears before the target posture in the posture sequence (that is, the posture used to anticipate occurrence of target posture), the target object may be focused on to prepare capturing the target posture.

Figure 27:
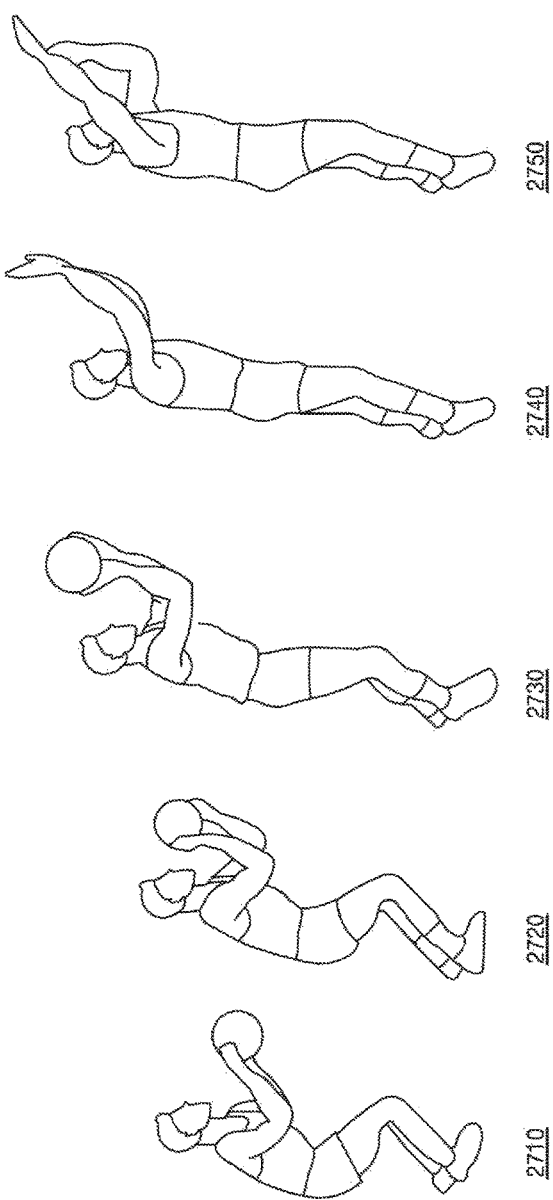
FIG. 27 illustrates an example of capturing an image of a target object, according to an exemplary embodiment.

FIG. 27 illustrates an example of photographing a target object, according to an exemplary embodiment.

As illustrated in FIG. 27, the photographing posture database may store in advance a posture sequence 2710, 2720, 2730, 2740, and 2750 of photographing at a basket of the 3D virtual image. If the posture 2740 in FIG. 27 is a posture desired to be photographed by the user, the posture in the posture sequence may be used to anticipate occurrence of the target posture of the target object. For example, the posture 2720 may be selected considering many factors, e.g., a photographing speed and/or a typical speed of a basketball shooting motion. Thus, when the posture of the target object is consistent with the posture 2720, the target object may be focused on. Then, when the target object is in the posture 2730, the target object may be captured so that the image including the target object in the posture 2740 can be finally captured.

In an example, if the target object includes multiple objects, the procedures in operation 2420 may be performed for each object. Thus, the 3D virtual image may have the posture anticipating the target posture. After each of the objects are extracted from a corresponding photograph, the extracted objects and the background image may be used to obtain the image including the target objects respectively in target postures, wherein the 3D virtual image has the posture anticipating the target posture of the target object.

In an example, the 3D virtual image may have multiple postures desired to be continuously photographed. In operation 2420, when the target object is continuously consistent with the 3D virtual image in a preset time period, the target object may be automatically focused on and continuously photographed to avoid that additional actions are photographed when the continuous photographing is performed. For example, in the existing continuous photographing manner, the target object may be continuously photographed in a same time period. For example, the target object may be photographed every two seconds. The action of the target object used to change the photographing posture may be photographed.

In an example, when the target object includes multiple objects, an object inconsistent with the 3D virtual image may be removed from a photographing preview image before the objects are focused on, or the object inconsistent with the 3D may be removed from a photograph after the objects are focused on and photographed.

If the scene to be captured includes a target object and a non-target object (e.g., a passer-by), the target object and the non-target object may be automatically recognized based on the 3D virtual image and the non-target object may be removed before or after the photographing is performed. If the difference between an object and the 3D virtual image is less than the preset focusing threshold, the object may be recognized as the target object. If the difference between the object and 3D virtual image is more than the preset focusing threshold, the object may be recognized as the non-target object. Alternatively, an object may be recognized as the non-target object only when the difference between the object and the 3D virtual image is more than a preset deviation threshold that is greater than the focusing threshold.

Figure 28:
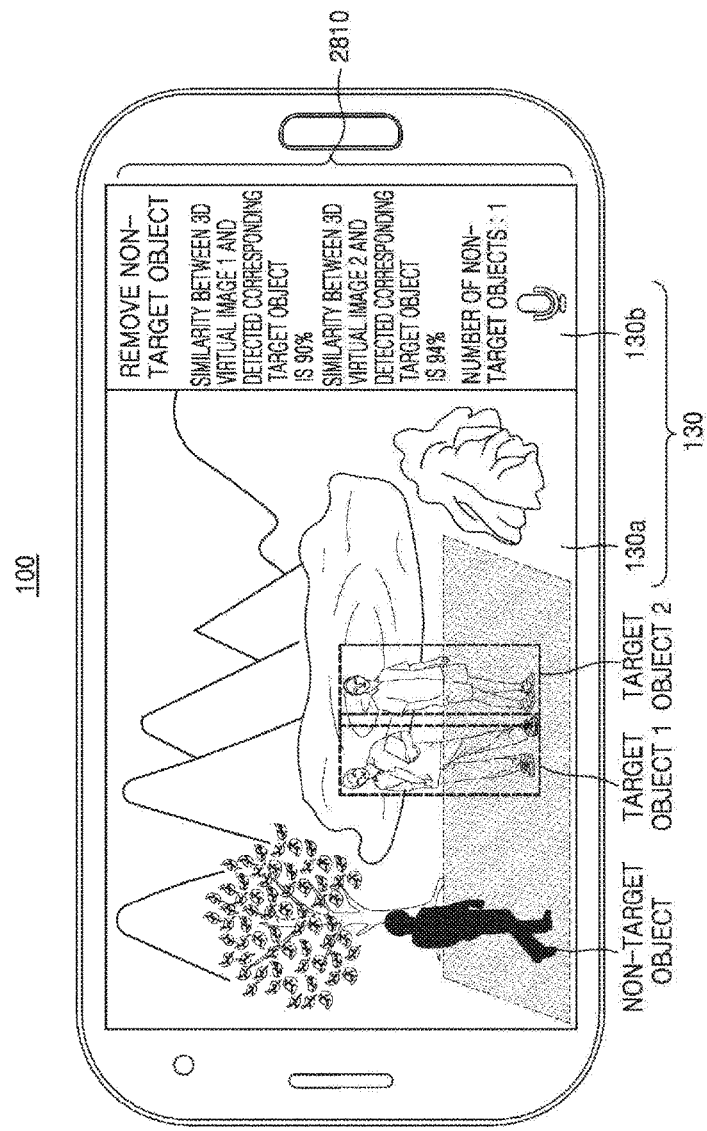
FIG. 28 illustrates an example of recognizing a target object and a non-target object, according to an exemplary embodiment.

FIG. 28 illustrates an example of recognizing a target object and a non-target object, according to an exemplary embodiment. As illustrated in FIG. 28, the target object and the non-target object may be recognized according to the difference between the target object and the 3D virtual image. The target object and the non-target object may be marked differently. Referring to FIG. 28, the image capturing apparatus 100 may display information 2810 indicating that a similarity between a first 3D virtual image and a corresponding target object is 90%, a similarity between a second 3D virtual image and a corresponding target object is 94%, and the number of non-target objects is 1.

If the difference between the object and the 3D virtual image is not less than the focusing threshold, the object may be removed from the photographing preview image or the photograph according to various methods. For example, when the non-target object moves, a region previously shaded by the non-target object may be recorded and is used to fill the region after the non-target object is removed. If the non-target object is big and does not move in a predetermined time period, i.e., a grey value or a depth value of a corresponding pixel is not changed in a predetermined time period, the region shaded by the non-target object may be filled by using a selected patch match method or by using an image similar to the region. Such similar image may be pre-stored or obtained from the internet. Alternatively, the region shaded by the non-target object may not be handled.

Figure 29:
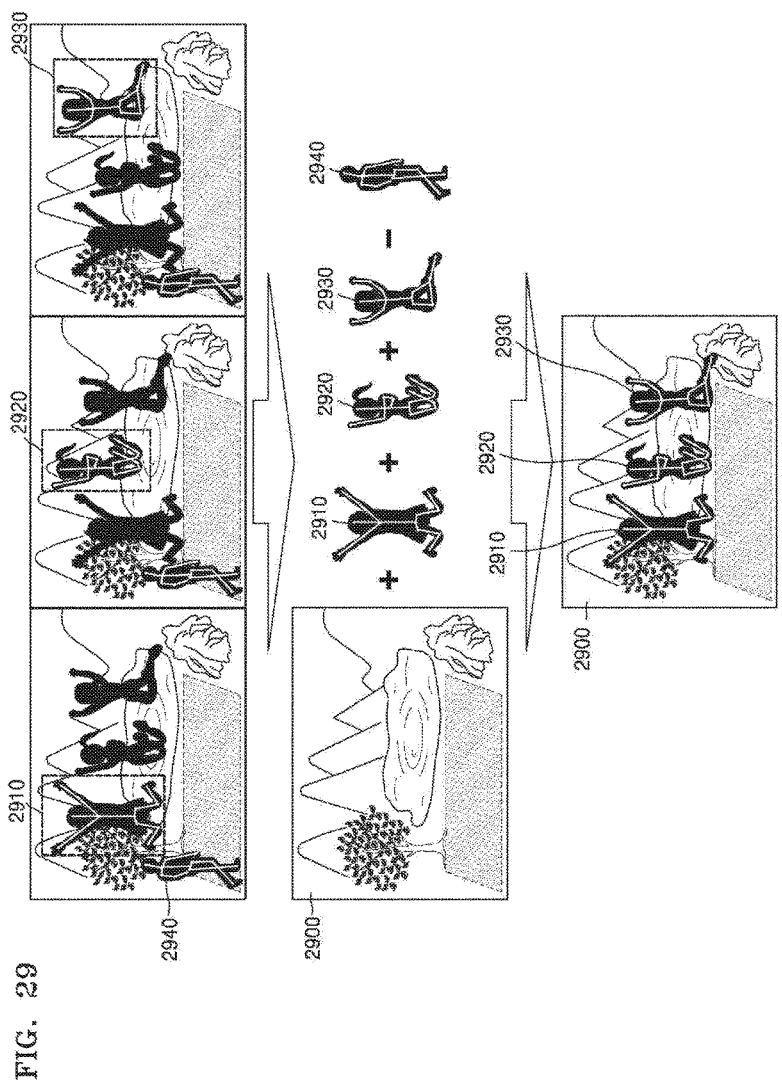
FIG. 29 illustrates an example of removing a non-target object, according to an exemplary embodiment.

FIG. 29 illustrates an example of removing a non-target object, according to an exemplary embodiment. As illustrated in FIG. 29, target objects and non-target objects are determined, and the non-target objects are removed. Referring to FIG. 29, the image capturing apparatus 100 may extract target objects 2910, 2920, and 2930 from a photographing preview image or a photograph, and may obtain a final image by adding the target objects 2910, 2920, and 2930 to a background image 2900 and excluding a non-target object 2940 from the background image 2900.

The image capturing method according to an exemplary embodiment may include determining a photograph accessory and configuring a 3D space position and/or a 3D posture of the photograph accessory in the background image.

The above-described procedures may be performed before the photographing is performed (e.g., the procedures may be performed in operation 410 and/or operation 430, or are performed between operation 430 and operation 440). In another example, the procedures may be performed when the photographing is performed (e.g., the procedures may be performed in operation 440). In another example, the procedures may be performed after the photographing is performed (e.g., the procedures are performed for the photograph).

The photograph accessory may be an item used to decorate the target object in the image. Examples of the photograph accessory may include, but are not limited to, a hat, glasses, a watch, a bag, etc. The photograph accessory may be displayed in various forms, e.g., a list, an image, a 3D model, etc. The photograph accessory may be automatically determined by the image capturing apparatus (e.g., the photograph accessory is configured in default in the image capturing apparatus), or the photograph accessory may be selected through a user input, e.g., by clicking or dragging the selected photograph accessory.

In an example, the 3D space position and/or the 3D posture of the photograph accessory may be roughly configured in the background image, and then the 3D space position and/or the 3D posture of the photograph accessory may be precisely adjusted in the background image. Alternatively, the 3D space position and/or the 3D posture of the photograph accessory are directly precisely configured in the background image.

In an example, the 3D space position of the photograph accessory may be roughly configured in the background image according to a user operation. For example, the selected photograph accessory may be moved to the corresponding position in the background image according to a user moving operation (e.g., dragging), or the photograph accessory is located in a position designated by the user in the background image.

Alternatively, the 3D space position and/or the 3D posture of the determined photograph accessory in the background image may be automatically configured. Before the photographing is performed, the 3D space position and/or the 3D posture of the determined photograph accessory in the background image may be configured according to the 3D space position and/or the 3D posture of the 3D virtual image in the background image. For example, the 3D space position and/or the 3D posture of the photograph accessory in the background image may be configured according to attributes of the photograph accessory, the 3D space position and/or the 3D posture of the 3D virtual image in the background image. Examples of the attributes of the photograph accessory may include, but are not limited to, a type of the photograph accessory, a body part associated with the photograph accessory, a joint point bound with the photograph accessory. For example, the 3D space position of the photograph accessory in the background image may be configured according to the 3D space position of the 3D virtual image in the background image. A certain or some joint points of the 3D virtual image bound with the photograph accessory may be determined according to the attributes of the photograph accessory. For example, if the photograph accessory is a hat, the photograph accessory may be bound with a head of the 3D virtual image. For another example, if the photograph accessory is a bag, the photograph accessory may be bound with a hand of the 3D virtual image. The 3D space position and/or the 3D posture of the photograph accessory in the background image may be further configured according to the 3D space position of each of the certain or the joint points. The user may further adjust the 3D space position and/or the 3D posture of the photograph accessory based on the 3D space position and/or the 3D posture of the photograph accessory automatically configured.

Figure 30:
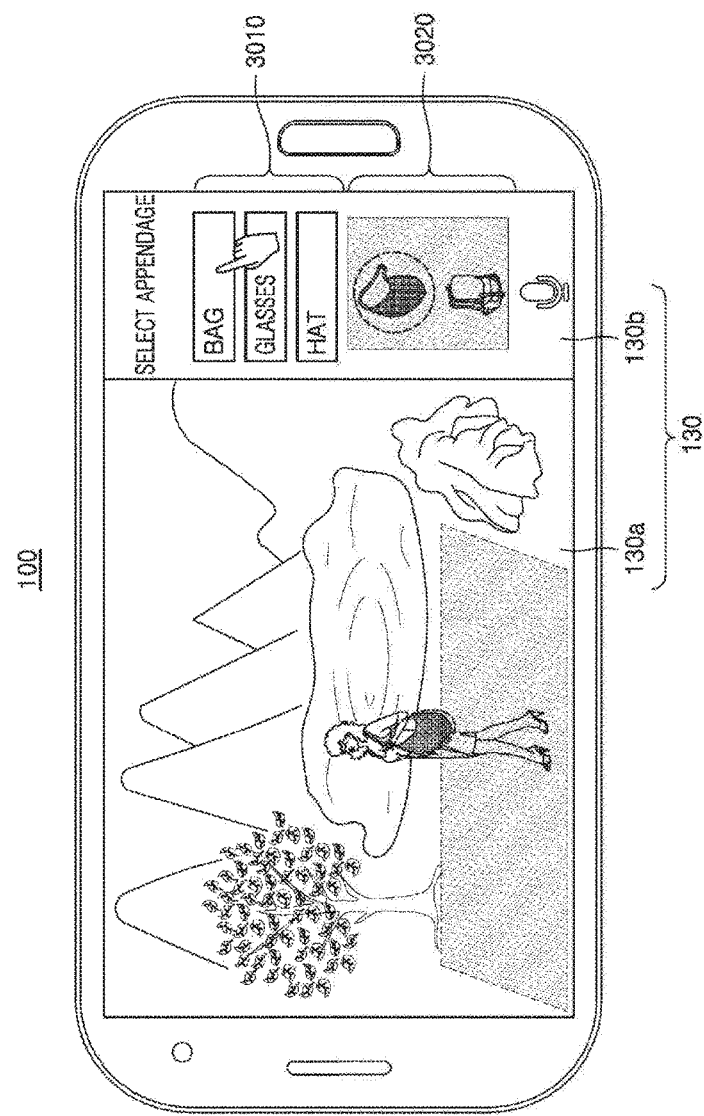
FIG. 30 illustrates an example of selecting a photograph accessory and configuring a 3D space position of a photograph accessory, according to an exemplary embodiment.

FIG. 30 illustrates an example of selecting a photograph accessory and configuring a 3D space position of the photograph accessory, according to an exemplary embodiment.

Referring to FIG. 30, the menu region 130b of the image capturing apparatus 100 may display a user interface 3010 allowing the user to select the photograph accessory and a user interface 3020 allowing the user to select a type of the selected photograph accessory. As illustrated in FIG. 30, the bag selected by the user is automatically configured in a suitable position corresponding to a hand joint point of the target object in the background image.

When configuration is automatically performed during the photographing process, the 3D space position and/or the 3D posture of the photograph accessory in the background image are configured according the 3D space position and/or the 3D posture of the detected target object in the background image. For example, the 3D space position and/or the 3D posture of the photograph accessory may be configured according to the attribute of the determined photograph accessory, the 3D space position and/or the 3D posture of the target object. For example, the 3D space position of the photograph accessory may be determined according to the configured 3D space position of the target object in the background image, a certain or some joint points bound with the photograph accessory may be determined according to the attribute of the photograph accessory, and the 3D space position and/or the 3D posture of the photograph accessory in the background image may be further configured according to the 3D space position of each of the certain or the joint points of the target object.

According to an exemplary embodiment, the 3D space position and/or the 3D posture of the photograph accessory in the background image may be precisely configured. The photograph accessory may be configured with positions respectively on a horizontal direction, a vertical direction and a depth direction, and may be further configured with rotation angles on the horizontal direction, the vertical direction and the depth direction. The 3D space position and the 3D posture of the photograph accessory in the background image may be configured according to a method of configuring the 3D space position and the 3D posture of the 3D virtual image, which is not described repeatedly herein.

Figure 31:
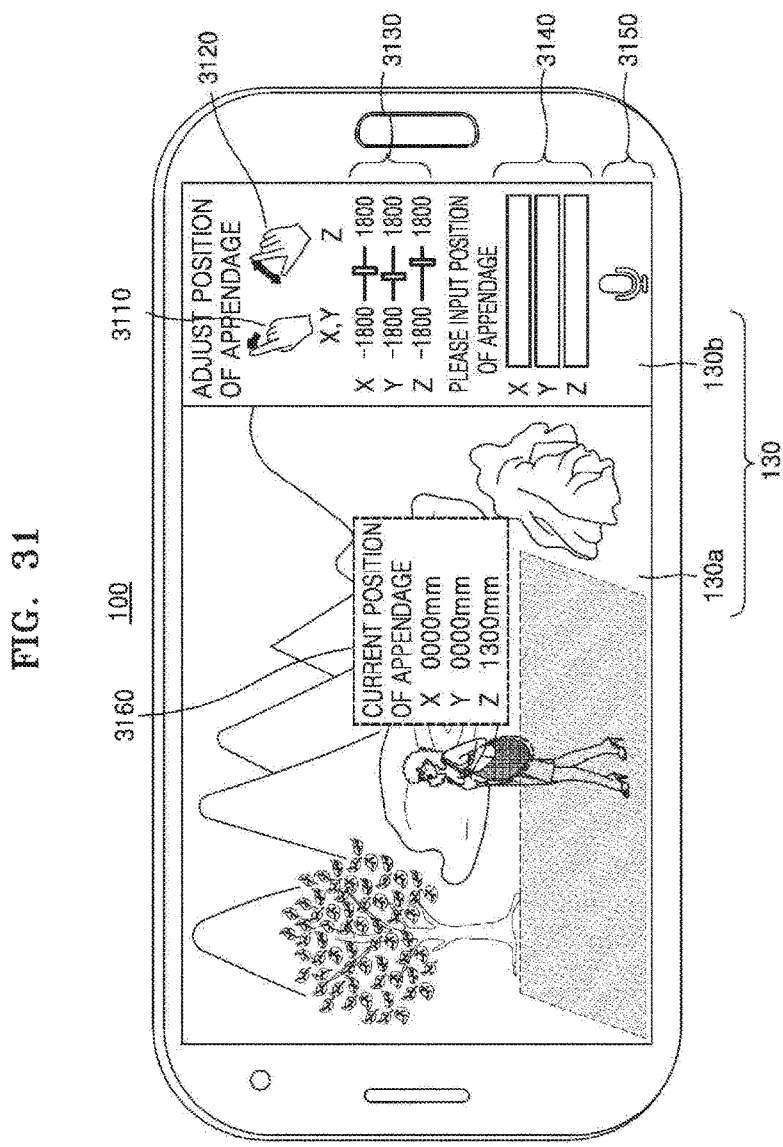
FIG. 31 illustrates an example of configuring a 3D space position of a photograph accessory, according to an exemplary embodiment.

FIG. 31 illustrates an example of configuring a 3D space position of a photograph accessory, according to an exemplary embodiment.

As shown in FIG. 31, the user may configure the 3D space position of the selected photograph accessory in the background image through the user operation, such as an operation 3110 of dragging the photograph accessory with a single finger, an operation 3120 of closing and/or opening two fingers, an operation 3130 of sliding a scroll bar, an operation 3140 of inputting corresponding content in a text box, a voice operation 3150, etc. Furthermore, the image capturing apparatus 100 may display a notification 3160 indicating the current 3D space position of the selected photograph accessory.

Figure 32:
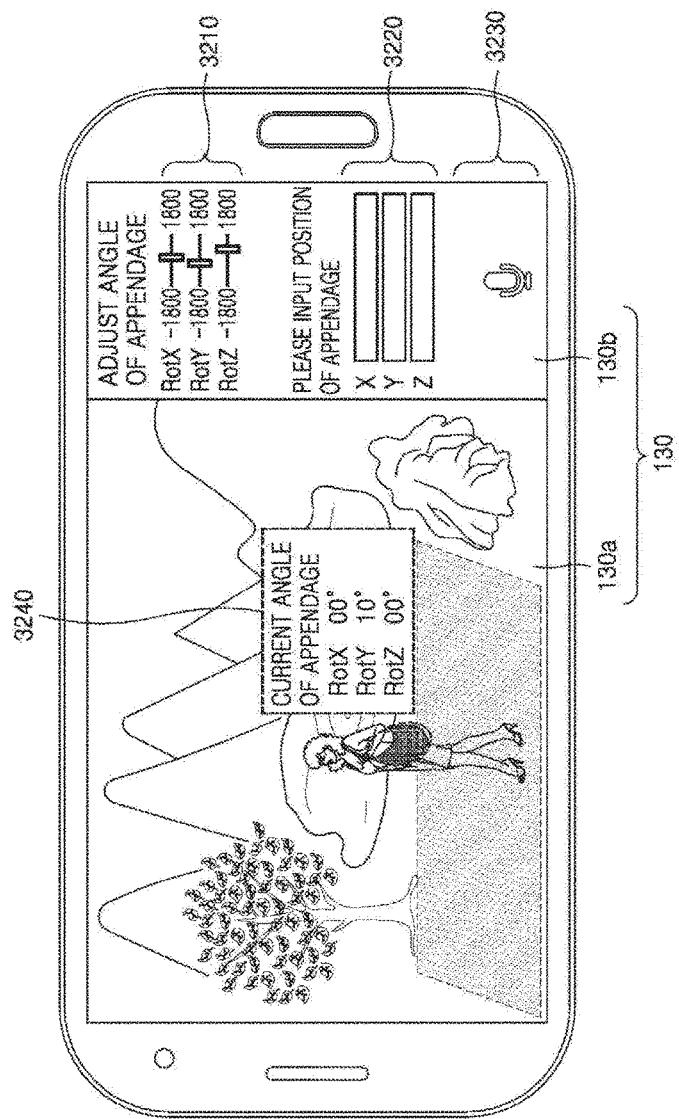
FIG. 32 illustrates an example of configuring a rotation angle of a photograph accessory, according to an exemplary embodiment.

FIG. 32 illustrates an example of configuring a rotation angle of a photograph accessory, according to an exemplary embodiment. As illustrated in FIG. 32, the user may configure the rotation angle of the selected photograph accessory in the background image through an operation 3210 of sliding a scroll bar, an operation 3220 of inputting corresponding content in a text box, a voice operation 3230, etc. Furthermore, the image capturing apparatus 100 may display a notification 3240 indicating the current rotation angle of the selected photograph accessory.

In addition, after the 3D space position and/or the 3D posture of the photograph accessory of the 3D virtual image is configured in the background, the 3D space position and/or the 3D posture of the photograph accessory may be automatically adjusted according to a change of the 3D space position and/or the 3D posture of the 3D virtual image in the background image. That is, the 3D space position and/or the 3D posture of the photograph accessory may be dynamically updated. Thus, the 3D space position and/or the 3D posture of the photograph accessory may be changed along with the change of the 3D space position and/or the 3D posture of the 3D virtual image, to implement a dynamic true sense.

For example, after the 3D space position and/or the 3D posture of the photograph accessory are determined, a relative 3D space position and/or a relative 3D posture of the photograph accessory with respect to the joint point of the 3D virtual image associated with the photograph accessory may be determined. Thus, when the 3D virtual image is adjusted, the 3D space position and/or the 3D posture of the photograph accessory may be adjusted according to the relative 3D space position and/or the relative 3D posture.

In addition, the 3D space position and/or the 3D posture of the 3D virtual image in the background image may be automatically adjusted according to the change of the 3D space position and/or the 3D posture of the photograph accessory. That is, the 3D space position and/or the 3D posture of the 3D virtual image may be dynamically updated. Thus, the 3D space position and/or the 3D posture of the 3D virtual image may be changed along with the change of the 3D space position and/or the 3D posture of the photograph accessory, thereby implementing a dynamic true sense.

In addition, colors may be applied to the photograph accessory. For example, a physical attribute of the photograph accessory may be adjusted to make the photograph accessory look more realistic. Examples of the physical attribute of the photograph accessory may include, but are not limited to, gravity, surface tension, elasticity, etc.

An image capturing method according to another embodiment is described with reference to FIG. 33. According to an exemplary embodiment, a target object may be guided to perform adjustment based on a selected virtual image. The method may be implemented through an image capturing apparatus and/or a computer program. For example, the method may be implemented through a camera installed in the image capturing apparatus, or may be implemented through function program in an operation system of the image capturing apparatus.

Figure 33:
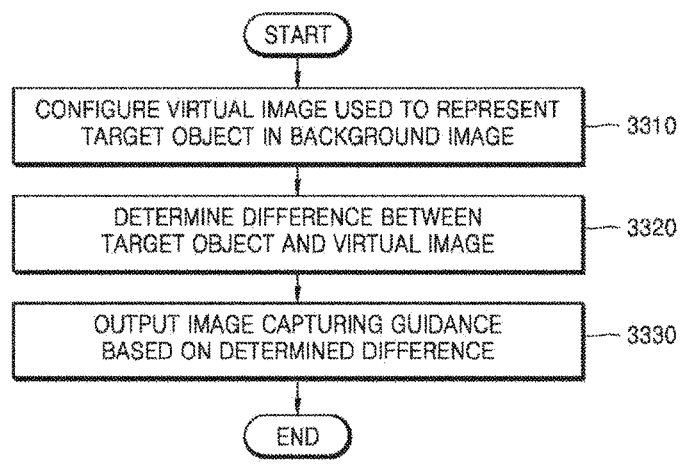
FIG. 33 is a flowchart of an image capturing method according to an exemplary embodiment.

As illustrated in FIG. 33, in operation 3310, the image capturing apparatus 100 may configure a virtual image used to represent a target object in a background image. The virtual image may be a 3D or two-dimensional (2D) person model in a designated posture, but the exemplary embodiments are not limited thereto. A detailed method of configuring the virtual image used to represent the target object in the background image may refer to the detailed implementing method of configuring the 3D virtual image in the background image in operation 430, which is not described repeatedly herein.

In operation 3320, the image capturing apparatus 100 may determine a difference between the target object and the virtual image in the background image.

The image capturing apparatus 100 may automatically detect the target object. A detailed detecting method may refer to the above-described detailed implementing method of automatically detecting the target object. For example, the target object may be detected based on a posture of the virtual image in the background image, or may be detected based on space position information provided by a wearable device. Alternatively, an object selected by the user in the background image is taken as the target object, and then the selected photographing object is tracked as a target, which is not described repeatedly herein.

In an example, the difference between the target object and the virtual image in the background image may include a space position difference and/or a posture difference between the target object and the virtual image in the background image. If the determined virtual image is a 3D virtual image and the background image has depth information, the difference between the photograph and the virtual image in the background image may include a 3D space position difference and/or a 3D posture difference between the target object and the virtual image in the background image.

In particular, a method of determining the difference between the target object and the 3D virtual image in the background image may refer to the above-described method, which is not described repeatedly herein. For example, the posture difference between the target object and the virtual image is determined by comparing a space position of a joint point of the target object with a space position of a corresponding joint point of the virtual image.

If the determined virtual image is a 2D virtual image, the difference between the target object and the virtual image in the background image may include a 2D space position difference and/or a 2D posture difference between the target object and the virtual image. An image recognition method may be used to determine the 2D space position difference and/or the two-dimensional posture difference.

In operation 3330, the image capturing apparatus 100 may output an image capturing guidance based on the determined difference.

If the difference between the target object and the virtual image in the background image only includes the space position difference between the target object and the virtual image, the target object may be guided to adjust only the space position of the target object based on the determined space position difference, without any guidance to adjust the posture of the target object. Thus, the space position of the target object may be same as or similar to the virtual image in the background after the adjustment.

If the difference between the target object and the virtual image in the background image only includes the posture difference between the target object and the virtual image, the target object may be guided to adjust only the posture of the target object based on the determined posture difference, without any guidance to adjust the space position of the target object. Thus, the posture of the target object is same as or similar to that of the virtual image after the adjustment.

If the difference between the target object and the virtual image in the background image includes the space position difference and the posture difference between the target object and the virtual image, the target object may be guided to adjust the space position of the target object based on the determined space position difference, and is guided to adjust the posture of the target object based on the determined posture difference. Thus, the space position and the posture of the target object are respectively same as or similar to the virtual image after the adjustment. For example, the target object is firstly guided to adjust the space position, and then is guided to adjust the posture after the target object reaches the corresponding space position.

The detailed guidance manner may refer to the above-described detailed implementing way, e.g., the image capturing guidance may be output through the image capturing apparatus and/or the wearable device, which is not described repeatedly herein.

An image capturing method according to another embodiment will be described with reference to FIGS. 34 to 37. According to an exemplary embodiment, a target object may be focused on based on a posture of the target object. The method may be implemented through an image capturing apparatus and/or a computer program. For example, the method may be implemented through a camera installed in the image capturing apparatus, or may be implemented through function program in an operation system of the image capturing apparatus.

Figure 34:
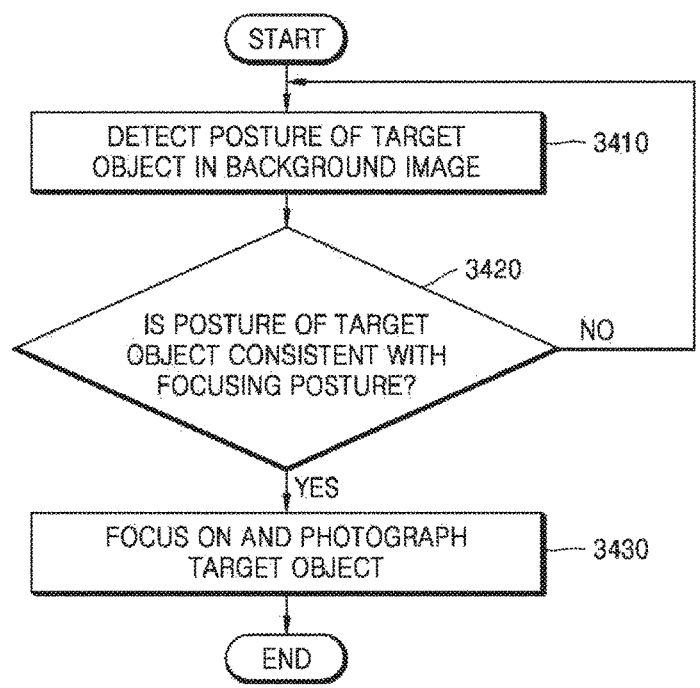
FIG. 34 is a flowchart of an image capturing method according to another embodiment.

FIG. 34 is a flowchart of an image capturing method according to an exemplary embodiment.

As illustrated in FIG. 34, in operation 3410, the image capturing apparatus 100 may detect the posture of the target object in the background image, i.e., in a preview image seen from the image capturing apparatus 100. The posture of the target object may be detected in the background image through various existing image recognition methods, which is not described repeatedly herein.

In operation 3420, the image capturing apparatus 100 may determine whether the posture of the detected target object is consistent with a focusing posture. The focusing posture may be a pre-configured and desired photographed posture of the virtual image used to represent the target object (e.g., the posture of the virtual image pre-selected by the user, or the posture after the posture of the pre-selected virtual image is configured), or may be any of pre-configured photographing postures in the photographing posture database, or may be a best photographing posture of the target object.

Figure 35:
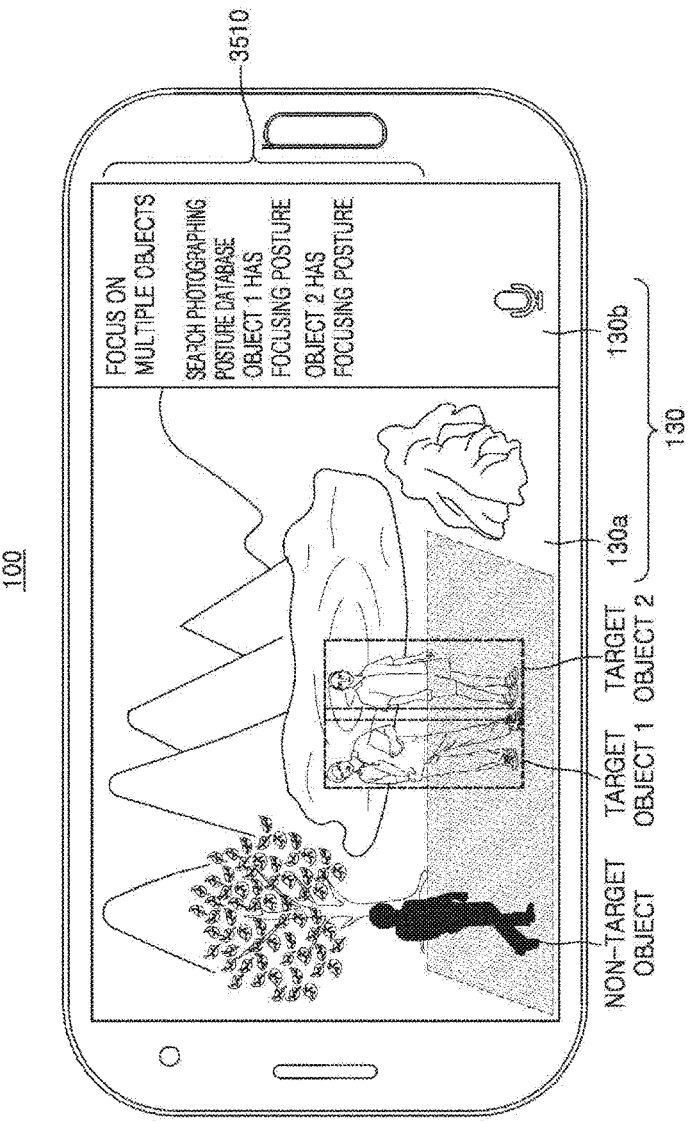
FIG. 35 illustrates an example of determining whether a posture of a target object is consistent with the focusing posture, according to an exemplary embodiment.

FIG. 35 illustrates an example of determining whether the posture of the target object is consistent with the focusing posture, according to an exemplary embodiment. As illustrated in FIG. 35, the focusing posture may be any of the photographing postures stored in the photographing posture database. If the target object includes multiple objects, it is determined whether each object is consistent with any of the photographing postures in the photographing posture database. If the posture of the object is consistent with any of the photographing postures in the photographing posture database, it may be determined that the posture of the object is consistent with the focusing posture, and the object is an object to be focused on. If the posture of the object is inconsistent with any of the photographing postures in the photographing posture database, it is determined that the posture of the object is inconsistent with the focusing posture, and the object is not an object to be focused on. Furthermore, the image capturing apparatus 100 may display a notification 3510 indicating the object to be focused on and the object not to be focused on.

A method of determining whether the posture of the detected target object is consistent with the focusing posture may refer to the above-described detailed implementing method of determining the difference between the target object and the 3D virtual image in the background image. Alternatively, the difference between the two-dimensional or 3D posture of the target object and the focusing posture may be determined according to another way. For example, when the difference between the posture of the target object and the focusing posture is less than a preset focusing threshold, or when the posture of the target object is roughly similar to the focusing posture, it may be determined that the posture of the target object is consistent with the focusing posture.

If the difference between the posture of the detected target object and the focusing posture is less than a first focusing threshold, it may be determined that the posture of the detected target object is consistent with the focusing posture. On the other hand, if the difference between the posture of the detected target object and the focusing posture is greater than a second focusing threshold, it may be determined that the posture of the detected target object is inconsistent with the focusing posture. The second focusing threshold may be same as or different from the first focusing threshold. For example, if a 3D space position difference between each joint point of the target object and the joint point corresponding to the focusing posture is less than a preset position threshold or if a 3D space position difference between a designated joint point of the target object and the joint point corresponding to the focusing posture is less than the preset position threshold, it may be determined that the posture of the target object is consistent with the focusing posture. Alternatively, if an angle difference between each joint point of the photographed object and the joint point corresponding to the focusing posture is less than a preset angle threshold or if an angle difference between a designated joint point of the target object and the joint point corresponding to the focusing posture is less than a preset angle threshold, it may be determined that the posture of the target object is consistent with the focusing posture.

Returning back to FIG. 34, in operation 3430, if the posture of the target object is consistent with the focusing posture, the image capturing apparatus 100 may focus on and photograph the target object.

In an example, when the posture of the detected target object is consistent with the focusing posture, the target object may be automatically focused on and photographed. That is, in a condition that the user does not need to perform any operation, the target object may be automatically focused on and photographed.

In an example, when the target object includes multiple objects, procedures in operation 3430 may be performed for each object. After the procedures in operation 3430 may be performed for each object, the object may be extracted from the corresponding photograph, and all extracted objects and the background image are composed. According to this manner, each object may be respectively focused on, and the image in which the object is taken as the focus may be photographed, the corresponding object is extracted from the photograph, and all extracted objects and the background image are composed to obtain an image in which all the objects are clear. In particular, a method of extracting each object from the corresponding image and composing all extracted objects and the background image may refer to the above-described detailed implementing method, which is not described repeatedly herein.

In an example, the focusing posture may be used to anticipate occurrence of a target posture, i.e., a posture of the target object desired to be photographed. Accordingly, in operation 3430, the target object may be focused on and automatically captured to obtain the image of the target object in the target posture. For example, the target posture may be a best photographing posture of the target object, which refers to a posture that the target object locates in a best position, e.g., a peak, etc. For example, the target posture may be a target posture selected by the user from various posture sequences stored in the photographing posture database. The focusing posture may be a posture used to anticipate occurrence of the desired posture. For example, the focusing posture may refer to a certain photographing posture that appears before the target posture in the photographing posture sequence. If it is determined that the posture of the detected target object is consistent with any of postures used to anticipate occurrence of the target posture of the target object, the target object may be focused on, and the image of the target object in the target posture may be automatically captured. In an example, if the target object includes multiple objects, the procedures in operation 3430 may be performed for each object, and the object is extracted from the corresponding photograph, and all extracted images and the background image may be used to obtain the image showing that each object is in corresponding target posture.

Figure 36:
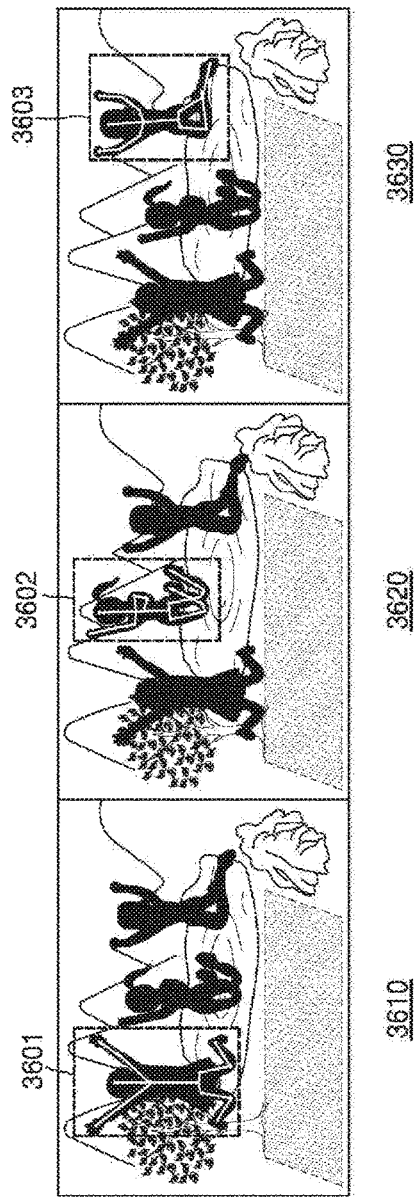
FIG. 36 illustrates another example of capturing an image of a target object, according to an exemplary embodiment.

FIG. 36 illustrates another example of capturing an image of a target object, according to an exemplary embodiment.

In this exemplary embodiment, the target posture may be a best photographing posture of each of multiple objects, which refers to a posture in which an object is when the object is in the highest position compared to other objects. Accordingly, if the posture of each object is consistent with the posture used to anticipate occurrence of the posture that puts the object in the highest position, the object may be focused on. Thus, the image of the object in the posture in which the object is in the highest position compared to other objects. Referring to FIG. 36, a first object 3601 may be focused on in the image 3610 in which the first object 3601 is in the highest position compared to other objects. In the image 3620, a second object 3602 may be focused on in which the second object 3602 is in the highest position compared to other objects. In the image 3630, a third object 3603 may be focused on in which the second object 3603 is in the highest position compared to other objects.

In an example, focusing postures may be used to represent a series of postures of the target object desired to be continuously photographed. In operation 3410, the postures of the target object may be continuously detected in the background image. In operation 3430, if the detected postures of the target object are continuously consistent with the focusing postures in a time period, the target object may be continuously photographed automatically to avoid capturing an additional action of the target object.

If the postures of the target object are continuously detected in the background image, the image capturing method may further include detecting whether the posture of the target object is consistent in a preset time period after the procedures in operation 3410 are performed, and focusing on and continuously photographing the object if the posture of the target object is consistent in the preset time period. That is, if it is determined that the target object does not change the posture (i.e., a pause posture of the target object), the target object may be automatically focused on and photographed. Comparing with the existing continuous image capturing method (i.e., the photographing is performed once every time period), the above-described method can reduce photographed additional actions.

In an example, the image capturing method may further include configuring a space position and/or a posture of a photograph accessory in the background image. A detailed implementing method of determining and configuring the photograph accessory may refer to the above-described method, which is not described repeatedly herein.

In an example, when the target object includes multiple objects, according to an exemplary embodiment, the process in operation 3430 may further include removing the object the posture of which is inconsistent with the focusing posture from the photographing preview image before the target object is focused on and photographed, or removing the object the posture of which is inconsistent with the focusing posture from a photograph after the target object is photographed. In particular, the target object includes a target object (i.e., an object really to be photographed) and a non-target object (e.g., a passer-by). The target object and the non-target object may be automatically recognized according to whether the target object is consistent with the focusing posture. The non-target object is removed before or after the photographing is performed. A detailed implementing method of removing the object inconsistent with the focusing posture may refer to the above-described detailed implementing method, which is not described repeatedly herein.

Figure 37:
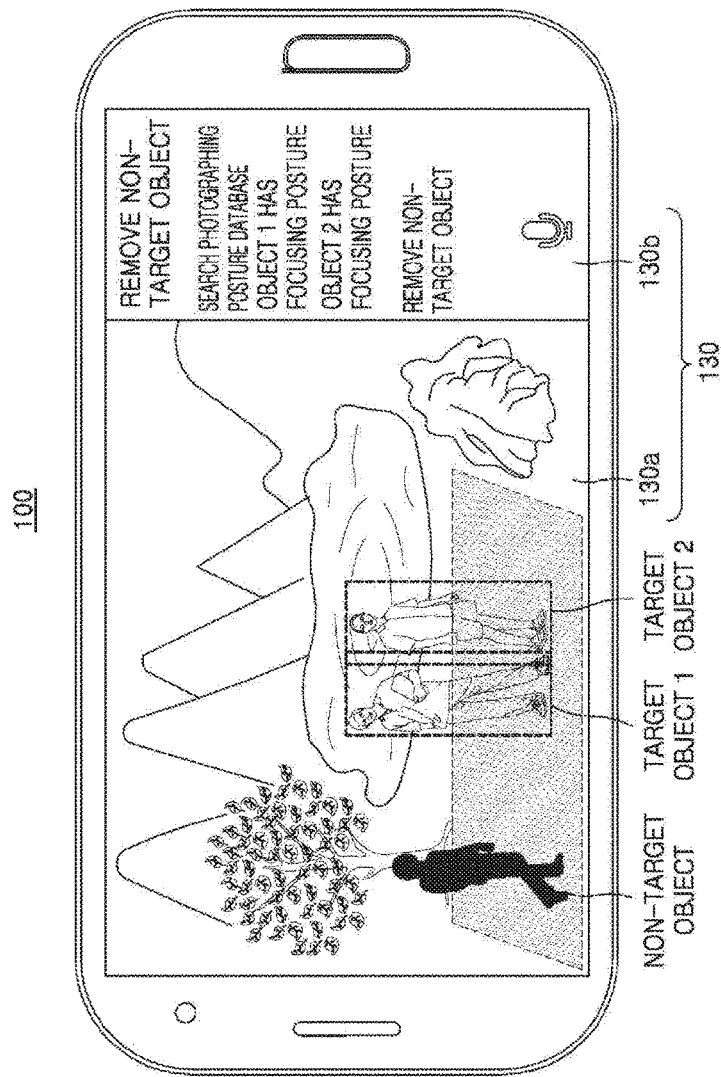
FIG. 37 illustrates another example of removing a non-target object, according to an exemplary embodiment.

FIG. 37 illustrates another example of removing a non-target object, according to an exemplary embodiment. As illustrated in FIG. 37, the focusing posture is any of the photographing postures in the photographing posture database, and the target object includes multiple objects. It is determined whether each object is the target object or the non-target object. The target object and the non-target object to be removed may be displayed to the user.

An image capturing method when a target object is a single object is described in detail as follows.

Figure 38:
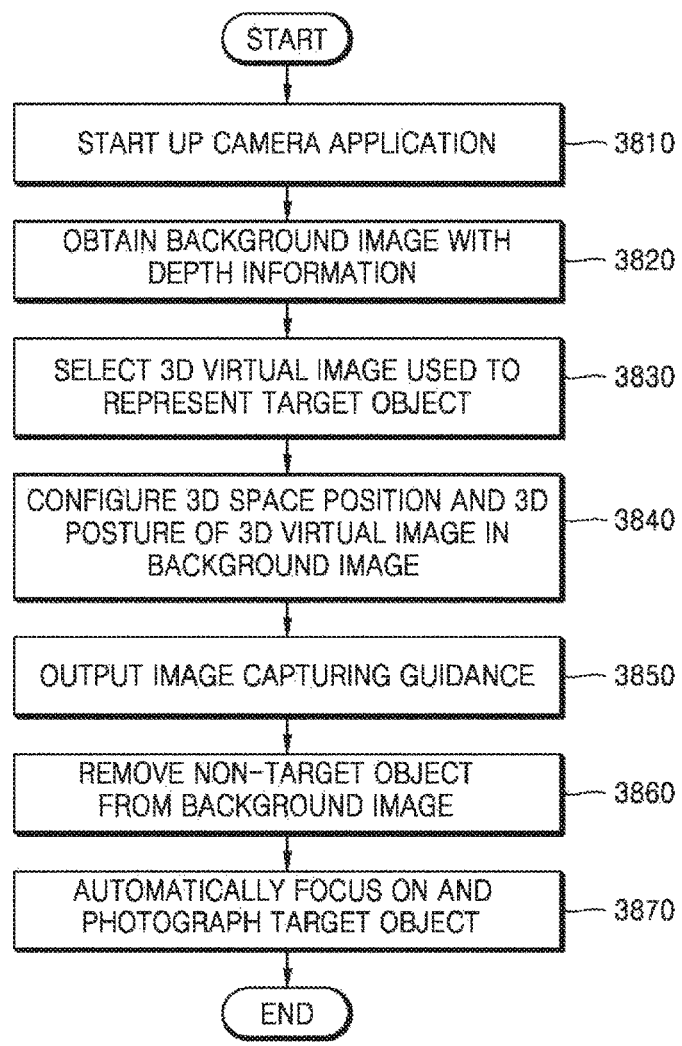

FIG. 38 is a flowchart of an image capturing method according to an exemplary embodiment. This method is used for a single target object.

As illustrated in FIG. 38, in operation 3810, the image capturing apparatus 100 starts a camera application up. The camera application may be started up according to a user operation. For example, if it is detected that the user clicks an icon of the camera application, the camera application is started up. Alternatively, if a voice command used to start the camera application up is detected, the camera application may be started up.

In operation 3820, the image capturing apparatus 100 may obtain a background image with depth information. That is, a photographing preview image with the depth information captured in real time through a depth camera may be displayed to the user through a screen of an image capturing apparatus.

In operation 3830, the image capturing apparatus 100 may select a 3D virtual image used to represent the target object.

According to a user operation of selecting a menu item "select a 3D virtual image" in a menu bar, 3D virtual images stored in the photographing posture database may be displayed on a side of the screen for user selection. The user may click on a 3D virtual image for selection.

In addition, the user may further select a photographing scene template including the 3D virtual image and a photograph accessory (e.g., a sun). A relation between the photograph accessory and the 3D virtual image (e.g., a position relation) is limited in a pre-configured photographing scene template.

In operation 3840, the image capturing apparatus 100 may configure a 3D space position and a 3D posture of the 3D virtual image in the background image.

In an example, the 3D space position of the 3D virtual image may be roughly configured, and then is further adjusted.

For example, the user may click the selected 3D virtual image, and drag the 3D virtual image to a corresponding position in the background image displayed on another side of the screen. Thus, the selected 3D virtual image may be roughly configured in the background image. Preferably, it may be displayed in the background image which region is suitable to position the 3D virtual image and which region is not suitable to position the 3D virtual image. Alternatively, when locating the 3D virtual image into a region not suitable to position the 3D virtual image, the user may be notified about the unsuitability.

For example, if the photographing scene template including the 3D virtual image and the photograph accessory is selected in operation 3830, the 3D space position and the 3D posture of the 3D virtual image may be automatically configured based on the photograph accessory in the background image.

After the 3D space position of the 3D virtual image is roughly configured, an interface used to precisely configure the 3D space position of the 3D virtual image is displayed on another side of the screen. For example, scroll bars or text boxes respectively used to adjust positions of the 3D virtual image on a horizontal direction, a vertical direction and a depth direction are displayed in the interface. The user may precisely configure the 3D space position of the 3D virtual image by sliding the scroll bars or by inputting corresponding coordinates in the text boxes.

After the user determines that the process of configuring the 3D space position finishes, an interface used to configure the 3D posture of the 3D virtual image is displayed on a side of the screen. For example, a schematic diagram illustrating the posture of the 3D virtual image indicated through the joint point of the 3D virtual image may be displayed in the interface, which may include a front view or a side view. The user may configure the 3D posture of the 3D virtual image by clicking the joint point to be configured and dragging the joint point to the corresponding position. In addition, the user may further configure a rotation angle of the 3D virtual image by clicking the 3D virtual image and dragging the 3D virtual image to rotate the 3D virtual image.

The user may further select the photograph accessory (e.g., a hat). The 3D space position and the 3D posture of the photograph accessory may be automatically configured according to an attribute of the photograph accessory (e.g., a body part with which joint point of the 3D virtual image the photograph accessory is associated), the configured 3D space position and/or the configured 3D posture of the 3D virtual image. The user may further adjust the 3D space position and the 3D posture of the photograph accessory.

In operation 3850, the image capturing apparatus 100 may output the image capturing guidance based on the difference between the target object and the 3D virtual image in the background image. For example, the image capturing guidance may be output based on the 3D space position difference and the 3D posture difference between the target object and the 3D virtual image.

The target object may be firstly guided to reach the position where the 3D virtual image is positioned based on the 3D space position difference, and then may be guided to adjust the 3D posture based on the 3D posture difference. The voice guidance may be output through the image capturing apparatus. Alternatively, the image guidance may be output through a wearable device worn on the target object and paired with the image capturing apparatus.

In operation 3860, the image capturing apparatus 100 may remove the non-target object from the background image. That is, the non-target object (e.g., a passer-by) may be removed from a photographing preview image, so that the non-target image is not displayed in the photograph.

The procedures in operation 3850 and the procedures in operation 3860 may be simultaneously performed. That is, the image capturing apparatus 100 may guide the target object and remove the non-target object at the same time.

In operation 3870, when the target object is consistent with the 3D virtual image in the background image, the image capturing apparatus 100 may automatically focus on and photograph the target object. For example, when the 3D space position difference between the target object and the 3D virtual image is less than a preset position focusing threshold and the 3D posture difference between the target object and the 3D virtual image is less than a preset posture focusing threshold, it may be determined that the target object is consistent with the 3D virtual image, and the target object is automatically focused on and photographed.

An image capturing method when a target object includes multiple objects is described in detail as follows.

Figure 39:
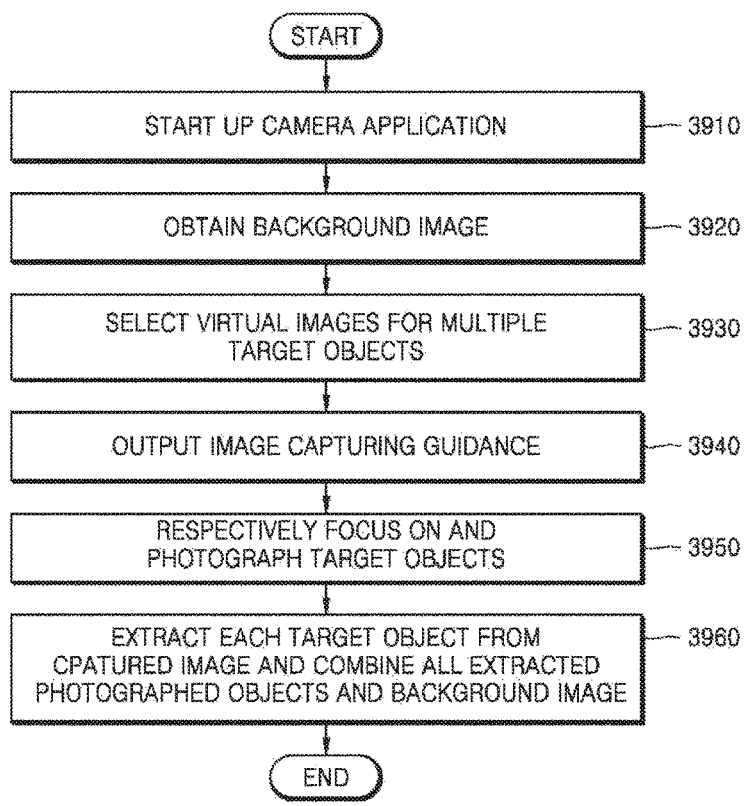
FIG. 39 is a flowchart of an image capturing method according to an exemplary embodiment.

FIG. 39 is a flowchart of an image capturing method according to an exemplary embodiment. This method is used for multiple target objects.

Referring to FIG. 39, in operation 3910, the image capturing apparatus 100 may start a camera application up. The camera application may be started up according to a user operation used to start the camera application up. For example, when it is detected that the user clicks an icon of the camera application, the camera application is started up. Alternatively, when a voice command used to start the camera application up is detected, the camera application is started up.

In operation 3920, the image capturing apparatus 100 may obtain a background image. That is, a photographing preview image with the depth information captured in real time through a depth camera is displayed for the user through a screen of an image capturing apparatus.

In operation 3930, the image capturing apparatus 100 may select virtual images used to represent the multiple target objects.

According to a user operation of selecting a menu item "select virtual images" in a menu bar, virtual images stored in the photographing posture database may be displayed on a side of the screen for user selection. The user may select a virtual image for each target object, or select a combination of multiple virtual images.

In operation 3940, the image capturing apparatus 100 may output the image capturing guidance based on differences between the target objects and the virtual images corresponding to the target objects in the background image. That is, the photographing guidance is output based on the posture difference between each target object and the virtual image corresponding to the target object. For example, the target objects may be continuously guided in order (e.g., from left to right) through the voice. Alternatively, the voice guidance and/or the image guidance may be transmitted to the wearable devices worn on the corresponding target objects, so that each target object may adjust a position and/or posture according to the guidance output from the corresponding wearable device.

In operation 3950, for each target object, when the posture of the target object is consistent with a target posture, i.e., the posture of the corresponding virtual image, the image capturing apparatus 100 may focus on and photograph the target object. That is, for each target object, when the detected posture of the target object is consistent with the posture of the corresponding virtual image, the target object is automatically focused on and photographed, to obtain the image in which each target object is taken as the focus.

In operation 3960, the image capturing apparatus 100 may extract each target object from the photograph corresponding to the target object, and use the extracted target objects to obtain an image including clear target objects.

In the image capturing methods and the image capturing apparatuses according to the exemplary embodiments, the 3D virtual image may be configured in the background image with the depth information, so that the user can preview the photographing effect in advance. Furthermore, the target object may be guided to perform adjustment according to the difference between the target object and the 3D virtual image in the background image, so that the target object is consistent with the virtual image. In addition, the target object may be focused on and photographed based on the posture of the target object.

According to the exemplary embodiments, it is possible to effectively photograph sophisticated photographing postures or interesting photographing postures of objects.

The exemplary embodiments set forth herein may be embodied as program instructions that can be executed by various computing units and recorded on a non-transitory computer-readable recording medium. Examples of the non-transitory computer-readable recording medium may include program instructions, data files, and data structures solely or in combination. The program instructions recorded on the non-transitory computer-readable recording medium may be specifically designed and configured for the inventive concept, or may be well known to and usable by those of ordinary skill in the field of computer software. Examples of the non-transitory computer-readable recording medium may include magnetic media (e.g., a hard disk, a floppy disk, a magnetic tape, etc.), optical media (e.g., a compact disc-read-only memory (CD-ROM), a digital versatile disk (DVD), etc.), magneto-optical media (e.g., a floptical disk, etc.), and a hardware device specially configured to store and execute program instructions (e.g., a ROM, a random access memory (RAM), a flash memory, etc.). Examples of the program instructions may include not only machine language codes prepared by a compiler but also high-level codes executable by a computer by using an interpreter.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An image capturing apparatus comprising:
   an image capturing unit for capturing an image, the image capturing unit including an image sensor; and
   a controller connected to the image capturing unit, wherein the controller is configured to:
   obtain a background image with depth information,
   position a three-dimensional (3D) virtual image in the background image based on the depth information, the 3D virtual image being used in identifying a 3D space position and/or a 3D posture of a target object to be photographed,
   determine a difference between the 3D virtual image in the background image and the target object in a live preview image of the image capturing unit while the image capturing unit is positioned to capture a scene corresponding to the background image, and
   control the image capturing unit to photograph the target object automatically when the difference becomes less than a predetermined threshold.

2. The image capturing apparatus of claim 1, wherein the controller is further configured to determine at least one of a 3D virtual space position and a 3D posture of the 3D virtual image.

3. The image capturing apparatus of claim 2, wherein the controller is further configured to determine a photograph accessory and configure at least one of a 3D space position and a 3D posture of the photograph accessory in the background image.

4. The image capturing apparatus of claim 3, wherein the controller is further configured to position the 3D virtual image based on the photograph accessory of the 3D virtual image in the background image, and wherein a relation between the 3D virtual image and the photograph accessory of the 3D virtual image is predetermined in a pre-configured photographing scene template.

5. The image capturing apparatus of claim 3, wherein the controller is further configured to configure the 3D posture of the 3D virtual image based on a 3D space position of at least one joint point of the 3D virtual image.

6. The image capturing apparatus of claim 1, wherein the controller is further configured to output a capturing guidance indicating the difference through at least one of the image capturing apparatus and a wearable device worn by the target object based on the determined difference.

7. The image capturing apparatus of claim 6, wherein the controller is further configured to detect the target object based on at least one of a 3D posture of the 3D virtual image, 3D space position information that indicates a 3D space position and is provided by the wearable device, and a reference object selected by a user for target object tracking.

8. The image capturing apparatus of claim 6, wherein the difference comprises at least one of a 3D space position difference and a 3D posture difference between the target object and the 3D virtual image.

9. The image capturing apparatus of claim 8, wherein the controller is further configured to determine the 3D posture difference by comparing a 3D space position of at least one joint point of the target object with a 3D space position of at least one corresponding joint point of the 3D virtual image.

10. The image capturing apparatus of claim 1, wherein the controller is further configured to detect a posture of the target object, determine whether the posture of the target object is consistent with a focusing posture, and control the image capturing unit to focus on and photograph the target object when the detected posture of the target object is consistent with the focusing posture.

11. The image capturing apparatus of claim 10, wherein the focusing posture comprises at least one of a pre-configured posture representing a target posture corresponding to a 3D posture of the 3D virtual image and a posture stored in a pre-configured photographing posture database.

12. The image capturing apparatus of claim 10, wherein the controller is further configured to determine an anticipating posture that is different from a target posture, and control the image capturing unit to automatically focus on and photograph the target object when it is detected that the target object is in the anticipating posture.

13. The image capturing apparatus of claim 10, wherein the controller is further configured to control the image capturing unit to automatically focus on and continuously photograph the target object when the target object is continuously consistent with the 3D virtual image in the background image during a preset time period.

14. The image capturing apparatus of claim 1, wherein the target object comprises multiple objects, and
the controller is further configured to remove an object inconsistent with the 3D virtual image before or after the target object is focused on and photographed.

15. A method for an image capturing apparatus to capture an image, the method comprising:
obtaining a background image with depth information;
positioning a three-dimensional (3D) virtual image in the background image based on the depth information, the 3D virtual image being used in identifying a 3D space position and/or a 3D posture of a target object to be photographed;
determining a difference between the 3D virtual image in the background image and the target object in a live preview image of the image capturing apparatus while the image capturing apparatus is positioned to capture a scene corresponding to the background image; and
photographing the target object automatically when the difference becomes less than a predetermined threshold.

16. The image capturing method of claim 15, further comprising:
determining at least one of a 3D virtual space position and a 3D posture of the 3D virtual image.

17. The image capturing method of claim 15, further comprising:
outputting a capturing guidance through at least one of the image capturing apparatus and a wearable device worn by the target object based on the determined difference.

18. The image capturing method of claim 15, further comprising:
detecting a posture of the target object;
determining whether the posture of the target object is consistent with a focusing posture; and
focusing on and photographing the target object when the detected posture of the target object is consistent with the focusing posture,
wherein the focusing posture comprises at least one of a pre-configured posture representing a target posture corresponding to a 3D posture of the 3D virtual image and a posture stored in a pre-configured photographing posture database.

19. The image capturing method of claim 15, further comprising:
determining an anticipating posture that is different from a target posture; and
automatically focusing on and photographing the target object when it is detected that the target object is in the anticipating posture.

20. A non-transitory computer-readable recording medium having recorded thereon a program for performing the image capturing method of claim 15.

* * * * *